US012812229B2

(12) United States Patent
Boltanski et al.

(10) Patent No.: US 12,812,229 B2
(45) Date of Patent: Nov. 24, 2026

(54) SYSTEMS FOR POP-OUT CAMERA

(71) Applicant: Corephotonics LTD., Tel Aviv-Jaffa (IL)

(72) Inventors: Rami Boltanski, Tel Aviv-Jaffa (IL); Itay Yedid, Tel Aviv-Jaffa (IL); Ephraim Robert Goldenberg, Tel Aviv-Jaffa (IL); Kobi Goldstein, Tel Aviv-Jaffa (IL); Yiftah Kowal, Tel Aviv-Jaffa (IL); Oriel Grushka, Tel Aviv-Jaffa (IL); Daniel Boltinsky, Tel Aviv-Jaffa (IL); Vinay Bhus, Tel Aviv-Jaffa (IL); Itay Manor, Tel Aviv-Jaffa (IL)

(73) Assignee: Corephotonics LTD., Tel Aviv-Jaffa (IL)

( * ) Notice: Subject to any disclaimer, the term of this patent is extended or adjusted under 35 U.S.C. 154(b) by 0 days.

(21) Appl. No.: 19/321,258

(22) Filed: Sep. 7, 2025

(65) Prior Publication Data

US 2026/0012692 A1 Jan. 8, 2026

Related U.S. Application Data

(63) Continuation of application No. 18/793,816, filed on Aug. 4, 2024, now Pat. No. 12,439,142, which is a
(Continued)

(51) Int. Cl.
*H04N 23/55* (2023.01)
*G02B 7/02* (2021.01)
(Continued)

(52) U.S. Cl.
CPC ............ *H04N 23/55* (2023.01); *G02B 7/023* (2013.01); *G03B 17/04* (2013.01); *H04N 23/54* (2023.01); *H04N 23/57* (2023.01)

(58) Field of Classification Search
CPC ........... G03B 17/04; G03B 2205/0046; G03B 2205/0053; H04N 23/52; H04N 23/54;
(Continued)

(56) References Cited

U.S. PATENT DOCUMENTS 3,085,354 A 4/1963 Rasmussen
3,584,513 A 6/1971 Gates
(Continued)

FOREIGN PATENT DOCUMENTS

CN 1763574 A 4/2006
CN 101276415 A 10/2008
(Continued)

OTHER PUBLICATIONS

A 3MPixel Multi-Aperture Image Sensor with 0.7 m Pixels in 0.11 m CMOS, Fife et al., Stanford University, 2008, 3 pages.
(Continued)

*Primary Examiner* — Stephanie E Bloss
*Assistant Examiner* — Fang-Chi Chang
(74) *Attorney, Agent, or Firm* — Reinhold Cohn Group

(57) ABSTRACT

The present disclosure provides a camera module for use in a portable electronic device. The camera module comprises a shiftable lens barrel comprising an objective assembly holding coaxially one or more lens elements defining an optical axis. The camera module has a retractable cover window. The lens barrel has an operative state and a collapsed state and the cover window has a corresponding extended and retracted position. The camera further comprises an actuator including a driving motor; a pop-out assembly actuatable by the actuator. The pop-out assembly includes a driving cam configured to be driven rotationally by the actuator, a carrier configured to receive the lens barrel
(Continued)

and an image sensor configured to image a field of view of the objective assembly when the lens barrel is in the operative state.

19 Claims, 29 Drawing Sheets

Related U.S. Application Data continuation of application No. 17/928,328, filed as application No. PCT/IB2022/052194 on Mar. 11, 2022, now Pat. No. 12,081,856.

(60) Provisional application No. 63/298,335, filed on Jan. 11, 2022, provisional application No. 63/285,144, filed on Dec. 2, 2021, provisional application No. 63/280,732, filed on Nov. 18, 2021, provisional application No. 63/280,244, filed on Nov. 17, 2021, provisional application No. 63/276,072, filed on Nov. 5, 2021, provisional application No. 63/230,972, filed on Aug. 9, 2021, provisional application No. 63/159,660, filed on Mar. 11, 2021.

(51) Int. Cl.

| | |
|---|---|
| ***G03B 17/04*** | (2021.01) |
| *H04N 23/54* | (2023.01) |
| *H04N 23/57* | (2023.01) |

(58) Field of Classification Search

CPC ...... H04N 23/55; H04N 23/57; H04N 23/675; H04N 23/687; G02B 7/02; G02B 7/021; G02B 7/022; G02B 7/023; G02B 7/04; G02B 7/10; G02B 27/64; G02B 27/646

See application file for complete search history.

(56) References Cited

U.S. PATENT DOCUMENTS

| | | | |
|---|---|---|---|
| 3,941,001 | A | 3/1976 | LaSarge |
| 4,199,785 | A | 4/1980 | McCullough |
| 4,792,822 | A | 12/1988 | Akiyama |
| 5,005,083 | A | 4/1991 | Grage |
| 5,032,917 | A | 7/1991 | Aschwanden |
| 5,041,852 | A | 8/1991 | Misawa |
| 5,051,830 | A | 9/1991 | von Hoessle |
| 5,099,263 | A | 3/1992 | Matsumoto |
| 5,248,971 | A | 9/1993 | Mandl |
| 5,287,093 | A | 2/1994 | Amano |
| 5,331,465 | A | 7/1994 | Miyano |
| 5,394,520 | A | 2/1995 | Hall |
| 5,436,660 | A | 7/1995 | Sakamoto |
| 5,444,478 | A | 8/1995 | Lelong |
| 5,459,520 | A | 10/1995 | Sasaki |
| 5,502,537 | A | 3/1996 | Utagawa |
| 5,657,402 | A | 8/1997 | Bender |
| 5,682,198 | A | 10/1997 | Katayama |
| 5,768,443 | A | 6/1998 | Michael |
| 5,892,855 | A | 4/1999 | Kakinami |
| 5,926,190 | A | 7/1999 | Turkowski |
| 5,940,641 | A | 8/1999 | McIntyre |
| 5,982,951 | A | 11/1999 | Katayama |
| 6,101,334 | A | 8/2000 | Fantone |
| 6,128,416 | A | 10/2000 | Oura |
| 6,148,120 | A | 11/2000 | Sussman |
| 6,201,533 | B1 | 3/2001 | Rosenberg |
| 6,208,765 | B1 | 3/2001 | Bergen |
| 6,211,668 | B1 | 4/2001 | Duesler |
| 6,215,299 | B1 | 4/2001 | Reynolds |
| 6,222,359 | B1 | 4/2001 | Duesler |
| 6,268,611 | B1 | 7/2001 | Pettersson |
| 6,341,901 | B1 | 1/2002 | Iwasa |
| 6,520,643 | B1 | 2/2003 | Holman |
| 6,549,215 | B2 | 4/2003 | Jouppi |
| 6,611,289 | B1 | 8/2003 | Yu |
| 6,643,416 | B1 | 11/2003 | Daniels |
| 6,650,368 | B1 | 11/2003 | Doron |
| 6,680,748 | B1 | 1/2004 | Monti |
| 6,714,665 | B1 | 3/2004 | Hanna |
| 6,724,421 | B1 | 4/2004 | Glatt |
| 6,738,073 | B2 | 5/2004 | Park |
| 6,741,250 | B1 | 5/2004 | Furlan |
| 6,750,903 | B1 | 6/2004 | Miyatake |
| 6,778,207 | B1 | 8/2004 | Lee |
| 7,002,583 | B2 | 2/2006 | Rabb, III |
| 7,015,954 | B1 | 3/2006 | Foote |
| 7,038,716 | B2 | 5/2006 | Klein |
| 7,199,348 | B2 | 4/2007 | Olsen |
| 7,206,136 | B2 | 4/2007 | Labaziewicz |
| 7,248,294 | B2 | 7/2007 | Slatter |
| 7,256,944 | B2 | 8/2007 | Labaziewicz |
| 7,305,180 | B2 | 12/2007 | Labaziewicz |
| 7,339,621 | B2 | 3/2008 | Fortier |
| 7,346,217 | B1 | 3/2008 | Gold, Jr. |
| 7,365,793 | B2 | 4/2008 | Cheatle |
| 7,411,610 | B2 | 8/2008 | Doyle |
| 7,424,218 | B2 | 9/2008 | Baudisch |
| 7,509,041 | B2 | 3/2009 | Hosono |
| 7,533,819 | B2 | 5/2009 | Barkan |
| 7,619,683 | B2 | 11/2009 | Davis |
| 7,738,016 | B2 | 6/2010 | Toyofuku |
| 7,773,121 | B1 | 8/2010 | Huntsberger |
| 7,809,256 | B2 | 10/2010 | Kuroda |
| 7,880,776 | B2 | 2/2011 | LeGall |
| 7,918,398 | B2 | 4/2011 | Li |
| 7,964,835 | B2 | 6/2011 | Olsen |
| 7,978,239 | B2 | 7/2011 | Deever |
| 8,115,825 | B2 | 2/2012 | Culbert |
| 8,149,327 | B2 | 4/2012 | Lin |
| 8,154,610 | B2 | 4/2012 | Jo |
| 8,238,695 | B1 | 8/2012 | Davey |
| 8,274,552 | B2 | 9/2012 | Dahi |
| 8,390,729 | B2 | 3/2013 | Long |
| 8,391,697 | B2 | 3/2013 | Cho |
| 8,400,555 | B1 | 3/2013 | Georgiev |
| 8,439,265 | B2 | 5/2013 | Ferren |
| 8,446,484 | B2 | 5/2013 | Muukki |
| 8,483,452 | B2 | 7/2013 | Ueda |
| 8,514,491 | B2 | 8/2013 | Duparre |
| 8,547,389 | B2 | 10/2013 | Hoppe |
| 8,553,106 | B2 | 10/2013 | Scarff |
| 8,587,691 | B2 | 11/2013 | Takane |
| 8,619,148 | B1 | 12/2013 | Watts |
| 8,752,969 | B1 | 6/2014 | Kane |
| 8,803,990 | B2 | 8/2014 | Smith |
| 8,896,655 | B2 | 11/2014 | Mauchly |
| 8,976,255 | B2 | 3/2015 | Matsuoto |
| 9,019,387 | B2 | 4/2015 | Nakano |
| 9,025,073 | B2 | 5/2015 | Attar |
| 9,025,077 | B2 | 5/2015 | Attar |
| 9,041,835 | B2 | 5/2015 | Honda |
| 9,137,447 | B2 | 9/2015 | Shibuno |
| 9,185,291 | B1 | 11/2015 | Shabtay |
| 9,215,377 | B2 | 12/2015 | Sokeila |
| 9,215,385 | B2 | 12/2015 | Luo |
| 9,270,875 | B2 | 2/2016 | Brisedoux |
| 9,286,680 | B1 | 3/2016 | Jiang |
| 9,344,626 | B2 | 5/2016 | Silverstein |
| 9,360,671 | B1 | 6/2016 | Zhou |
| 9,369,621 | B2 | 6/2016 | Malone |
| 9,413,930 | B2 | 8/2016 | Geerds |
| 9,413,984 | B2 | 8/2016 | Attar |
| 9,420,180 | B2 | 8/2016 | Jin |
| 9,438,792 | B2 | 9/2016 | Nakada |
| 9,485,432 | B1 | 11/2016 | Medasani |
| 9,578,257 | B2 | 2/2017 | Attar |
| 9,618,748 | B2 | 4/2017 | Munger |
| 9,681,057 | B2 | 6/2017 | Attar |
| 9,723,220 | B2 | 8/2017 | Sugie |
| 9,736,365 | B2 | 8/2017 | Laroia |
| 9,736,391 | B2 | 8/2017 | Du |
| 9,768,310 | B2 | 9/2017 | Ahn |

(56) References Cited

U.S. PATENT DOCUMENTS

| | | | |
|---|---|---|---|
| 9,800,798 | B2 | 10/2017 | Ravirala |
| 9,851,803 | B2 | 12/2017 | Fisher |
| 9,869,846 | B1 | 1/2018 | Bone |
| 9,894,287 | B2 | 2/2018 | Qian |
| 9,900,522 | B2 | 2/2018 | Lu |
| 9,927,600 | B2 | 3/2018 | Goldenberg |
| 12,081,856 | B2 * | 9/2024 | Yedid .................... G03B 17/04 |
| 2002/0005902 | A1 | 1/2002 | Yuen |
| 2002/0030163 | A1 | 3/2002 | Zhang |
| 2002/0054214 | A1 | 5/2002 | Yoshikawa |
| 2002/0063711 | A1 | 5/2002 | Park |
| 2002/0075258 | A1 | 6/2002 | Park |
| 2002/0122113 | A1 | 9/2002 | Foote |
| 2002/0136554 | A1 | 9/2002 | Nomura |
| 2002/0167741 | A1 | 11/2002 | Koiwai |
| 2003/0030729 | A1 | 2/2003 | Prentice |
| 2003/0093805 | A1 | 5/2003 | Gin |
| 2003/0156751 | A1 | 8/2003 | Lee |
| 2003/0160886 | A1 | 8/2003 | Misawa |
| 2003/0162564 | A1 | 8/2003 | Kimura |
| 2003/0202113 | A1 | 10/2003 | Yoshikawa |
| 2004/0008773 | A1 | 1/2004 | Itokawa |
| 2004/0012683 | A1 | 1/2004 | Yamasaki |
| 2004/0017386 | A1 | 1/2004 | Liu |
| 2004/0027367 | A1 | 2/2004 | Pilu |
| 2004/0061788 | A1 | 4/2004 | Bateman |
| 2004/0141065 | A1 | 7/2004 | Hara |
| 2004/0141086 | A1 | 7/2004 | Mihara |
| 2004/0189849 | A1 | 9/2004 | Hofer |
| 2004/0227838 | A1 | 11/2004 | Atarashi |
| 2004/0239313 | A1 | 12/2004 | Godkin |
| 2004/0240052 | A1 | 12/2004 | Minefuji |
| 2005/0013509 | A1 | 1/2005 | Samadani |
| 2005/0046740 | A1 | 3/2005 | Davis |
| 2005/0134697 | A1 | 6/2005 | Mikkonen |
| 2005/0141390 | A1 | 6/2005 | Lee |
| 2005/0157184 | A1 | 7/2005 | Nakanishi |
| 2005/0168834 | A1 | 8/2005 | Matsumoto |
| 2005/0185049 | A1 | 8/2005 | Iwai |
| 2005/0200718 | A1 | 9/2005 | Lee |
| 2005/0248667 | A1 | 11/2005 | Schweng |
| 2006/0054782 | A1 | 3/2006 | Olsen |
| 2006/0056056 | A1 | 3/2006 | Ahiska |
| 2006/0067672 | A1 | 3/2006 | Washisu |
| 2006/0102907 | A1 | 5/2006 | Lee |
| 2006/0125937 | A1 | 6/2006 | LeGall |
| 2006/0126737 | A1 | 6/2006 | Boice |
| 2006/0170793 | A1 | 8/2006 | Pasquarette |
| 2006/0175549 | A1 | 8/2006 | Miller |
| 2006/0181619 | A1 | 8/2006 | Liow |
| 2006/0187310 | A1 | 8/2006 | Janson |
| 2006/0187322 | A1 | 8/2006 | Janson |
| 2006/0187338 | A1 | 8/2006 | May |
| 2006/0227236 | A1 | 10/2006 | Pak |
| 2007/0024737 | A1 | 2/2007 | Nakamura |
| 2007/0035631 | A1 | 2/2007 | Ueda |
| 2007/0114990 | A1 | 5/2007 | Godkin |
| 2007/0126911 | A1 | 6/2007 | Nanjo |
| 2007/0127040 | A1 | 6/2007 | Davidovici |
| 2007/0159344 | A1 | 7/2007 | Kisacanin |
| 2007/0177025 | A1 | 8/2007 | Kopet |
| 2007/0188653 | A1 | 8/2007 | Pollock |
| 2007/0189386 | A1 | 8/2007 | Imagawa |
| 2007/0257184 | A1 | 11/2007 | Olsen |
| 2007/0285550 | A1 | 12/2007 | Son |
| 2008/0017557 | A1 | 1/2008 | Witdouck |
| 2008/0024614 | A1 | 1/2008 | Li |
| 2008/0025634 | A1 | 1/2008 | Border |
| 2008/0030592 | A1 | 2/2008 | Border |
| 2008/0030611 | A1 | 2/2008 | Jenkins |
| 2008/0084484 | A1 | 4/2008 | Ochi |
| 2008/0088942 | A1 | 4/2008 | Seo |
| 2008/0106629 | A1 | 5/2008 | Kurtz |
| 2008/0117316 | A1 | 5/2008 | Orimoto |
| 2008/0129831 | A1 | 6/2008 | Cho |
| 2008/0218611 | A1 | 9/2008 | Parulski |
| 2008/0218612 | A1 | 9/2008 | Border |
| 2008/0218613 | A1 | 9/2008 | Janson |
| 2008/0219654 | A1 | 9/2008 | Border |
| 2008/0252998 | A1 | 10/2008 | Miyazawa |
| 2009/0086074 | A1 | 4/2009 | Li |
| 2009/0102948 | A1 | 4/2009 | Scherling |
| 2009/0109556 | A1 | 4/2009 | Shimizu |
| 2009/0122195 | A1 | 5/2009 | van Baar |
| 2009/0122406 | A1 | 5/2009 | Rouvinen |
| 2009/0128644 | A1 | 5/2009 | Camp, Jr. |
| 2009/0168135 | A1 | 7/2009 | Yu |
| 2009/0190909 | A1 | 7/2009 | Mise |
| 2009/0200451 | A1 | 8/2009 | Conners |
| 2009/0219547 | A1 | 9/2009 | Kauhanen |
| 2009/0234542 | A1 | 9/2009 | Orlewski |
| 2009/0252484 | A1 | 10/2009 | Hasuda |
| 2009/0295949 | A1 | 12/2009 | Ojala |
| 2009/0295986 | A1 | 12/2009 | Topliss |
| 2009/0324135 | A1 | 12/2009 | Kondo |
| 2010/0013906 | A1 | 1/2010 | Border |
| 2010/0020221 | A1 | 1/2010 | Tupman |
| 2010/0060746 | A9 | 3/2010 | Olsen |
| 2010/0097444 | A1 | 4/2010 | Lablans |
| 2010/0103194 | A1 | 4/2010 | Chen |
| 2010/0134621 | A1 | 6/2010 | Namkoong |
| 2010/0165131 | A1 | 7/2010 | Makimoto |
| 2010/0196001 | A1 | 8/2010 | Ryynänen |
| 2010/0202068 | A1 | 8/2010 | Ito |
| 2010/0238327 | A1 | 9/2010 | Griffith |
| 2010/0246024 | A1 | 9/2010 | Aoki |
| 2010/0259836 | A1 | 10/2010 | Kang |
| 2010/0265331 | A1 | 10/2010 | Tanaka |
| 2010/0283842 | A1 | 11/2010 | Guissin |
| 2010/0321494 | A1 | 12/2010 | Peterson |
| 2011/0058320 | A1 | 3/2011 | Kim |
| 2011/0063417 | A1 | 3/2011 | Peters, II |
| 2011/0063446 | A1 | 3/2011 | McMordie |
| 2011/0064327 | A1 | 3/2011 | Dagher |
| 2011/0080487 | A1 | 4/2011 | Venkataraman |
| 2011/0121666 | A1 | 5/2011 | Park |
| 2011/0128288 | A1 | 6/2011 | Petrou |
| 2011/0164172 | A1 | 7/2011 | Shintani |
| 2011/0221599 | A1 | 9/2011 | Högasten |
| 2011/0229054 | A1 | 9/2011 | Weston |
| 2011/0234798 | A1 | 9/2011 | Chou |
| 2011/0234853 | A1 | 9/2011 | Hayashi |
| 2011/0234881 | A1 | 9/2011 | Wakabayashi |
| 2011/0242286 | A1 | 10/2011 | Pace |
| 2011/0242355 | A1 | 10/2011 | Goma |
| 2011/0268434 | A1 | 11/2011 | Knoedgen |
| 2011/0285714 | A1 | 11/2011 | Swic |
| 2011/0298966 | A1 | 12/2011 | Kirschstein |
| 2011/0310219 | A1 | 12/2011 | Kim |
| 2012/0014682 | A1 | 1/2012 | David |
| 2012/0026366 | A1 | 2/2012 | Golan |
| 2012/0044372 | A1 | 2/2012 | Côté |
| 2012/0062780 | A1 | 3/2012 | Morihisa |
| 2012/0069235 | A1 | 3/2012 | Imai |
| 2012/0075489 | A1 | 3/2012 | Nishihara |
| 2012/0098927 | A1 | 4/2012 | Sablak |
| 2012/0105579 | A1 | 5/2012 | Jeon |
| 2012/0124525 | A1 | 5/2012 | Kang |
| 2012/0154547 | A1 | 6/2012 | Aizawa |
| 2012/0154614 | A1 | 6/2012 | Moriya |
| 2012/0196648 | A1 | 8/2012 | Havens |
| 2012/0229663 | A1 | 9/2012 | Nelson |
| 2012/0249815 | A1 | 10/2012 | Bohn |
| 2012/0287315 | A1 | 11/2012 | Huang |
| 2012/0320467 | A1 | 12/2012 | Baik |
| 2013/0002928 | A1 | 1/2013 | Imai |
| 2013/0016427 | A1 | 1/2013 | Sugawara |
| 2013/0063629 | A1 | 3/2013 | Webster |
| 2013/0076922 | A1 | 3/2013 | Shihoh |
| 2013/0093842 | A1 | 4/2013 | Yahata |
| 2013/0094126 | A1 | 4/2013 | Rappoport |
| 2013/0113894 | A1 | 5/2013 | Mirlay |
| 2013/0135445 | A1 | 5/2013 | Dahi |
| 2013/0148215 | A1 | 6/2013 | Mori |

(56) References Cited

U.S. PATENT DOCUMENTS

2013/0148854 A1 6/2013 Wang
2013/0155176 A1 6/2013 Paripally
2013/0163085 A1 6/2013 Lim
2013/0182150 A1 7/2013 Asakura
2013/0201360 A1 8/2013 Song
2013/0202273 A1 8/2013 Ouedraogo
2013/0229544 A1 9/2013 Bando
2013/0235224 A1 9/2013 Park
2013/0250150 A1 9/2013 Malone
2013/0258044 A1 10/2013 Betts-Lacroix
2013/0258048 A1 10/2013 Wang
2013/0270419 A1 10/2013 Singh
2013/0278785 A1 10/2013 Nomura
2013/0286221 A1 10/2013 Shechtman
2013/0321668 A1 12/2013 Kamath
2014/0009631 A1 1/2014 Topliss
2014/0049615 A1 2/2014 Uwagawa
2014/0118584 A1 5/2014 Lee
2014/0160311 A1 6/2014 Hwang
2014/0192224 A1 7/2014 Laroia
2014/0192238 A1 7/2014 Attar
2014/0192253 A1 7/2014 Laroia
2014/0218587 A1 8/2014 Shah
2014/0313316 A1 10/2014 Olsson
2014/0362242 A1 12/2014 Takizawa
2014/0376090 A1 12/2014 Terajima
2014/0379103 A1 12/2014 Ishikawa
2015/0002684 A1 1/2015 Kuchiki
2015/0042834 A1* 2/2015 Miao ...................... H04N 23/57
348/262
2015/0042870 A1 2/2015 Chan
2015/0070781 A1 3/2015 Cheng
2015/0086127 A1 3/2015 Camilus
2015/0092066 A1 4/2015 Geiss
2015/0103147 A1 4/2015 Ho
2015/0110345 A1 4/2015 Weichselbaum
2015/0124059 A1 5/2015 Georgiev
2015/0138381 A1 5/2015 Ahn
2015/0145965 A1 5/2015 Livyatan
2015/0154776 A1 6/2015 Zhang
2015/0162048 A1 6/2015 Hirata
2015/0181115 A1 6/2015 Mashiah
2015/0195458 A1 7/2015 Nakayama
2015/0198464 A1 7/2015 El Alami
2015/0215516 A1 7/2015 Dolgin
2015/0237280 A1 8/2015 Choi
2015/0242994 A1 8/2015 Shen
2015/0244906 A1 8/2015 Wu
2015/0253543 A1 9/2015 Mercado
2015/0253647 A1 9/2015 Mercado
2015/0261299 A1 9/2015 Wajs
2015/0271471 A1 9/2015 Hsieh
2015/0281678 A1 10/2015 Park
2015/0286033 A1 10/2015 Osborne
2015/0288865 A1 10/2015 Osborne
2015/0296112 A1 10/2015 Park
2015/0316744 A1 11/2015 Chen
2015/0334309 A1 11/2015 Peng
2016/0028949 A1 1/2016 Lee
2016/0044250 A1 2/2016 Shabtay
2016/0070088 A1 3/2016 Koguchi
2016/0154066 A1 6/2016 Hioka
2016/0154197 A1 6/2016 Shishido
2016/0154202 A1 6/2016 Wippermann
2016/0154204 A1 6/2016 Lim
2016/0212358 A1 7/2016 Shikata
2016/0212418 A1 7/2016 Demirdjian
2016/0238834 A1 8/2016 Erlich
2016/0241751 A1 8/2016 Park
2016/0245669 A1 8/2016 Nomura
2016/0291295 A1 10/2016 Shabtay
2016/0295112 A1 10/2016 Georgiev
2016/0301840 A1 10/2016 Du
2016/0301868 A1 10/2016 Acharya
2016/0342095 A1 11/2016 Bieling
2016/0353008 A1 12/2016 Osborne
2016/0353012 A1 12/2016 Kao
2016/0381289 A1 12/2016 Kim
2017/0001577 A1 1/2017 Seagraves
2017/0019616 A1 1/2017 Zhu
2017/0070731 A1 3/2017 Darling
2017/0094187 A1 3/2017 Sharma
2017/0115466 A1 4/2017 Murakami
2017/0124987 A1 5/2017 Kim
2017/0150061 A1 5/2017 Shabtay
2017/0176711 A1 6/2017 Iwasaki
2017/0187962 A1 6/2017 Lee
2017/0214846 A1 7/2017 Du
2017/0214866 A1 7/2017 Zhu
2017/0219749 A1 8/2017 Hou
2017/0242225 A1 8/2017 Fiske
2017/0276954 A1 9/2017 Bajorins
2017/0289458 A1 10/2017 Song
2017/0294002 A1 10/2017 Jia
2017/0329111 A1 11/2017 Hu
2018/0003925 A1 1/2018 Shmunk
2018/0013944 A1 1/2018 Evans, V
2018/0017844 A1 1/2018 Yu
2018/0024329 A1 1/2018 Goldenberg
2018/0052385 A1* 2/2018 Juhola ................... G02B 7/025
2018/0059379 A1 3/2018 Chou
2018/0109660 A1 4/2018 Yoon
2018/0109710 A1 4/2018 Lee
2018/0120674 A1 5/2018 Avivi
2018/0150973 A1 5/2018 Tang
2018/0176426 A1 6/2018 Wei
2018/0183982 A1 6/2018 Lee
2018/0184010 A1 6/2018 Cohen
2018/0198897 A1 7/2018 Tang
2018/0216925 A1 8/2018 Yasuda
2018/0241922 A1 8/2018 Baldwin
2018/0249090 A1 8/2018 Nakagawa
2018/0295292 A1 10/2018 Lee
2018/0300901 A1 10/2018 Wakai
2018/0307005 A1 10/2018 Price
2018/0329281 A1 11/2018 Ye
2018/0368656 A1 12/2018 Austin
2019/0089941 A1 3/2019 Bigioi
2019/0096047 A1 3/2019 Ogasawara
2019/0100156 A1 4/2019 Chung
2019/0121103 A1 4/2019 Bachar
2019/0121216 A1 4/2019 Shabtay
2019/0130822 A1 5/2019 Jung
2019/0154466 A1 5/2019 Fletcher
2019/0213712 A1 7/2019 Shoa Hassani Lashdan
2019/0215440 A1 7/2019 Rivard
2019/0222758 A1 7/2019 Goldenberg
2019/0227338 A1 7/2019 Bachar
2019/0228562 A1 7/2019 Song
2019/0297238 A1 9/2019 Klosterman
2019/0320119 A1 10/2019 Miyoshi
2020/0014912 A1 1/2020 Kytsun
2020/0092486 A1 3/2020 Guo
2020/0103726 A1 4/2020 Shabtay
2020/0104034 A1 4/2020 Lee
2020/0118287 A1 4/2020 Hsieh
2020/0134848 A1 4/2020 El-Khamy
2020/0162682 A1 5/2020 Cheng
2020/0221026 A1 7/2020 Fridman
2020/0264403 A1 8/2020 Bachar
2020/0389580 A1 12/2020 Kodama
2021/0018718 A1 1/2021 Ryoo
2021/0180989 A1 6/2021 Fukumura
2021/0208415 A1 7/2021 Goldenberg
2021/0333521 A9 10/2021 Yedid
2021/0368104 A1 11/2021 Bian
2022/0252963 A1 8/2022 Shabtay
2022/0368814 A1 11/2022 Topliss

FOREIGN PATENT DOCUMENTS

CN 101688964 A 3/2010
CN 201514511 U 6/2010
CN 102130567 A 7/2011

(56) References Cited

FOREIGN PATENT DOCUMENTS

| | | | | |
|---|---|---|---|---|
| CN | 102215373 | A | 10/2011 | |
| CN | 102654630 | A | 9/2012 | |
| CN | 102739949 | A | 10/2012 | |
| CN | 102982518 | A | 3/2013 | |
| CN | 103024272 | A | 4/2013 | |
| CN | 203406908 | U | 1/2014 | |
| CN | 203482298 | U | 3/2014 | |
| CN | 103841404 | A | 6/2014 | |
| CN | 103969915 | A | 8/2014 | |
| CN | 204422947 | U | 6/2015 | |
| CN | 205301703 | U | 6/2016 | |
| CN | 105827903 | A | 8/2016 | |
| CN | 105847662 | A | 8/2016 | |
| CN | 106461906 | A | 2/2017 | |
| CN | 107608052 | A | 1/2018 | |
| CN | 107682489 | A | 2/2018 | |
| CN | 109729266 | A | 5/2019 | |
| CN | 112333351 | A | 2/2021 | |
| EP | 1536633 | A1 | 6/2005 | |
| EP | 1780567 | A1 | 5/2007 | |
| EP | 2523450 | A1 | 11/2012 | |
| JP | S59191146 | A | 10/1984 | |
| JP | H07318864 | A | 12/1995 | |
| JP | 2002010276 | A | 1/2002 | |
| JP | 2003298920 | A | 10/2003 | |
| JP | 2003304024 | A | 10/2003 | |
| JP | 2004056779 | A | 2/2004 | |
| JP | 2004133054 | A | 4/2004 | |
| JP | 2004245982 | A | 9/2004 | |
| JP | 2005099265 | A | 4/2005 | |
| JP | 2005122084 | A | 5/2005 | |
| JP | 2005321592 | A | 11/2005 | |
| JP | 2006038891 | A | 2/2006 | |
| JP | 2006191411 | A | 7/2006 | |
| JP | 2006237914 | A | 9/2006 | |
| JP | 2006238325 | A | 9/2006 | |
| JP | 2007086808 | A | 4/2007 | |
| JP | 2007228006 | A | 9/2007 | |
| JP | 2007306282 | A | 11/2007 | |
| JP | 2008076485 | A | 4/2008 | |
| JP | 2008083377 | A | 4/2008 | |
| JP | 2008245142 | A | 10/2008 | |
| JP | 2008271026 | A | 11/2008 | |
| JP | 4211230 | B2 | 1/2009 | |
| JP | 2010204341 | A | 9/2010 | |
| JP | 2011055246 | A | 3/2011 | |
| JP | 2011085666 | A | 4/2011 | |
| JP | 2011138407 | A | 7/2011 | |
| JP | 2011203283 | A | 10/2011 | |
| JP | 2012132739 | A | 7/2012 | |
| JP | 2013101213 | A | 5/2013 | |
| JP | 2013106289 | A | 5/2013 | |
| JP | 2016105577 | A | 6/2016 | |
| JP | 2017146440 | A | 8/2017 | |
| JP | 2018022123 | A | 2/2018 | |
| JP | 2019126179 | A | 7/2019 | |
| KR | 20070005946 | A | 1/2007 | |
| KR | 20090058229 | A | 6/2009 | |
| KR | 20100008936 | A | 1/2010 | |
| KR | 20110080590 | A | 7/2011 | |
| KR | 20110082494 | A | 7/2011 | |
| KR | 20130085116 | A | 7/2013 | |
| KR | 20130104764 | A | 9/2013 | |
| KR | 1020130135805 | A | 12/2013 | |
| KR | 20140014787 | A | 2/2014 | |
| KR | 101428042 | B1 | 8/2014 | |
| KR | 101477178 | B1 | 12/2014 | |
| KR | 20140144126 | A | 12/2014 | |
| KR | 20150118012 | A | 10/2015 | |
| KR | 20170105236 | A | 9/2017 | |
| KR | 20180120894 | A | 11/2018 | |
| KR | 20200099745 | A | 8/2020 | |
| TW | I407177 | B | 9/2013 | |
| TW | I448768 | B | 8/2014 | |
| WO | 2000027131 | A2 | 5/2000 | |
| WO | 2004084542 | A1 | 9/2004 | |
| WO | 2006008805 | A1 | 1/2006 | |
| WO | 2010122841 | A1 | 10/2010 | |
| WO | 2014072818 | A2 | 5/2014 | |
| WO | 2017025822 | A1 | 2/2017 | |
| WO | 2017037688 | A1 | 3/2017 | |
| WO | 2018130898 | A1 | 7/2018 | |
| WO | WO-2020172975 | A1 * | 9/2020 | ............. H04N 23/50 |

OTHER PUBLICATIONS

Compact multi-aperture imaging with high angular resolution, Santacana et al., Publisher: Optical Society of America, 2015, 10 pages.
Defocus Video Matting, McGuire et al., Publisher: ACM SIGGRAPH, Jul. 31, 2005, 11 pages.
Dual camera intelligent sensor for high definition 360 degrees surveillance, Scotti et al., Publisher: IET, May 9, 2000, 8 pages.
Dual-Camera System for Multi-Level Activity Recognition, Bodor et al., Publisher: IEEE, Oct. 2014, 6 pages.
Dual-sensor foveated imaging system, Hua et al., Publisher: Optical Society of America, Jan. 14, 2008, 11 pages.
Engineered to the task: Why camera-phone cameras are different, Giles Humpston, Publisher: Solid State Technology, Jun. 2009, 3 pages.
High Performance Imaging Using Large Camera Arrays, Wilburn et al., Publisher: Association for Computing Machinery, Inc., 2005, 12 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Optical Splitting Trees for High-Precision Monocular Imaging, McGuire et al., Publisher: IEEE, 2007, 11 pages.
Real-time Edge-Aware Image Processing with the Bilateral Grid, Chen et al., Publisher: ACM SIGGRAPH, 2007, 9 pages.
Statistical Modeling and Performance Characterization of a Real-Time Dual Camera Surveillance System, Greienhagen et al., Publisher: IEEE, 2000, 8 pages.
Superimposed multi-resolution imaging, Carles et al., Publisher: Optical Society of America, 2017, 13 pages.
Super-resolution imaging using a camera array, Santacana et al., Publisher: Optical Society of America, 2014, 6 pages.
Viewfinder Alignment, Adams et al., Publisher: Eurographics, 2008, 10 pages.
"Zitova Bet Al: "Image Registration Methods: A Survey"", Image and Vision Computing, Elsevier, Guildford, GB, vol. 21, nc. 11, Oct. 1, 2003 (Oct. 1, 2003), pp. 977-1000, XPOOi 189327, ISSN: 0262-8856.

* cited by examiner

SYSTEMS FOR POP-OUT CAMERA

CROSS REFERENCE TO RELATED APPLICATIONS

This is a continuation from U.S. patent application Ser. No. 18/793,816 filed Aug. 4, 2024 (now allowed), which is a continuation from U.S. patent application Ser. No. 17/928,328 filed Nov. 29, 2022 (now granted as U.S. Pat. No. 12,081,856), which was a 371 application from international patent application PCT/IB2022/052194 filed Mar. 11, 2022, which claims the benefit of priority from U.S. Provisional patent applications Nos. 63/159,660 filed Mar. 11, 2021, 63/230,972 filed Aug. 19, 2021, 63/276,072 filed Nov. 5, 2021, 63/280,244 filed Nov. 17, 2021, 63/280,732 filed Nov. 18, 2021, 63/285,144 filed Dec. 2, 2021, and 63/298,335 filed Jan. 11, 2022, all of which are incorporated herein by reference in their entirety.

FIELD

The present disclosure relates generally to the field of digital cameras. More particularly, the present disclosure relates to digital cameras with pop-out assemblies.

BACKGROUND

Camera modules of smartphones and tablet computers typically need to have a low thickness—be slim—in order to fit into the casing of these devices. A measure of "slimness" is generally referred to in the art by the term "total-track-length" or TTL. The TTL is generally defined by a distance from an outermost lens to an image sensor of camera module as shown in FIG. 1A.

Enhancing the performance of a camera may involve, inter alia, enlarging dimensions of the image sensor. Benefits of larger image sensors include improved low-light performance, better resolution, and higher color fidelity. However, enlarging the dimensions of the image sensor requires increasing the TTL of the module to keep a similar Field of View (FOV). Indeed, for a rectangular image sensor having a diagonal length S, the size of the image sensor, the field-of-view (FOV) and an effective focal length (EFL) are linked by the following relation as illustrated in FIG. 1B:

$$\tan\left(\frac{FOV}{2}\right) = \frac{S}{2 \cdot EFL}$$

Therefore, in order to not reduce the FOV, increasing a diagonal length S of the image sensor requires increasing the EFL. Since EFL<TTL, increasing the EFL implies increasing the TTL. The need to increase the TTL conflicts with the aforementioned requirement for low thickness and represents a technical challenge.

Standard techniques to address this challenge involve a camera module with a pop-out assembly configured to switch a camera module between a collapsed state—in which the camera module is inactive—and an extended state—in which the camera is active. An example of such technique is for example disclosed in co-owned International Patent Publication WO2021/059097. This pop-out technique enables to increase the TTL only when the camera is in use and to reduce the TTL when the camera is not in use. It is observed that the slimness is required only when the camera is inactive e.g., when a smartphone is in a pocket. Thus, making the module extendible and collapsible on request bridges the conflicting requirements.

SUMMARY

In accordance with a first aspect of the presently disclosed subject matter, there is provided a camera module for use in a portable electronic device, the camera module comprising: a lens barrel comprising an objective assembly holding coaxially one or more lens elements defining an optical axis, the lens barrel being configured to axially move between an operative state and a collapsed state; a cover window arranged over the lens barrel and configured to be axially movable between a retracted position and an extended position; an actuator including a driving motor; a cover window pop-out assembly actuatable by the actuator, the pop-out assembly including a driving cam configured to be driven rotationally by the driving motor, the driving cam being coupled to the cover window so that a rotation of the driving cam causes the cover window to axially move between the retracted position and the extended position; a carrier configured to receive the lens barrel (optionally concentrically); a barrel pop-out assembly configured to cause the lens barrel to axially move from the collapsed state to the operative state; and an image sensor configured to image a field of view of the objective assembly when the lens barrel is in the operative state.

Unless stated otherwise, all actuators mentioned in this description are pop-out actuators operative to pop-out a camera lens, lens barrel or another camera part.

In addition to the above features, a camera module according to this aspect of the presently disclosed subject matter can optionally comprise one or more of features (i) to (xlv) below, in any technically possible combination or permutation:

i. the cover window is configured so as to push the lens barrel into the collapsing state when the lens barrel is in the operative state and when the cover window is operated by the cover window pop-out assembly to move from the extended position to the retracted position;

ii. a back housing configured to accommodate the camera module, and a front housing configured to maintain axially the driving cam on the back housing while allowing rotation of the driving cam;

iii. a front ball bearing coupling between the front housing and the driving cam, and/or a back ball bearing between the driving cam and the back housing;

iv. the barrel pop-out assembly and the cover window pop-out assembly being coordinated;

v. a protective seal configured to maintain impermeability of the camera module;

vi. one or more static lens elements arranged to be static relative to the back housing;

vii. the actuator m a worm screw configured to be powered by the driving motor, and a worm wheel coupled to the worm screw and to the driving cam so that a rotation of the worm screw rotates the driving cam;

viii. the carrier is coupled to the driving cam so that a rotation of the driving cam causes the carrier to axially move, and the cover window is fixedly coupled to the carrier so that an axial movement of the carrier moves the cover window between the retracted position and the extended position;

ix. the carrier is coupled to the driving cam to form a helical cam mechanism, and the barrel pop-out assembly includes a fixed coupling between the lens barrel and the carrier so that a rotation of the driving cam causes the carrier to move the lens barrel between the collapsed state and the operative state;

x. the driving cam and the worm wheel are friction coupled, the coupling being configured to be overcome when a collapsing force larger than a predefined threshold is applied on the carrier;

xi. at least one cam helical groove in the driving cam is configured to cooperate with at least one carrier helical groove in the carrier so as to enclose a corresponding at least one bearing ball capable of transferring movement from the driving cam to the carrier;

xii. the carrier comprises a carrier barrel and the at least one carrier helical groove is formed on an outer surface of the carrier barrel;

xiii. the driving cam comprises a cam barrel outwardly concentric to the carrier barrel, and the at least one cam helical groove is formed on an inner surface of the cam barrel;

xiv. the back housing includes one or more housing axial grooves configured to cooperate with one or more carrier axial grooves in the carrier, so as to enclose corresponding one or more alignment bearing balls capable of maintaining a concentricity of the carrier relative to the back housing;

xv. the carrier comprises a carrier barrel, and the one or more axial grooves are formed on an inner surface of the carrier barrel;

xvi. the back housing comprises a central barrel, and the one or more housing axial grooves are formed on an outer surface of the central barrel;

xvii. the camera module comprises a preloaded spring configured to bias the carrier to prevent backlash;

xviii. the carrier comprises a carrier barrel, and the driving cam comprises a cam barrel outwardly concentric to the carrier barrel, one or more emergency pins projecting radially outwardly from the carrier barrel and cooperating with corresponding one or more emergency helical grooves in the cam barrel, such that the one or more emergency pins engage the one or more emergency helical grooves only when a collapsing force larger than a predefined threshold is applied axially on the carrier;

xix. the camera module comprises a back housing configured for accommodating the camera module, and the driving cam comprises at least one radial pin engaging the carrier by protruding through at least one corresponding helical groove in the carrier, thereby enabling axial movement of the carrier when the driving cam is rotated, the at least one pin also protruding through at least one corresponding axial groove in the back housing to maintain concentricity of the carrier relative to the housing;

xx. the actuator further comprises a worm screw configured to be powered by the driving motor, a worm wheel coupled the worm screw and to the driving cam so that a rotation of the worm screw rotates the driving cam wherein the worm wheel is integral with the driving cam;

xxi. the carrier is spring loaded to prevent backlash and to absorb mechanical shock;

xxii. the spring further causes the decoupling of the actuator from the driving cam in the event of mechanical shock, and further recouples the actuator and the driving cam after the cease of the shock;

xxiii. the actuator comprises a worm screw configured to be powered by the driving motor, a worm wheel coupled the worm screw and to the driving cam so that a rotation of the worm screw rotates the driving cam and an intermediate gear between the worm screw and the worm wheel;

xxiv. the worm screw is configured to slide along a shaft, and the actuator includes a spring loading the worm screw to prevent backlash and optionally to absorb mechanical shock;

xxv. at least one of the lens elements in the objective assembly is cut to form a D-cut lens, thereby freeing a D-cut volume;

xxvi. 10% to 30% of the optical height of the D-cut lens is removed;

xxvii. a shape of the lens barrel shape conforms to the D-cut lens so that the D-cut volume is freed between the barrel and the carrier;

xxviii. the camera module further comprising an auto-focus (AF) module integrated in the D-cut volume;

xxix. a difference between the diameter of the lens barrel and the diameter of the carrier is less than 3 mm, optionally less than 1 mm;

xxx. the AF module comprises an axial coupling provided between the lens barrel and the carrier so that the lens barrel is axially movable relative to the carrier;

xxxi. the AF module further comprises a permanent magnet fixed to an outer wall of the lens barrel; an electrical coil fixed to an inner wall of the carrier, wherein the electrical coil is configured so that, when the lens barrel is in the operative state, a current in the electrical coil is capable of inducing axial forces on the permanent magnet, thereby causing axial movement of the lens barrel and enabling auto-focus capability of the camera module;

xxxii. the permanent magnet and electrical coil form the barrel pop-out assembly and are further configured so that a current in the electrical coil is capable of inducing axial forces on the permanent magnet to bring the lens barrel from the collapsed state to the operative state when the cover window moves from the retracted position into the extended position;

xxxiii. the carrier includes a stopper configured to limit a collapsing motion of the barrel relative to the carrier;

xxxiv. the relative movement between the carrier and the barrel caused by the AF module is in the range of 0.1 mm to 5 mm;

xxxv. the AF module further includes a driving circuitry configured to operate the AF module and a position sensor to determine a position of the lens barrel relative to the carrier;

xxxvi. the AF module further comprises a printed circuit board (PCB) fixed to the inner wall of the carrier, the driving circuitry and electrical coil being mounted on the PCB;

xxxvii. the AF module further comprises a current supply wiring for supplying current to the AF module, the current supply wiring being embedded in a flexure including wires for electrical routing;

xxxviii. the flexure having a stiffness below a predefined threshold;

xxxix. the cover window is configured so as to provide an axial gap between the lens barrel in the operative state and the cover window in the extended position;

xl. the barrel pop-out assembly comprises a biasing mechanism configured to cause the lens barrel to move into the operative state (or at least towards the operative state into an auto-focus range) when the lens barrel is in the collapsed state;

xli. the cover window is configured so as to push the lens barrel into the collapsing state when the lens barrel is in the operative state, and the cover window is operated by the cover window pop-out assembly to move from the extended position to the retracted position;

xlii. the cover window is configured for holding the lens barrel in the collapsed state when it is in the retracted position;

xliii. the cover window is configured to release the biasing mechanism when it is operated from the retracted position to the extended position;

xliv. the biasing mechanism includes a compression spring;

xlv. the biasing mechanism includes a magnetic spring.

In accordance with another aspect of the presently disclosed subject matter, there is provided a camera module comprising a lens barrel comprising an objective assembly holding coaxially one or more lens elements defining an optical axis, the lens barrel having an operative state and a collapsed state; a carrier configured to receive the lens barrel, the lens barrel being axially movable relative to the carrier; a magnetic spring assembly comprising: at least one permanent magnet fixed to the lens barrel; a ferromagnetic yoke fixed to the carrier, wherein the magnetic spring is configured to cause the lens barrel to axially move relative to the carrier from the collapsed state towards the operative state; and an image sensor configured to image a field of view of the objective assembly when the lens barrel is in the operative state.

In addition to the above features, the camera module according to this aspect of the presently disclosed subject matter can optionally comprise one or more of features (i) to (xxiii) below and respective sub-features, in any technically possible combination or permutation:

i. the permanent magnet is fixed to an outer wall of the lens barrel;

ii. the movement caused by the ferromagnetic yoke and permanent magnet interaction is in the range of 0.5 mm to 10 mm;

iii. a pop-out stroke of the lens barrel is larger than 10%, 15%, 20% or 30% of a height of the camera module in the collapsed state;

iv. a pop-out stroke of the lens barrel is smaller than half of the height of the camera module in the collapsed state;

v. the camera module further comprises a retractable cover window arranged over the lens barrel and axially movable relative to the carrier between a retracted position and an extended position, the retractable cover window being configured to, in the retracted position, hold the lens barrel in the collapsed position; in the extended position to provide for an axial gap between the lens barrel in the operative state and the cover window in the extended position;

vi. the retractable cover window is configured to cause the lens barrel to move from the operative state to the collapsed state when the cover window is moved from the extended position to the retracted position;

vii. the retractable cover window is configured to push the lens barrel into the collapsing state when the lens barrel is in the operative state, and the cover window is operated by the cover window pop-out assembly to move from the extended position to the retracted position viii. the camera module includes a cover window pop-out assembly configured to controllably move the cover window from the retracted position to the extended position;

ix. the magnetic spring is further configured to participate in maintaining the barrel in the operative state;

x. the lens barrel and the carrier are axially coupled using at least one or more axial rails and one or more corresponding bearing balls enclosed therebetween;

xi. at least one of the lenses in the objective assembly is cut to form a D-cut lens, thereby freeing a D-cut volume;

xii. 10% to 30% of the optical height of the D-cut lens is removed;

xiii. a shape of the lens barrel shape conforms to the D-cut lens so that the D-cut volume is freed between the barrel and the carrier;

xiv. the camera module further comprises an AF module integrated in the D-cut volume;

xv. a difference between the diameter of the lens barrel and the diameter of the carrier, is less than 3 mm, optionally less than 1 mm;

xvi. the AF module comprises at least one electrical coil fixed to an inner wall of the carrier; wherein the electrical coil is configured so that, when the lens barrel moves towards the operative state into an auto-focus range, a current in the at least one electrical coil is capable of inducing axial forces on the at least one permanent magnet, thereby causing axial movement of the lens barrel to the operative state and enabling auto-focus capability of the camera module;

xvii. the axial movement caused by the AF module is in the range of 0.5 mm to 2.5 mm;

xviii. the AF module further comprises a driving circuitry configured to operate the AF module and a position sensor to determine a position of the lens barrel;

xix. the AF module further comprises a PCB fixed to the inner wall of the carrier, the driving circuitry and electrical coil being mounted on the PCB;

xx. the AF module further comprises a current supply wiring for supplying current to the AF module, the current supply wiring being embedded in a flexure including wires for electrical routing;

xxi. the flexure has a stiffness below a predefined threshold;

xxii. the camera module further comprises an optical image stabilization (OIS) system configured to move the image sensor;

xxiii. the camera module further comprises an OIS system according to the third aspect of the present disclosure.

In accordance with another aspect of the presently disclosed subject matter, there is provided an optical image stabilization (OIS) system for use in a camera module for allowing movement of a lens barrel in a plane parallel to an image sensor of the camera module, the OIS system forming a layered structure comprising: a bottom frame configured to be mounted on a circuit board, an intermediate frame mounted on the bottom frame and axially coupled thereto so as to be axially shiftable relative to the bottom frame in a first axial direction parallel to a PCB plane; a top frame configured to be fixedly coupled to a carrier of the camera module, the top frame being mounted on the intermediate frame and axially coupled thereto so as to be axially shiftable relative to the intermediate frame in a second axial direction transverse to the first axial direction and parallel to the PCB plane; and a first and second induction motors configured to controllably drive axial movement of the intermediate frame in the first axial direction and of the top frame in the second axial direction.

In accordance with another aspect of the presently disclosed subject matter, there is provided a camera module comprising a lens barrel comprising an objective assembly holding coaxially one or more lens element defining an optical axis, the lens barrel being configured to axially move between an operative state and a collapsed state; a carrier configured to concentrically receive the lens barrel, the lens barrel being axially movable relative to the carrier; an image sensor configured to image a field of view of the objective assembly when the lens barrel is in the operative state; an AF module comprising a induction motor producing linear motion positioned in a radial interstice between the carrier and the lens barrel and configured to cause axial movement of the lens barrel relative to the carrier to enable auto-focus capability when the lens barrel is in the operative state; an OIS system for allowing movement of the lens barrel in a plane parallel to the image sensor the OIS system forming a layered structure comprising: a bottom frame configured to be fixed relative to the image sensor, an intermediate frame mounted on the bottom frame and axially coupled thereto so as to be axially shiftable relative to the bottom frame in a first axial direction parallel to the image sensor; a top frame fixedly coupled to the carrier, the top frame being mounted on the intermediate frame and axially coupled thereto so as to be axially shiftable relative to the intermediate frame in a second axial direction transverse to the first axial direction and parallel to the PCB plane; a first and second OIS induction motors configured to controllably drive axial movement of the intermediate frame in the first axial direction and of the top frame in the second axial direction.

In addition to the above features, the camera module according to this aspect of the presently disclosed subject matter can optionally comprise one or more of features (i) to (xiii) below and respective sub-features, in any technically possible combination or permutation:

i. a PCB, wherein the first and second OIS induction motors include a first and second electrical coils mounted on the PCB;
ii. the image sensor is mounted on the PCB;
iii. the top frame is coupled to a base of the carrier;
iv. the coupling between the bottom frame and the intermediate frame and coupling between the intermediate frame and the top frame are formed by a first and second sets of rails respectively enabling axial shifting of the top frame on the intermediate frame along the first magnetic axis and axial shifting of the intermediate frame on the bottom frame along the second magnetic axis;
v. at least one of the first and second sets of rails further encloses bearing balls;
vi. a barrel pop-out assembly configured to drive the barrel between the collapsed state and operative state;
vii. a retractable cover window arranged over the lens barrel and axially movable relative to the carrier between a retracted position and an extended position;
viii. wherein a height of the OIS system is less than 50%, less than 30%, less than 25% or less than 15% of the height of the camera module in the collapsed state;
ix. a current supply wiring for supplying current to the AF module, the current supply wiring being embedded in a flexure including wires for electrical routing, the flexure being carried onto the top frame and the carrier including through holes for the flexure to reach the AF module;
x. a pop-out stroke of the lens barrel is larger 10%, 15%, 20% or 30% of a height of the camera module in the collapsed state;
xi. a pop-out stroke of the lens barrel is smaller than half of the height of the camera module in the collapsed state;
xii. an optical filter configured for filtering out a predetermined portion of the electromagnetic spectrum detectable by the image sensor;
xiii. the objective assembly includes four or more lenses.

In accordance with another aspect of the presently disclosed subject matter, there is provided an electronic portable device comprising a camera module according to any of the preceding aspects.

In accordance with another aspect of the presently disclosed subject matter, there is provided a camera module for use in a portable electronic device, camera module comprising: a lens barrel comprising an objective assembly holding coaxially one or more lens elements defining an optical axis, the lens barrel being configured to be axially movable between an operative state and a collapsed state; an actuator including a driving motor; a cover window pop-out assembly actuatable by the actuator, the pop-out assembly including a driving cam configured to be driven rotationally by the driving motor, the driving cam being coupled to the cover window so that a rotation of the driving cam causes the cover window to axially move between the retracted position and the extended position; a carrier configured to receive the lens barrel concentrically; the window pop-out assembly configured to push the lens barrel to axially move from the collapsed state to the operative state, so that a height of the window pop-out assembly is defined; and an image sensor configured to image a field of view of the objective assembly when the lens barrel is in the operative state. Additionally, in the pop-out state the window pop-out assembly may not be in contact with the lens barrel.

In the present disclosure, the following terms and their derivatives may be understood according to the below explanations:

The term "Total Track Length" (TTL) may refer to the maximal distance measured along an axis parallel to the optical axis of the camera module, between a point of a front surface of a most distal lens element and an image sensor of the camera module, when the camera module is at infinity focus. The height of the camera module may be greater than the TTL as it may generally include additionally a back housing and a cover window.

The term "horizontal plane", "XY plane" or "sensor plane" may refer to a plane which is parallel to an image sensor of the camera module. The term "vertical" may refer to the direction which is perpendicular to the horizontal sensor plane. An optical axis of the camera module may extend parallel to the vertical axis and may by extension be referred to as the Z-axis.

The terms "above/below", "upper/lower", "top/bottom" may refer to differences in Z-coordinates. The terms "height" and "depth" refer to vertical distances (in the Z-direction), while "width" and "length" refer to horizontal distances (in either the X-direction or the Y-direction). Terms such as "vertical" or "horizontal" do not imply anything about the orientation of the camera module when the camera module is in use. The camera module may be oriented in any suitable direction during usage or manufacturing, for example sideways.

The terms "inner" and "outer" and their derivatives such as "inward" and "outward" may be defined with reference to an optical axis of the camera module, wherein an element which is closer to the optical axis than another element is referred to as inner while referred to as outer if it is farther. Similarly, an inner surface or wall of an element is defined as a surface closer to the optical axis than an outer surface of the same element.

The terms "proximal" and "distal" may be used to refer to a relative proximity to the image sensor along the Z axis. An element may be referred to as distal if it is further away from the sensor than another element which can then be referred to as proximal.

The term "coupling" may refer to a mechanical connection between two (or more) elements enabling transmission of movement from one element to another element. The term coupling may encompass direct connection (abutment) between elements of indirect connection (linkage). For example, an axial coupling may refer to a mechanical connection allowing two elements to axially move relative to each other. A fixed coupling between two elements may refer to a connection such that any movement of one element is transmitted into a same movement of the other element e.g. the two elements are attached to each other.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1A:
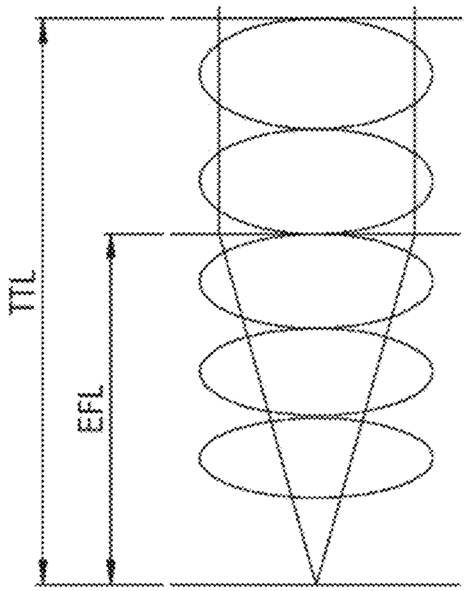
FIGS. 1A-1B, already described, illustrate schematically definitions of various terms such as TTL and EFL used throughout the present disclosure.
Figure 1B:
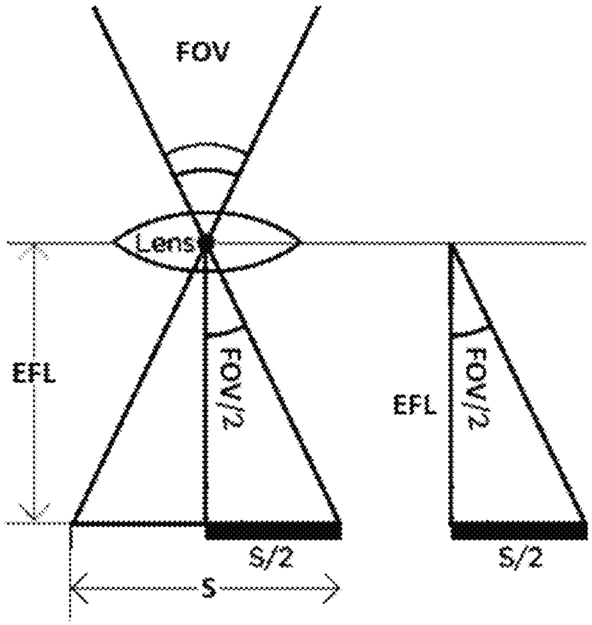
Figure 2A:
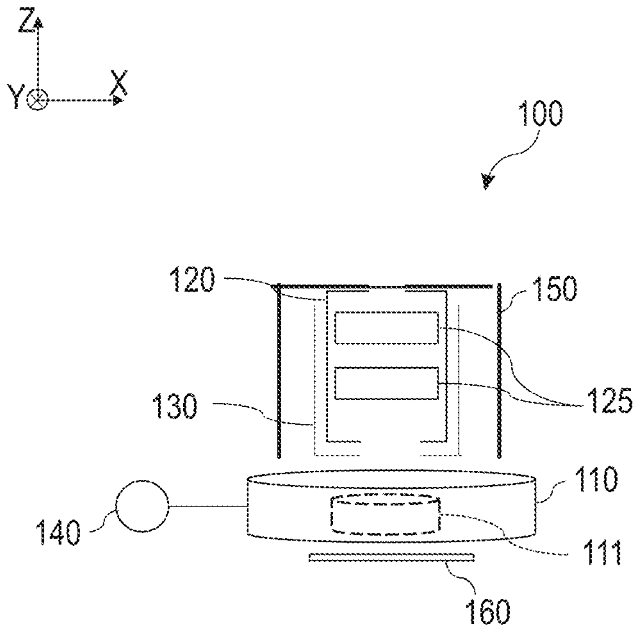
FIGS. 2A-2B show a schematic drawing of a general camera module according to some embodiments of a first aspect of the present disclosure, respectively in an inactive mode and in an active mode.
Figure 2B:
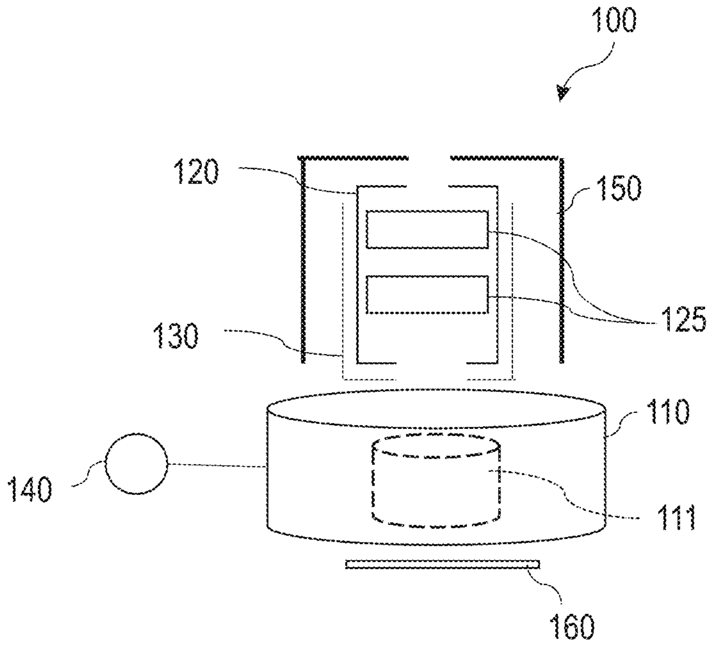

FIGS. 2A-2B show a schematic drawing of a camera module 100 according to general embodiments of the first aspect of the present disclosure, respectively in a inactive mode and in an active mode. Camera module 100 may be included in a portable electronic device such as a smartphone, a tablet, a PDA and the like.

Camera module 100 comprises a lens barrel 120, a carrier 130 configured to receive coaxially lens barrel 120 and an image sensor 160. Lens barrel 120 comprises an objective assembly holding coaxially one or more lens elements 125 defining an optical axis Z of the camera module. Camera module 100 further comprises a retractable cover window 150. Carrier 130 may be configured to form a sleeve around lens barrel 120. Cover window 150 may generally include a protective surface having an aperture, preferably centrally located on the protective surface. The aperture may be closed by a sealing element allowing light to pass therethrough. The protective surface of cover window 150 may be exposed to an outside environment i.e. be the most distal element of camera module 100 from image sensor 160. Cover window 150 may be configured to be axially movable between a retracted position and an extended position corresponding respectively to a proximal axial position and a distal axial position of the cover window relative to image sensor 160. Lens barrel 120 also has an operative state and a collapsed state corresponding respectively to a proximal axial position and a distal axial position of the lens barrel relative to image sensor 160. In the operative state of the lens barrel, image sensor 160 may be positioned in a focal plane or in an imaging plane of the objective assembly. In an active mode of the camera module, cover window 150 may be in the extended position and lens barrel 120 may be in the operative state while in an inactive mode of the camera module, cover window 150 may be in a retracted position the lens barrel 120 may be in a collapsed state. The motion of cover window 150 and lens barrel 120 between the retracted/extended positions and collapsed/operative state may be coordinated to allow camera module 100 to selectively be operated in the active or inactive mode. Camera module 100 may include a coordinating mechanism/controller for coordinating the motion of the cover window and lens barrel. In the inactive mode, the camera module may be disabled i.e. the camera module may be unable to image a field of view of the objective assembly. The active mode corresponds to a pop-out state of camera module 100 in which a TTL of the camera module (and a module height) is higher than the TTL of the camera module (and the module height) in the collapsed state (also referred to as cTTL).

In the retracted position, cover window 150 may be positioned in close proximity to a most distal surface of lens barrel 120 in the collapsed state. In some embodiments, cover window 120 in the retracted position may abut on the most distal surface (e.g. a rim) of lens barrel 120 in the collapsed state. In the extended position, cover window 150 may be positioned to provide for an axial gap with lens barrel 120 in the operative state. A difference in height of camera module 100, between the extended state and the collapsed state may be larger than 10%, larger than 20%, or larger than 30% of the height of the camera module in the collapsed state. Camera module 100 may further include a cover window pop-out assembly 110 configured to controllably move axially cover window 150 between the retracted position and the extended position. Cover window pop-out assembly 110 may be configured for reversibly move the cover window between the retracted position and the extended position i.e. to move the cover window from the retracted position to the extended position and vice versa from the extended position to the retracted position.

Camera module 100 may further include a barrel pop-out assembly 111 (shown with dashed lines in FIGS. 2A-2B) configured to cause lens barrel 120 to axially move from the collapsed state to the operative state when the cover window is moved from the retracted position to the extended position. In some embodiments, the barrel pop-out assembly may be configured to axially move lens barrel 120 between the collapsed and operative states (i.e. reversibly). In the following, it is noted that the term "move between a position/state/mode" may refer to a reversible movement i.e. in both directions. The term "move from a position/state/mode to another position/state/mode" may refer to a movement in one-way only. It is noted that in some embodiments, the barrel pop-out assembly may be implemented by a fixed coupling/attachment between lens barrel 120 and cover window 150 so that an axial movement of cover window 150 causes an axial movement of lens barrel 120. Therefore, in these embodiments, cover window pop-out assembly 110 may in fact may be configured to controllably move the lens barrel 120 together with cover window 150. In other words, the cover window pop-out assembly 110 may perform the move of both cover window 150 between the retracted and extended positions and of lens barrel 120 between the collapsed and operative states. In some other embodiments, the barrel pop-out assembly may include a biasing mechanism configured to bias the lens barrel towards the operative state when the lens barrel is in the collapsed state. The cover window in the retracted position may be configured so as to maintain the lens barrel in the collapsed state. The cover window may be configured so as to release the biasing mechanism when it moves from the retracted position to the extended position. The cover window may further be configured to return the lens barrel from the operative into the collapsed state when it moves from the extended position into the retracted position. In some embodiments, the biasing mechanism may be implemented by a magnetic spring as described in more details below in particular with reference to the second aspect of the present disclosure. In other embodiments, the biasing mechanism may be implemented by a mechanical spring. In other embodiments, the barrel pop-out assembly may be implemented by an induction motor producing linear motion as described in more details below in particular with reference to FIGS. 13-14. For example, the barrel pop-out assembly may include a permanent magnet fixed to an outer wall of the lens barrel and an electrical coil fixed to an inner wall of the carrier. The magnet and electrical coil may be configured so that a current in the electrical coil is capable of inducing axial forces on the permanent magnet to bring the lens barrel from the collapsed state to the operative state at least when the cover window pop moves from the retracted position into the extended position. Further, the magnet and electrical coil may be configured so that a current in the electrical coil is capable of inducing axial forces on the permanent magnet to bring the lens barrel from the operative state into the collapsed state at least when the cover window moves from the extended position into the retracted position.

Camera module 100 further includes an actuator 140 having a driving motor configured for operating cover window pop-out assembly 110. In embodiments having a separate lens barrel pop-out assembly 111, an actuator 140 of the cover window pop-out assembly may act as an actuator of lens barrel pop-out assembly. In some embodiments, the barrel pop-out assembly may be actuated independently of an actuation of the window pop-out assembly. Cover window pop-out assembly 110 may include a driving cam (not shown) configured to be driven rotationally by actuator 140.

Cover window 150 may be coupled to the driving cam so that a rotation in a first rotational direction of the driving cam may cause cover window 150 to axially move from the retracted position to the extended position. A rotation in a second opposite rotational direction of the driving cam may cause cover window 150 to axially move from the retracted position to the extended position. The rotation of the driving cam may be about a rotation axis parallel to the Z-axis. In comparison to an axial driving cam of the prior art, the rotary drive cam implementation notably provides an improved use of the available space for the camera module. Camera module 100 may comprise a housing (not shown) configured to receive cover window pop-out assembly 110. Retractable cover window 150 may be arranged axially movable relative to the housing. The driving cam may be rotationally coupled to the housing via one or more bearing balls enclosed in one or more corresponding arcuate or circular grooves formed in the housing. The coupling using bearing balls in arcuate/peripheral grooves may provide a smooth and accurate motion without clearance and minimum friction. In some embodiments, the driving cam may be axially sandwiched between a back housing and a front housing and the coupling of the driving cam to the housing may comprise a lower and upper coupling each comprising one or more bearing balls enclosed in one or more corresponding arcuate or circular grooves formed respectively in the back and front housing.

In some embodiments, the objective assembly may include four or more lenses in the lens barrel. In some embodiments, the objective assembly may further include one or more static lenses disposed outside of lens barrel 120. The one or more static lenses elements may be configured to be static relative to the housing of camera module 100.

Figure 12A:
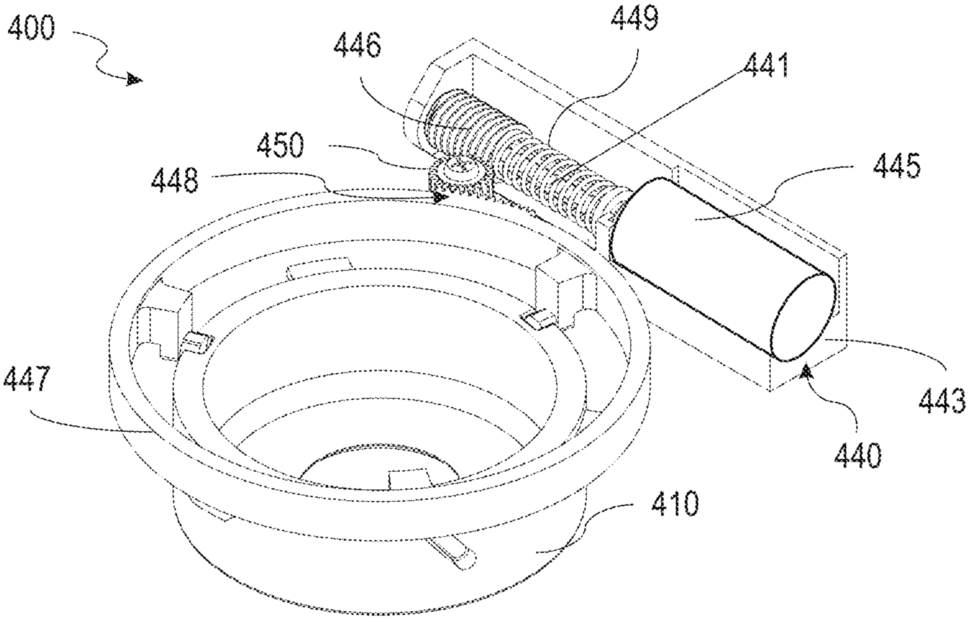
FIGS. 12A-12D show components of a camera module according to other embodiments of the first aspect of the present disclosure.
Figure 12B:
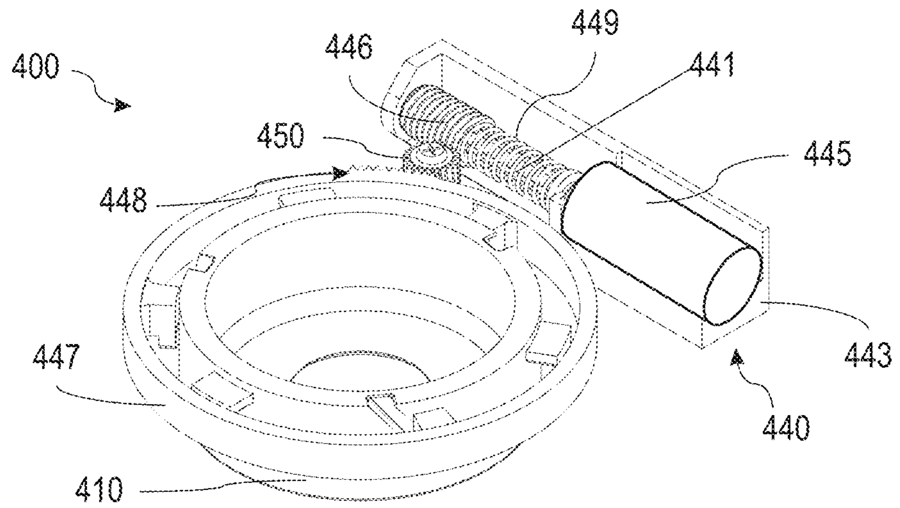

Camera module 100 may further comprise an auto-focus (AF) module (not shown). In some embodiments, the AF module may be configured to move lens barrel 120 along the optical axis Z when lens barrel 120 is in the operative state. In these embodiments, cover window 150 may be configured so that it provides in the extended position an axial gap with the lens barrel in the operative state. Further, lens barrel 120 may include a lens element having a D-cut shape as shown for example on FIGS. 12A-C described in more details hereinbelow. For example, 10% to 50% of the optical height of any D-cut lens is removed. Lens barrel 120 may be formed to conform to the D-cut shape, thereby releasing a D-cut volume in an interstice between carrier 130 and lens barrel 120. This may enable a difference between a diameter of lens barrel 120 and a diameter of carrier 130 to be less than 0.5 mm, less than 1 mm, less than 2 mm or less than 3 mm. The image sensor may generally have a 4:3 width to height ratio. The lens may be cut along an axis that is parallel to the axis that defines the height border of the image sensor so that a smaller lens side may be aligned with a smaller sensor side (height of the sensor). The AF module may be integrated in the D-cut volume between carrier 130 and lens barrel 120. The AF module may comprise an axial coupling provided between lens barrel 120 and carrier 130 so that lens barrel 120 is axially movable relative to carrier 130. The AF module may include a voice coil motor ("VCM"), or more generally an induction motor producing linear motion for displacing axially lens barrel 120 relative to carrier 130. An axial movement of lens barrel 120 caused by the AF module may be in the range of 0.1 mm to 5 mm. The AF module may include driving circuitry (i.e. an auto-focus controller) configured to operate the AF module. The AF module may further include a current supply wiring. In some embodiments, the current supply wiring may be provided by floating cables. In other embodiments, the current supply wiring may be provided using a flexure configured to deform for allowing movement of the AF module in the vertical direction and/or in at least one horizontal direction. In some other embodiments, the AF module may be a sensor based autofocus configured to move sensor 160 along the optical axis Z.

Camera module 100 may further include an OIS system (not shown) configured to compensate for motion of the camera module during imaging. In some embodiments, the OIS system may be configured to move lens barrel 120 in a horizontal plane along two transverse axes such as the X and Y axes. The OIS system may be configured according to the third aspect of the present disclosure described in more details herein below. The OIS system may include a bottom frame configured to be fixed relative to sensor 160, an intermediate frame configured to move in one transverse direction (e.g. the X direction) relative to the bottom frame and a top frame configured to move in the other transverse direction (e.g. the Y direction) relative to the intermediate frame. Carrier 130 may be mounted on the top frame and the intermediate and top frames may be controllably driven along the X and Y axes using VCMs (or more generally induction motors producing linear motion). This may enable the height of the OIS system to be less than 15%, less than 25%, less than 30% or less than 50% of the height of camera module in the collapsed state. In some other embodiments, the OIS system may be a sensor based OIS system configured to move the sensor 160 in the sensor plane along two transverse axes such as the X and Y axes. The OIS system may additionally or alternatively be configured to move the sensor for rotating the sensor along a yaw, a pitch and/or a roll rotation axes. The OIS system may include an OIS controller configured to operate the OIS.

Generally, camera module 100 may be configured to be waterproof. Camera module 100 may include a protective seal configured to maintain impermeability of the camera module in the collapsed state and in the operative state as well as in intermediate states of camera module 100. Camera module 100 may also allow dust resistance and be configured to meet the Ingress Protection code IP68 standards.

Camera module 100 may also include an optical filter configured for filtering out a predetermined portion of the electromagnetic spectrum detectable by the image sensor. This may enable to filter non-visible radiations such as infrared radiations.

Generally, dimensions of camera module 100 may be in the following ranges: the camera module including the actuator may fit in a circle having a diameter between 6 and 50 mm. A diameter of the cover window may be between 5 and 40 mm. A height of the camera module in the inactive (collapsed) mode may be between 6 and 18 mm while in the active (pop-out) mode it may be between 7 and 30 mm. A variation of height between the inactive and active mode of the camera module may be between 1 and 15 mm.

FIG. 3 to FIG. 8 show various elements of a camera module 200 according to embodiments of the first aspect of the present disclosure.

Figure 3A:
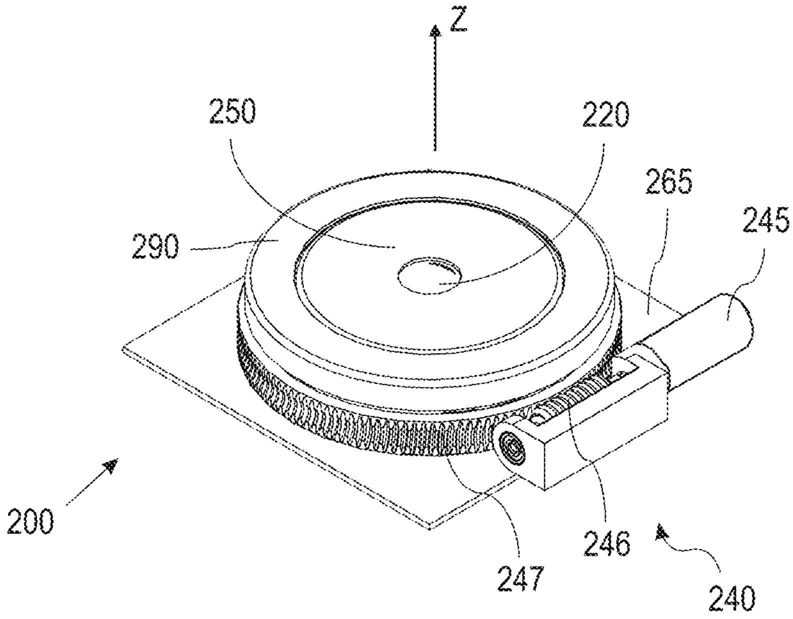
FIGS. 3A-3D show an isometric view of a camera module according to embodiments of the first aspect of the present disclosure, respectively an inactive mode and in an active mode.
Figure 3B:
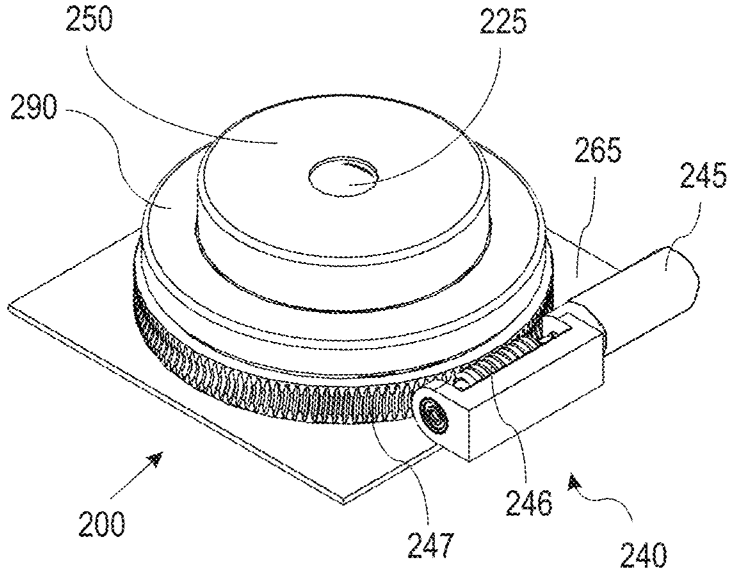
Figure 3C:
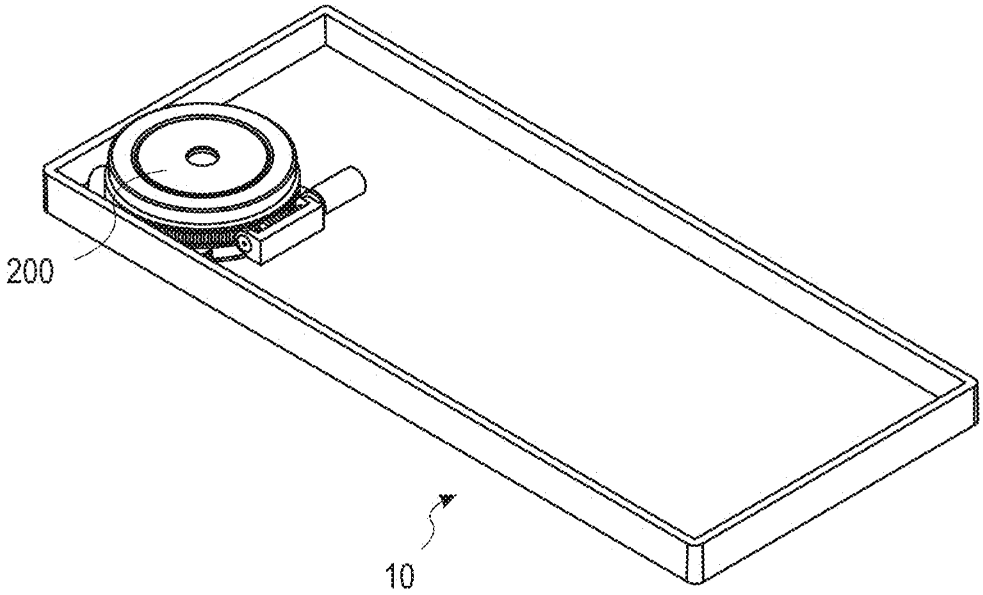
Figure 3D:
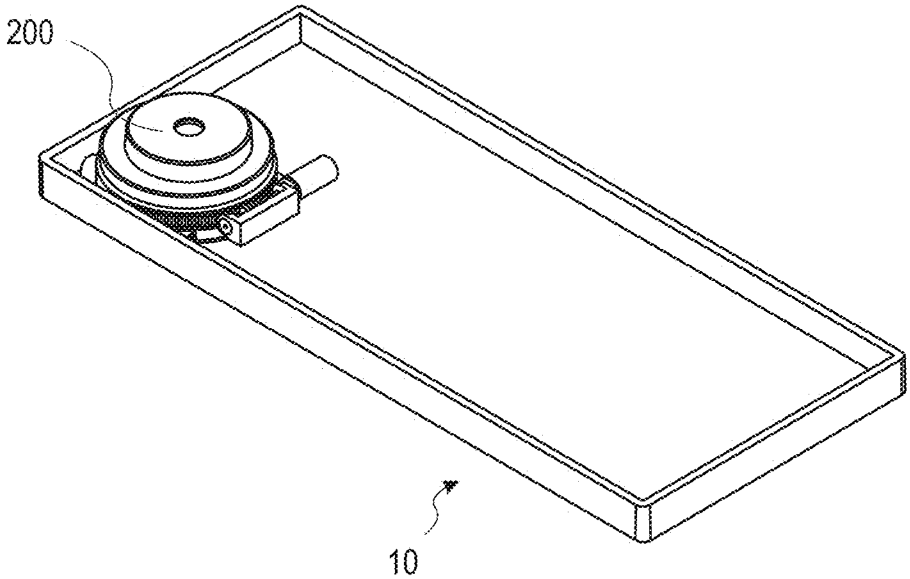
Figure 4A:
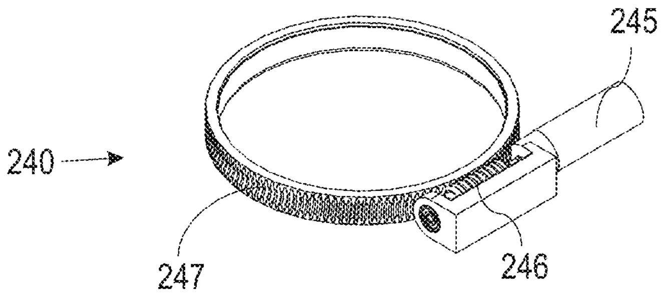
FIGS. 4A-4E shows isometric views of various components of the camera module shown in FIG. 3A-3D.
Figure 4B:
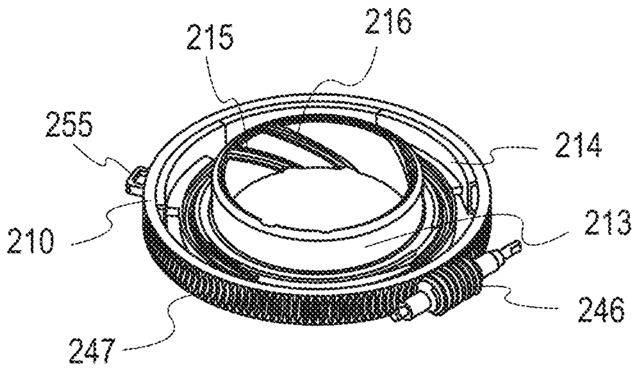
Figure 4C:
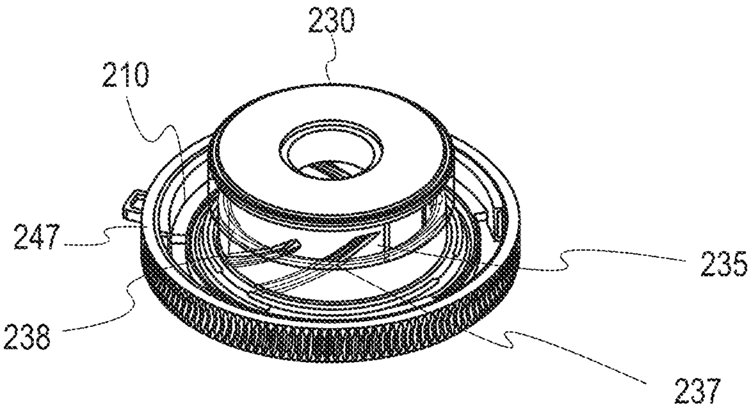
Figure 4D:
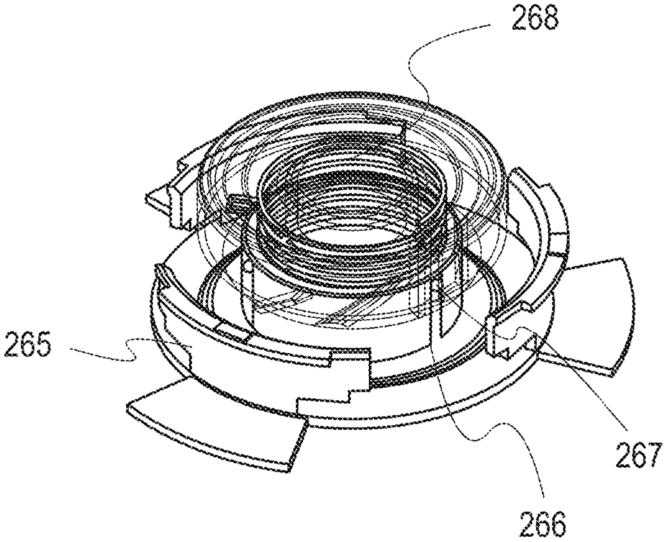
Figure 4E:
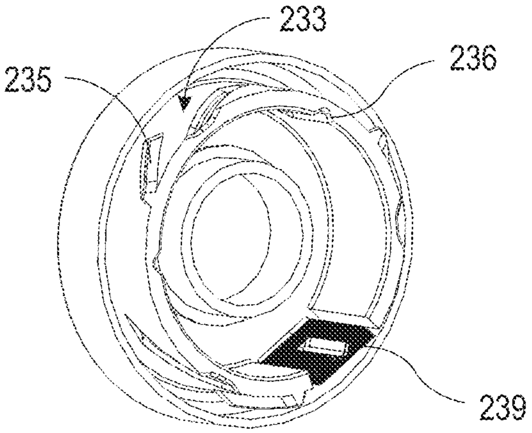
Figure 5:
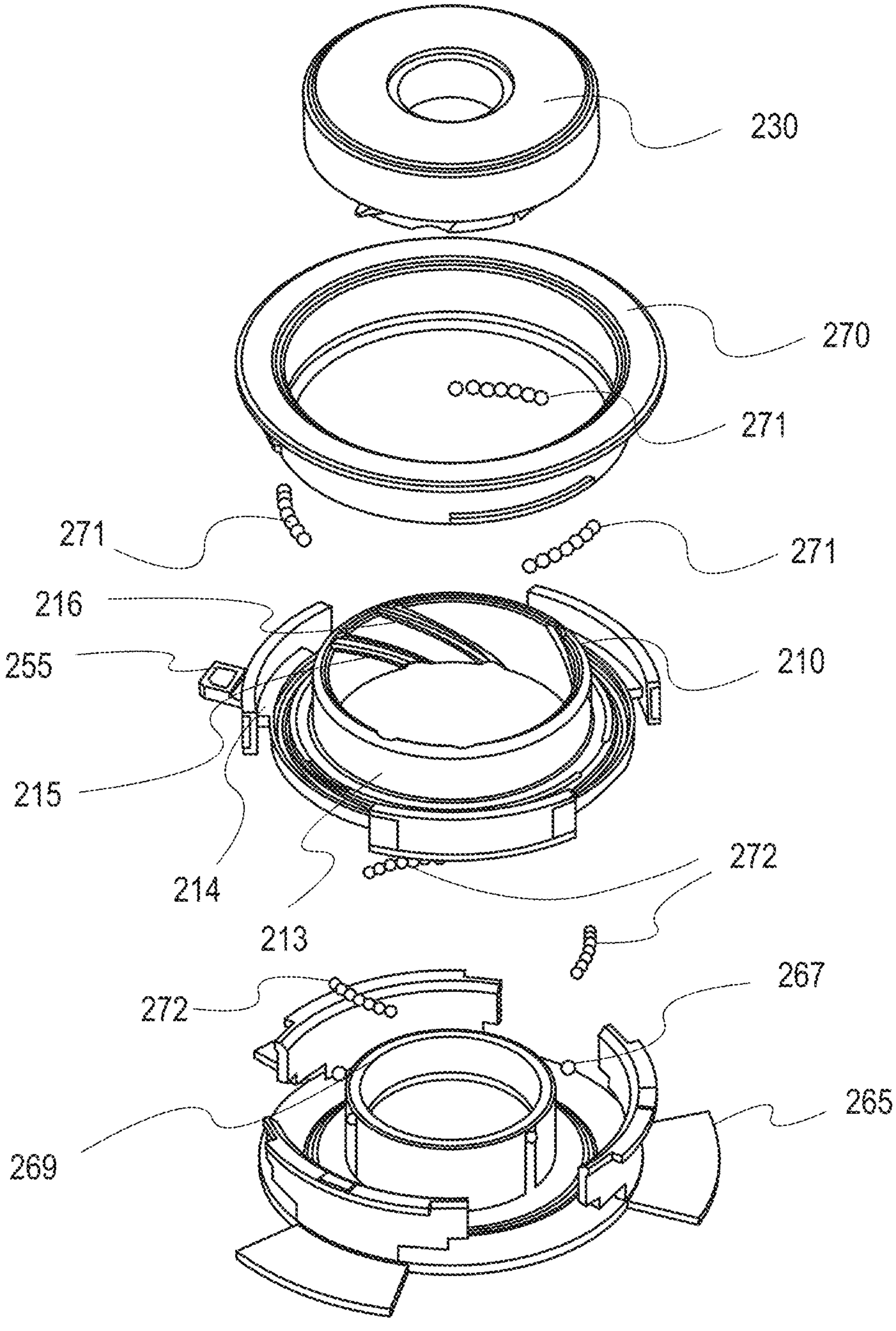
FIG. 5 illustrates an exploded view of various components of the camera module shown in FIGS. 3A-3D.
Figure 6:
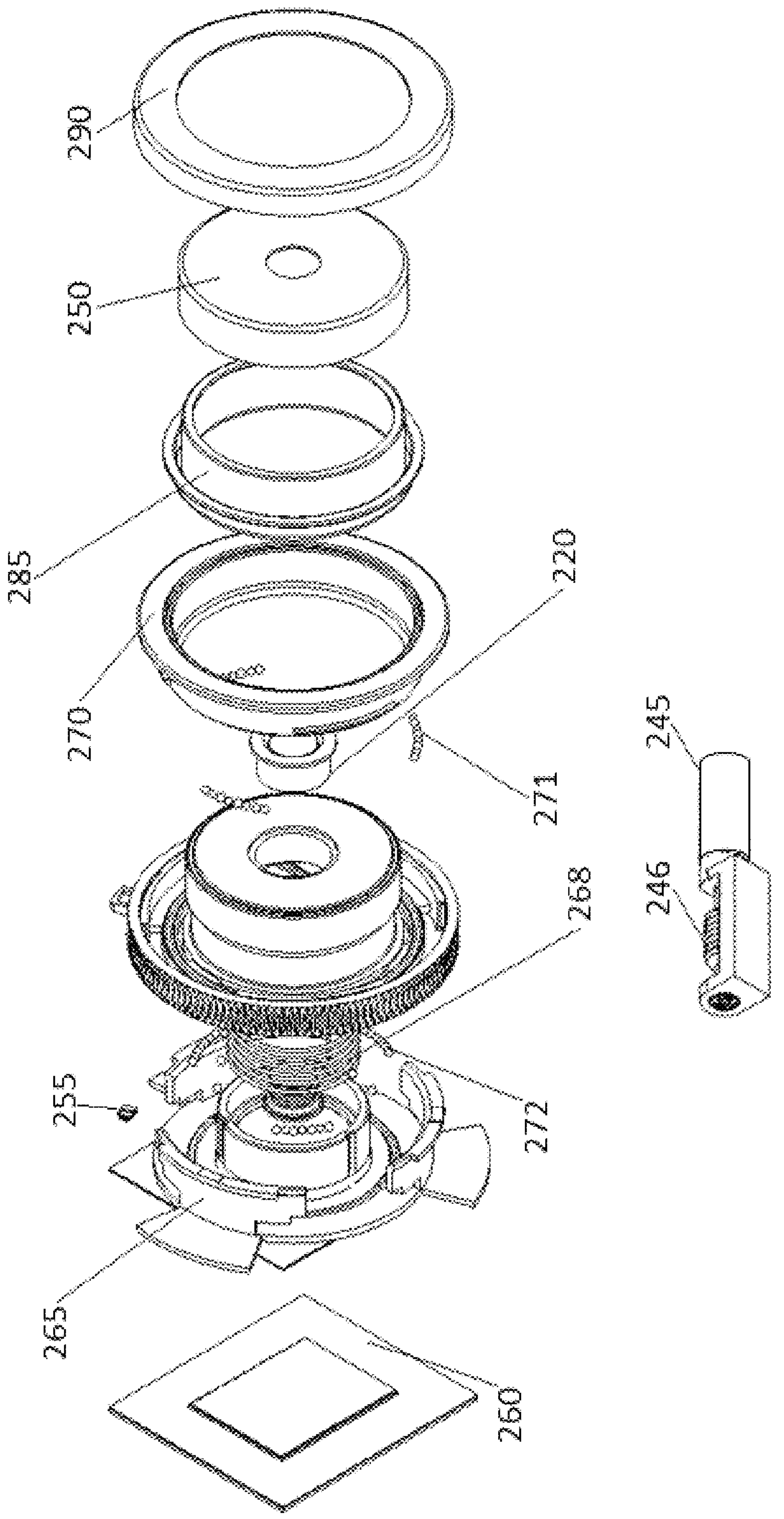
FIG. 6 illustrates another exploded view of the camera module shown in FIGS. 3A-3D.
Figure 7:
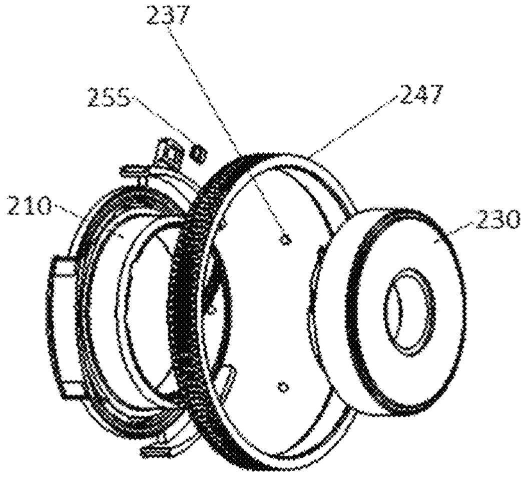
FIG. 7 illustrates is an exploded view of components of the camera module shown in FIG. 6.
Figure 8A:
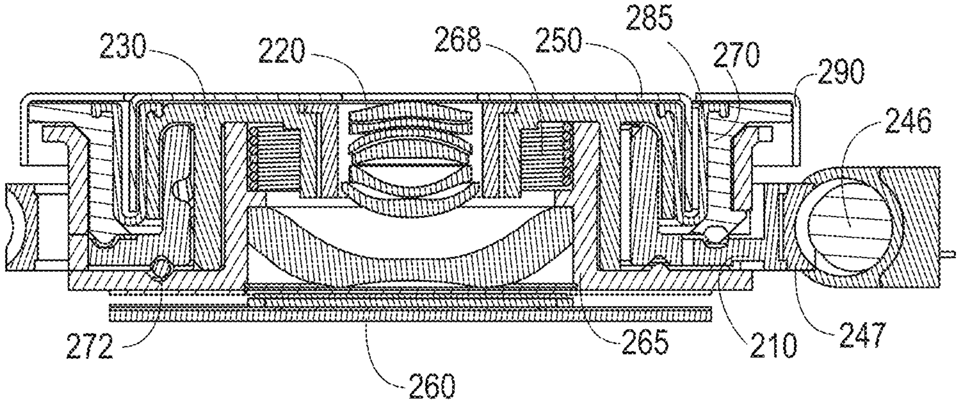
FIGS. 8A-8B illustrates a cross sectional view of the camera module shown in FIGS. 3A-3D respectively in the inactive mode and in the active mode.
Figure 8B:
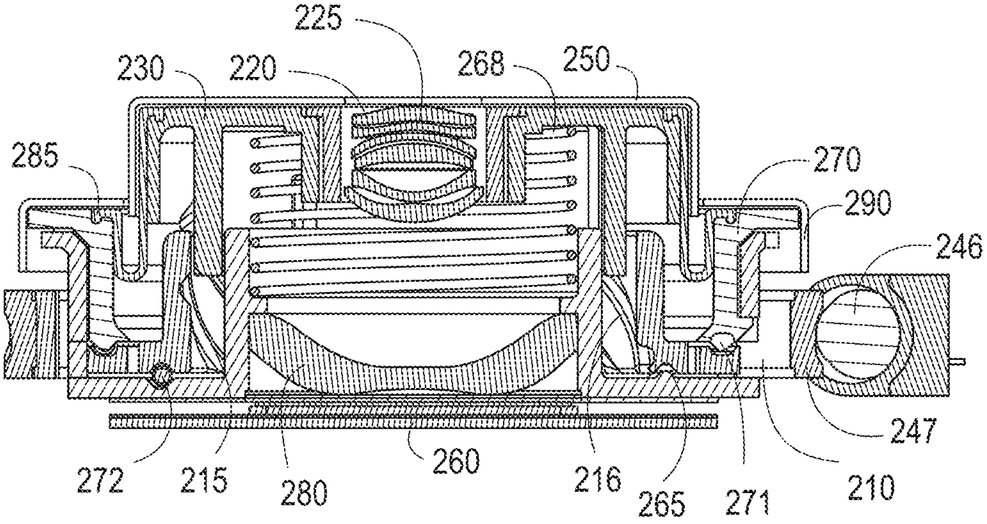

FIG. 3A-3B show camera module 200 respectively in a inactive mode and in an active mode and FIGS. 3C-3D show the same, camera module 200 being integrated in a smartphone device 10. Camera module 200 comprises a lens barrel 220, a carrier 230 (see for example FIG. 4C) configured to coaxially receive the lens barrel 220, a retractable cover window 250 and an image sensor 260. Lens barrel 220 comprises an objective assembly. The objective assembly may hold coaxially a plurality (e.g. six) lens elements 225 (see for example FIGS. 8A-8B) defining an optical axis Z of the camera module. Carrier 230 may comprise a peripheral shoulder for receiving a flange of lens barrel 220. Lens barrel 220 may be positioned coaxially inwardly to carrier 230. Lens barrel 220 is fixedly coupled to the carrier. For example, lens barrel 220 can be glued in carrier 230 by active alignment process. Cover window 250 may be configured to be axially movable between a retracted position and an extended position corresponding respectively to a proximal axial position and a distal axial position of the cover window relative to image sensor 260. Lens barrel 220 may also have an operative state and a collapsed state corresponding respectively to a proximal axial position and a distal axial position of the lens barrel relative to image sensor 260. In the operative state of the lens barrel, image sensor 260 may be positioned in a focal plane or in an imaging plane of the objective assembly. In an active mode of the camera module, cover window 250 may be in the extended position and lens barrel 220 may be in the operative state while in an inactive mode of the camera module, cover window 250 may be in a retracted position and lens barrel 220 may be in a collapsed state. In the operative state, image sensor 260 is positioned in a focal plane or in an image plane of the objective assembly. In the collapsed state, the camera module may be disabled i.e. the camera module may be unable to image a field of view of the lens assembly. The operative state of the lens barrel corresponds to a pop-out (active) mode of camera module 200 in which a TTL of the camera module is higher than a TTL of the camera module in the inactive mode.

Camera module 200 further includes a cover window pop-out assembly configured to controllably move cover window pop-out assembly 210 configured to controllably move axially cover window 250 between the retracted position and the extended position. The cover window pop-out assembly may be configured for reversibly move the cover window between the retracted position and the extended position i.e. to move the cover window from the retracted position to the extended position and vice versa from the extended position to the retracted position.

The objective assembly may further include a static lens 280 disposed outside of lens barrel 220. The cover window pop-out assembly may be configured to control an air gap between static lens 280 and lens barrel 220. The cover window pop-out assembly comprises a driving cam 210 (see for example FIGS. 4A-4E) cooperating with carrier 230 via a coupling mechanism described in more details below. As explained above, lens barrel 220 may be fixedly mounted in carrier 230. Additionally, cover window 250 may be fixedly mounted on carrier 230 (see for example FIGS. 8A-8B). Carrier 230 is coupled to the driving cam so that a rotation in a first rotational direction of the driving cam causes an upward vertical movement of carrier 230 and consequently causes cover window 250 and lens barrel 220 to axially move from the retracted position/collapsed state to the extended position/operative state. A rotation in a second opposite rotational direction of the driving cam causes a downward vertical movement of carrier 230 and consequently causes cover window 250 and lens barrel 220 to axially move from the extended position/operative state to the retracted position/collapsed state.

Camera module 200 may also comprise a back housing 265 (see for example FIGS. 4A-4E) configured to receive pop-out assembly 210 and the carrier 230. Static lens 280 may be fixed to back housing 265. Retractable cover window 250 may be arranged axially movable relative to back housing 265. Retractable cover window 250 may be configured to be controllably movable between a retracted position and an extended position. In the retracted position, cover window 250 may be positioned in close proximity to a most distal surface of lens barrel 220. Cover window 250 in the retracted position may abut on a most distal surface of lens barrel 220 (see for example FIGS. 8A-8B). As explained in more details below, pop-out assembly 210 may be further configured to controllably move the retractable cover window 250 together with lens barrel 220. Window cover 250 may be coupled to be axially fixed relative to the carrier 230.

With continuing reference to FIGS. 4A-4E, actuator 240 may comprise a motor 245 and a worm drive comprising a worm screw 246 and a worm wheel 247. Worm wheel 247 may form a ring geared to worm screw 246. Motor 245 may be configured to rotate worm screw 246 along its longitudinal axis. Worm screw 246 may be configured to cause worm wheel 247 to rotate around the Z axis when it is rotated. Motor 245 may be a stepper motor. For switching the camera module from a pop-out state (also referred to as extended state), motor 245 may actuate worm wheel 247 in the second rotational direction via worm screw 246. For switching the camera module from the collapsed state to the pop-out state, motor 245 may actuate worm wheel 247 in the first rotational direction opposite to the first rotational direction via worm screw 246.

Further, driving cam 210 may include a cam barrel 213 and a cam flange 214 at a base thereof. Cam flange 214 may comprise three radial sections protruding outwardly of the base of cam barrel 213. Driving cam 210 may further include a radial position sensor 255. Driving cam 210 may be coaxially positioned relative to the optical axis outwardly of carrier 230. Driving cam 210 may be axially sandwiched between back housing 265 and a front housing 270. Front housing 270 may form a locking ring fixed to back housing 265 for maintaining the driving cam onto back housing 265. Driving cam 210 may respectively be coupled to the front and back housing via ball bearing couplings 271, 272 so that lens barrel 230 can rotate relative to front and back housing 265, 270. Ball bearing couplings 271, 272 may comprise a plurality of bearing balls and arcuate or peripheral grooves for receiving the bearing balls. The bearing balls may provide for a low friction bearing and provide for accurate motorized control ability. Furthermore, driving cam 210 may be friction coupled to worm wheel 247 so that a rotation of worm wheel 247 is generally transmitted to driving cam 210. The friction coupling between driving 210 cam and worm wheel 247 may be configured to be overcome when a collapsing force larger than a predefined threshold is applied on the carrier. In other words, the friction contact between driving cam 210 and worm wheel 247 may be configured to allow sliding beyond a predefined torque between worm wheel 247 and driving cam 210. This may provide a protection mechanism in case an excessive torque is applied between driving cam 210 and worm wheel 247.

Carrier 230 may comprise a carrier barrel 233 coaxially positioned inwardly of cam barrel 213. Carrier barrel 233 and cam barrel 213 may be coupled to form a helical cam so that a rotational motion of cam barrel 213 is transformed into an axial motion of carrier barrel 233. More particularly, the coupling between carrier barrel 233 and driving cam barrel 213 may comprise one or more (e.g. three) helical grooves 215 on an inner wall of cam barrel 213 configured to cooperate with corresponding one or more (e.g. three) helical grooves 235 on an outer wall of carrier barrel 233 so as to enclose corresponding one or more (e.g. three) bearing balls 237 capable of transferring movement from cam barrel 213 to carrier barrel 233. The helical grooves on the inner wall of the cam barrel and the helical grooves on the outer wall of the carrier barrel may have a different inclination relative to the optical axis. Furthermore, carrier 230 and back housing 265 may be coupled using an axial coupling. The axial coupling between carrier 230 and back housing 265 may comprise one or more (e.g. three) axial grooves 236 on an inner wall of carrier barrel 233 configured to cooperate with one or more (e.g. three) corresponding axial grooves 266 on an outer wall of a central barrel 269 of back housing 265. Central barrel 269 may be positioned coaxially inwardly of carrier barrel 233. Carrier barrel 233 may be radially sandwiched between cam barrel 213 and central barrel 269. The axial coupling between carrier 230 and back housing 265 may further comprise one or more (e.g. three) alignment bearing balls 267 enclosed by axial grooves 236, 266 respectively in carrier 230 and back housing 265, the bearing balls being capable of maintaining a concentricity of carrier 230 relative to back housing 265. Optionally, one of the axial grooves 239 in the carrier 230 may be flexible (i.e. is made of a material having a flexibility higher than the flexibility of the carrier material) to allow for lateral preloading. This may enable to ensure a smooth, accurate and repeatable motion of carrier 230.

In operation, the pop-out assembly may operate according to the following transmission chain: (1) motor 245 (rotary motor) coupled to worm screw 246 rotates worm wheel 247, (2) worm wheel 247 rotates driving cam 210 (helix cam) by friction contact, (3) the driving cam creates a linear up/down motion of carrier 230 by an helical coupling (two helixes formed by helical grooves 215, helical grooves 235 and bearing balls 237), (4) carrier 230 (linear slide) is guided by preloaded linear bearing implemented by the axial coupling between carrier 230 and back housing 265. The linear up/down motion of carrier 230 is transmitted to lens barrel 220 and to the cover window as they are fixedly coupled thereto.

Camera module 200 may further comprise an emergency mechanism configured to protect the helical cam mechanism in case an excessive force is applied on the carrier while the camera module is in an active mode. This may provide a drop event protection for avoiding mechanism and camera damage in case of a drop event. The emergency mechanism may comprise one or more (e.g. three) emergency pins 238 projecting radially outwardly from the outer wall of carrier barrel 233 and cooperating with one or more (e.g. three) corresponding emergency helical grooves 216 in cam barrel 213 such that emergency pins 238 engage the emergency helical grooves only when a collapsing force larger than a predefined threshold is applied axially on carrier 230 when in the operative state. The emergency pins may provide for a larger contact area in case excessive collapsing force is applied on carrier 230.

Camera module 200 may further include a protective seal 285 (see for example FIG. 8) configured to maintain impermeability of the camera module in the collapsed state and in the operative state as well as in intermediate states of camera module 200. The protective seal may be configured to allow dust resistance. The protective seal may be configured to meet the Ingress Protection code IP68 standards. Seal 285 may be a diaphragm. The diaphragm may form a foldable (e.g. collapsible with respect to the Z axis) sleeve. One end of the sleeve may be fixed to an outer peripheral edge of carrier 230, and another end of the sleeve may be fixed to an inner peripheral edge of front housing 270. Camera module 200 may further comprise a static cover 290 (see for example FIGS. 6, 8) configured to cover elements which are not covered by cover window 250 such as front housing 270. Static cover 290 and cover window 250 may together form a cover for the camera module.

Camera module 200 may further comprise one or more preloaded compression springs 268 configured to axially bias carrier 230 to prevent backlash. The one or more springs 268 may be positioned between a flange of back housing 265 and a flange of carrier 230. When one spring is provided, spring 268 may be positioned concentrically inwardly to central barrel 269 and outwardly to lens barrel 220. In some embodiments, more than one (e.g. three) springs are provided distributed (e.g. at 120 degrees) around the optical axis from each other. The more than one springs may be positioned inwardly to central barrel 269 and outwardly to lens barrel 220. The spring(s) may be compressed also in the operative state of carrier 230. Camera module 200 may further comprise an AF module (not shown). The AF module may be configured to move sensor 260 along the optical axis Z to provide auto-focus capability when the camera module is in operative mode. In other embodiments, the AF module may be configured to move the lens barrel along the optical axis Z to perform auto-focus. Camera module 200 may also include an OIS system to provide stabilization capability. The OIS system may be configured to move sensor 260 in the sensor plane along the X and Y axes. The OIS system may additionally or alternatively be configured to move the sensor for rotating the sensor along a yaw, a pitch and/or a roll rotation axes.

Generally, dimensions of camera module 200 may be in the following ranges: the camera module including the actuator may fit in a circle having a diameter between 6 and 50 mm. A diameter of the cover window may be between 5 and 40 mm. A height of the camera module in the inactive (collapsed) mode may be between 6 and 18 mm while in the active (pop-out) mode it may be between 7 and 30 mm. A variation of height between the inactive and active mode of the camera module may be between 1 and 15 mm.

Figure 9A:
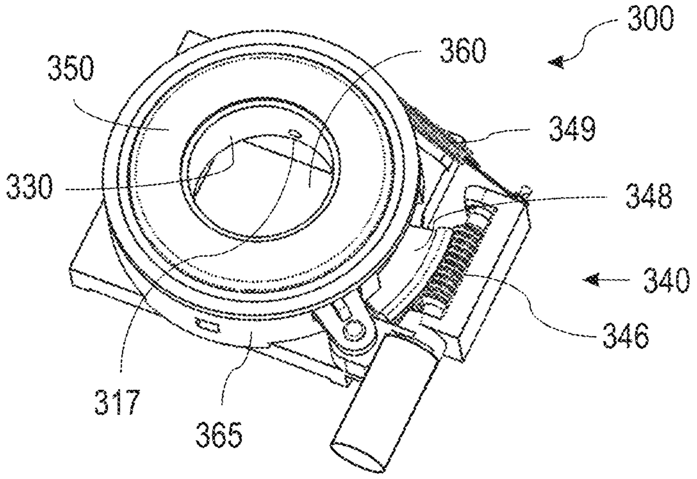
FIGS. 9A-9B illustrate an isometric view of a camera module according to other embodiments of the first aspect of the present disclosure, respectively in an inactive mode and in an active mode.
Figure 9B:
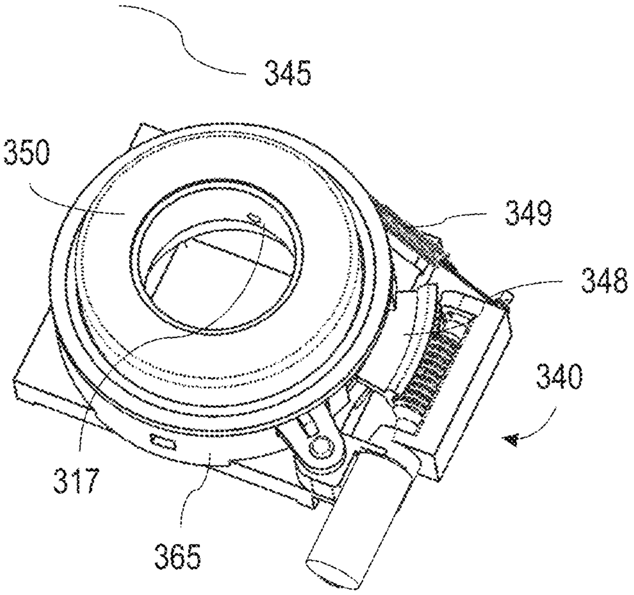
Figure 10A:
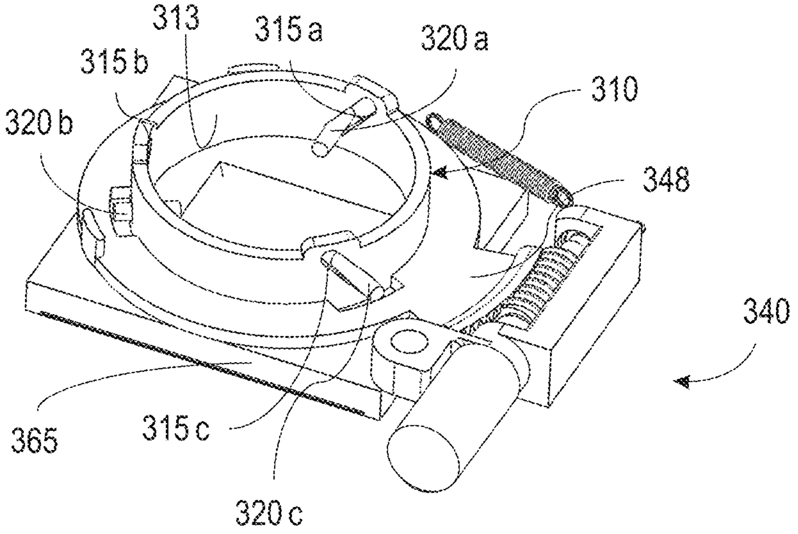
FIGS. 10A-10B shows internal components of the camera module of FIG. 9 in the collapsed state and in the extended state.
Figure 10B:
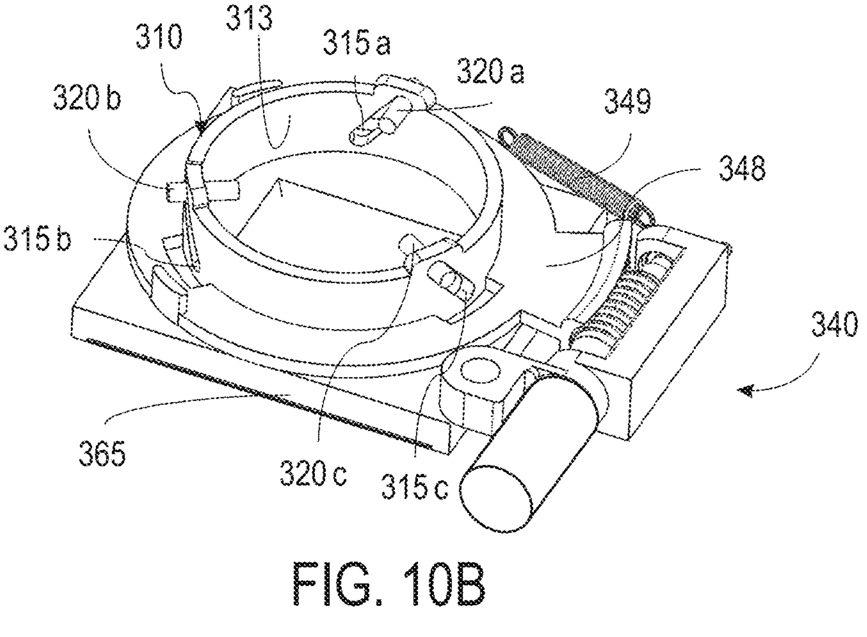
Figure 11:
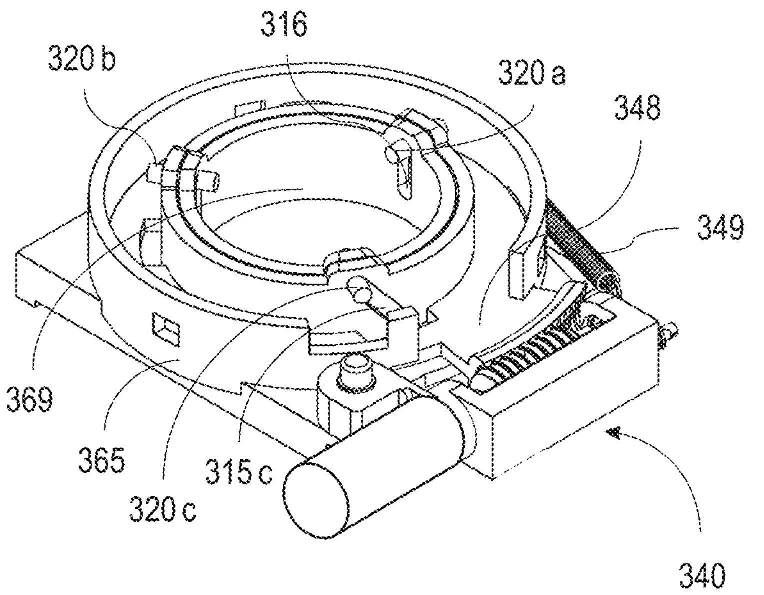
FIG. 11 shows additional internal components of the camera module of FIG. 9 in the extended state.

FIG. 9 to FIG. 11 illustrate a camera module 300 according to other embodiments of the first aspect of the present disclosure.

Camera module 300 comprises a lens barrel (not shown) and a carrier 330, a retractable cover window 350 and an image sensor 360. The lens barrel comprises an objective assembly. The objective assembly may hold coaxially a plurality of lens elements defining an optical axis Z of the camera module perpendicular to the plane of image sensor 360. Carrier 330 may accommodate coaxially the lens barrel. Lens barrel 220 may be slidably received in carrier 330 i.e. be able to move axially relative thereto. In other embodiments, the lens barrel can be fixedly mounted in carrier 330 for example by being glued in carrier 330 by active alignment process. Cover window 350 has an extended position (see FIGS. 9B, 10B) and a retracted position (see FIGS. 9A, 10A) as defined hereinabove. Cover window 350 may further include a window plate (not shown, for example made of glass) seated on an upper rim of cover window 350 so as to seal the lens barrel from the outside environment. The lens barrel may have an operative state and a collapsed state. In the operative state, image sensor 360 is positioned in a focal plane or in an image plane of the objective assembly. In the collapsed state, the camera module may be disabled i.e. the camera module may be unable to image a field of view of the lens assembly. The operative state of the lens barrel corresponds to a pop-out mode of camera module 300 in which a TTL of the camera module is higher than a TTL of the camera module in the inactive mode.

Camera module 300 further includes a cover window pop-out assembly configured to controllably move cover window 350 between the retracted position and the extended position. The pop-out assembly comprises a driving cam 310 cooperating with carrier 330 via a coupling mechanism described in more details below. Cover window 350 may be fixedly coupled to carrier 330 so that a movement of carrier 330 is transmitted to cover window 350. The cover window pop-out assembly is operated by an actuator 340. Carrier 330 is coupled to the driving cam so that a rotation in a first rotational direction of driving cam 310 causes an upward vertical movement of carrier 330 and consequently causes the cover window to axially move from the retracted position to the extended position. A rotation in a second opposite rotational direction of driving cam 310 causes a downward vertical movement of carrier 330 and consequently causes the cover window to axially move from the extended position to the retracted position.

Camera module 300 may also comprise a back housing 365 configured to receive the pop-out assembly and carrier 330. Retractable cover window 350 may be arranged axially movable relative to back housing 365. In the retracted position, cover window 350 may be arranged over the carrier and positioned in close axial proximity to a most distal surface of the lens barrel. As explained in more details below, driving cam 310 is configured to controllably move retractable cover window 350 together with carrier 330.

Actuator 340 may comprise a motor 345 and a worm drive comprising a worm screw 346 and a worm wheel. The worm wheel may form a ring including a protruding section 348 geared to the worm screw. In the present embodiments, the worm wheel may be integral to driving cam 310. The driving cam may include a cam barrel 313 and a flange at a base thereof. Protruding section 348 may radially protrude from the flange. Motor 345 may be configured to rotate the worm screw along its longitudinal axis. The worm screw may be configured to cause driving cam 310 to rotate around the Z axis when it is rotated via the geared protruding section 348. Motor 345 may be a stepper motor. For switching the camera module from an active mode (also referred to as pop-out state), motor 345 may actuate driving cam 310 in the second rotational direction via the worm screw. For switching the camera module from the inactive mode to the active mode, motor 345 may actuate driving cam 310 in the first rotational direction opposite to the second rotational direction via the worm screw. Actuator 340 may further include a preload spring 349 configured for ensuring that worm screw 346 and the worm wheel via protruding section 348 stay in direct contact. Further, preload spring 349 may act as a shock absorber or drop absorber in case an external force above a predetermined threshold prone to collapse camera module 300 is applied thereto while in the operative state. The external force may be directed co-linear to the pop-out module movement for collapsing the camera. The predetermined threshold may define a force that is significantly stronger than forces applied by stepper motor 345 for popping out and collapsing the carrier, lens barrel and window cover. For example, such external force may result from a user dropping the electronic portable including a pop-out camera that includes camera module 300. For example, the force may be about 5N or more.

When the external force is applied to pop-out module 300, preload spring 349 is configured to expand. As a result of spring 349 expansion, worm wheel protruding 348 may disengage from worm screw 346, i.e. a distance between worm wheel protruding section 348 and worm 346 increases, and, at some point, the teeth of worm wheel protruding section 348 are not in contact with the teeth of worm screw 346 anymore. This is beneficial as the external force is not applied to any of the components included in pop-out actuator 340, e.g. to stepper motor 345. When the external force stops, preload spring 349 contracts, so that worm wheel protruding section 348 re-engages with worm screw 346, i.e. the teeth of worm wheel protruding section 348 return to contact with the teeth of worm screw 346.

Back housing 365 may comprise a central barrel 369 (see FIG. 11) coaxially positioned inwardly of cam barrel 313. Further, carrier 330 may comprise a carrier barrel coaxially positioned inwardly of central barrel 369. The carrier barrel and cam barrel 313 may be coupled to form a helical cam so that a rotational motion of cam barrel 313 is transformed into an axial motion of the carrier barrel. More particularly, the coupling between the carrier barrel and driving cam barrel 313 may comprise one or more (e.g. three) helical (or angled) grooves 315*a*-315*c* piercing through cam barrel 313 configured to cooperate with one or more (e.g. three) corresponding axial grooves 316 piercing through central barrel 369 of back housing 365 and one or more (e.g. three) corresponding through-holes in the carrier barrel. One or more (e.g. three) pins 320*a*-320*c* may protrude radially through helical grooves 315*a*-315*c*, axial grooves 316 and through-holes 317 to allow transforming a rotational movement of the cam barrel into an axial movement of the carrier barrel. Pins 320*a*-320*c* may be fixedly coupled to the through-holes in the carrier 330. Through holes in carrier 330 may conform to the shape of pins 320*a*-320*c*. For switching a pop-out camera including pop-out module 300 from a pop-out mode (also referred to as active mode) to a inactive mode, stepper motor 345 actuates worm wheel protruding section 348 so that driving cam 310 rotates in a clockwise direction. The circular motion of driving cam 310 in the x-y plane is translated into a linear motion of pins 320*a*-320*c* in the positive z-direction by the three angled (helical) pin-groove mechanisms 315*a*-315*c* and the three vertical (axial) pin-groove mechanisms 316. For switching a pop-out camera including pop-out module 300 from an inactive mode to a pop-out mode, stepper motor 345 actuates worm wheel protruding section 348 so that the latter rotates in an anti-clockwise direction. The circular motion of driving cam 310 in the x-y plane is translated into a linear motion of pins 320*a*-320*c* in the negative z-direction by the three angled pin-groove mechanisms 315*a*-315*c* and the three vertical pin-groove mechanisms 316. Carrier 330 and cover window 350 perform the same linear motion as pins 320*a*-320*c*.

Camera module 300 may include a barrel pop-out assembly configured to cause the lens barrel to axially move from the collapsed state to the operative state. The barrel pop-out assembly may be further configured to cause the lens barrel to axially move from the operative state to the collapsed state. In some embodiments, the barrel pop-out assembly may include a magnetic spring as described herein below. In some other embodiments, the barrel pop-out assembly may include an induction motor producing linear motion. For example, the barrel pop-out assembly may include a permanent magnet fixed to an outer wall of the lens barrel and an electrical coil fixed to an inner wall of the carrier. The magnet and electrical coil may be configured so that a current in the electrical coil is capable of inducing axial forces on the permanent magnet to bring the lens barrel from the collapsed state to the operative state at least when the cover window pop moves from the retracted position into the extended position. Further, the magnet and electrical coil may be configured so that a current in the electrical coil is capable of inducing axial forces on the permanent magnet to bring the lens barrel from the operative state into the collapsed state at least when the cover window moves from the extended position into the retracted position. In other embodiment, the cover window 350 may be configured to push the lens barrel into the collapsing state when the lens barrel is in the operative state and cover window 350 is operated by the cover window pop-out assembly to move from the extended position to the retracted position.

Camera module 300 may further comprise an AF module (not shown) configured to move the lens barrel along the optical axis Z when the lens barrel is in the operative state. The AF module may include an electrical coil and a permanent magnet (or generally a VCM, or more generally an induction motor producing linear motion) as described above, further configured to be capable of inducing axial forces to perform auto-focus when the lens barrel is in the operative state. In some other embodiments, the AF module may be configured to move sensor 360 along the optical axis Z.

Camera module 300 may further include an optical image stabilization system (OIS, not shown. In some embodiments, the OIS system may be configured to move lens barrel 120 in a horizontal plane along two transverse axes such as the X and Y axes. The OIS system may be configured according to the third aspect of the present disclosure described in more details herein below. In some embodiments, the OIS system may be configured to move sensor 360 in the sensor plane along two transverse axes such as the X and Y axes. The OIS system may additionally or alternatively be configured to move the sensor for rotating the sensor along a yaw, a pitch and/or a roll rotation axes. Camera module 300 may be configured to be waterproof. The camera module may include a protective seal configured to maintain impermeability of the camera module in the collapsed state and in the operative state as well as in intermediate states of camera module 300. Camera module 300 may also allow dust resistance and be configured to meet the Ingress Protection code IP68 standards. Camera module 300 may also include an optical filter configured for filtering out a predetermined portion of the electromagnetic spectrum detectable by the image sensor. This may enable to filter non-visible radiations such as infrared radiations.

Generally, dimensions of camera module 300 may be in the following ranges: the camera module including the actuator may fit in a circle having a diameter between 6 and 50 mm. A diameter of the cover window may be between 5 and 40 mm. A height of the camera module in the inactive (collapsed) mode may be between 6 and 18 mm while in the active (pop-out) mode it may be between 7 and 30 mm. A variation of height between the inactive and active mode of the camera module may be between 1 and 15 mm.

FIGS. 12A-12D show another embodiment of a pop-out module for a camera module numbered 400, according to embodiments of the present disclosure. Pop-out module 400 includes a driving cam 410 and an actuator 440. A pop-out module like module 400 may be implemented into a camera module as disclosed herein, for example camera module 300 illustrated in FIGS. 9-11.

Pop-out module 400 may include a lens carrier (not shown), a barrel (not shown), a cover window (not shown) and a back housing (not shown). Pop-out actuator 440 may include a worm screw 446, a gear 450, a worm wheel 447, a stepper motor 445 and a motor housing 443. The worm wheel may include a gearing 448 configured to cooperate with the gear 450. For switching a pop-out camera including pop-out module 400 from an active mode to an inactive mode and from an inactive mode to an active mode, stepper motor 445 actuates worm screw 446 respectively in a first rotation direction and in a second rotation direction opposite to the first direction. Gear 450 and worm wheel 447 transmit the worm screw's rotation into a circular movement of a driving cam 410, which is in turn translated into a linear motion of window rail 410 parallel or anti-parallel to a vertical direction indicated by a Z axis in a manner similar to the above description of camera module 300. In addition, pop-out actuator 440 includes a spring 449 that acts as a drop absorber. Pop-out module 400 including driving cam 410 and three angled grooves switches the pop-out camera from pop-out to collapsed state and vice versa.

Figure 12C:
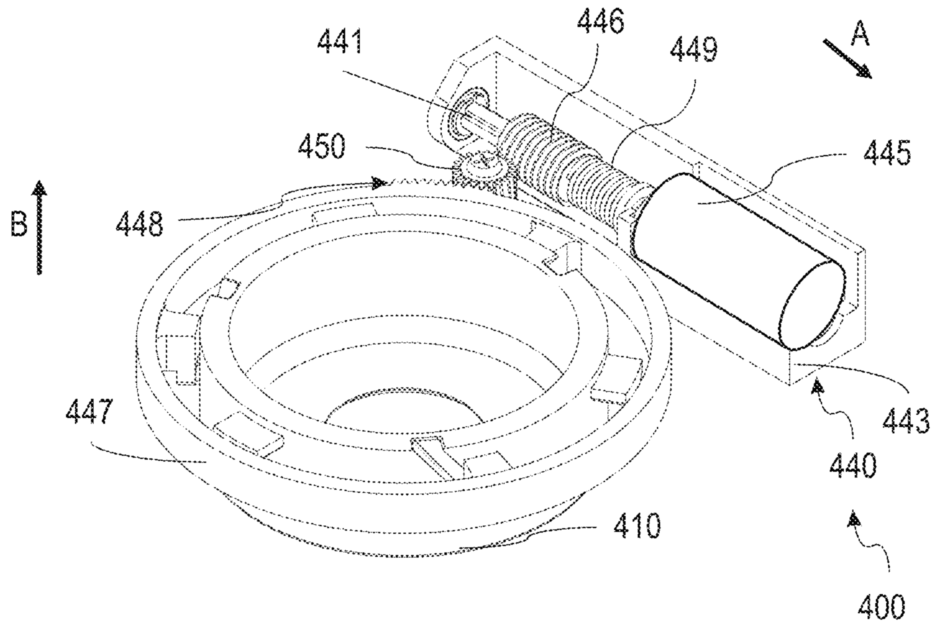
Figure 12D:
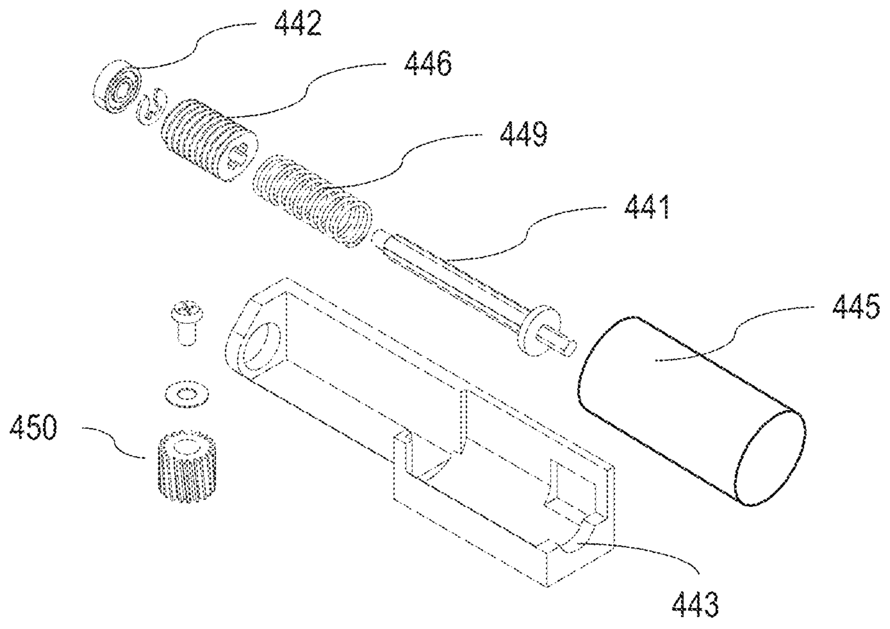

When an external force above a predetermined threshold is applied prone to collapse camera module 400 is applied thereto while in the operative state, spring 449 may act as a shock absorber. The external force may be directed colinear to the pop-out module movement for collapsing the camera. The predetermined threshold may define a force that is significantly stronger than forces applied by stepper motor 445 for popping out and collapsing the carrier, lens barrel and window cover. For example, such external force may result from a user dropping the electronic portable including a pop-out camera that includes camera module 400. For example, the force may be about 5N or more. With reference to FIG. 12C, spring 449 may be in a loaded state. As visible, the external force leads to a significant amount of linear movement of worm screw 446 as indicated by arrow A, so that spring 449 is contracted (or "loaded") and driving cam 410 moves linearly along a direction indicated by arrow B. After the external force stops, the spring force applied by loaded spring 449 on worm 446 leads to a significant amount of linear movement of worm 446, so that driving cam 410 moves linearly opposite to the direction indicated by arrow B until pop-out module 400 returns to its pop-out state. Via contraction of spring 449, the described mechanism is used to smoothly absorb a shock onto the pop-out camera including pop-out module 400, e.g. in case a device such as a smartphone including the pop-out camera is dropped. Without spring 449, such a drop could harm the components included in pop-out module 400. Therefore, spring 449 may be referred to as "drop absorber spring", since a "drop absorber" or "shock absorber" is provided. Rotation ratios of worm screw 446:gear 450:driving cam 410 may be 10-1000:2-50:1, i.e. for 10-1000 rotation periods of worm screw 446, gear 450 may rotate 2-50 times and driving cam 410 may rotate once. The length ("L") of spring 449 may be 2-10 mm, its force may be 0.5-10N. The linear motion ("M") of worm 446 may be 0.5-10 mm. The tooth angles of worm 446 may be 0-10 degree, and worm 446's diameter (or "pitch diameter") may be 1-5 mm. FIG. 12D shows pop-out actuator 440 in an exploded view. The pop-out actuator may comprise a rod 441 configured to transmit the force generated by stepper motor 445 to worm screw 546. Further, the rod 441 may guide spring 449 and is supported by bearing 442.

Figure 13:
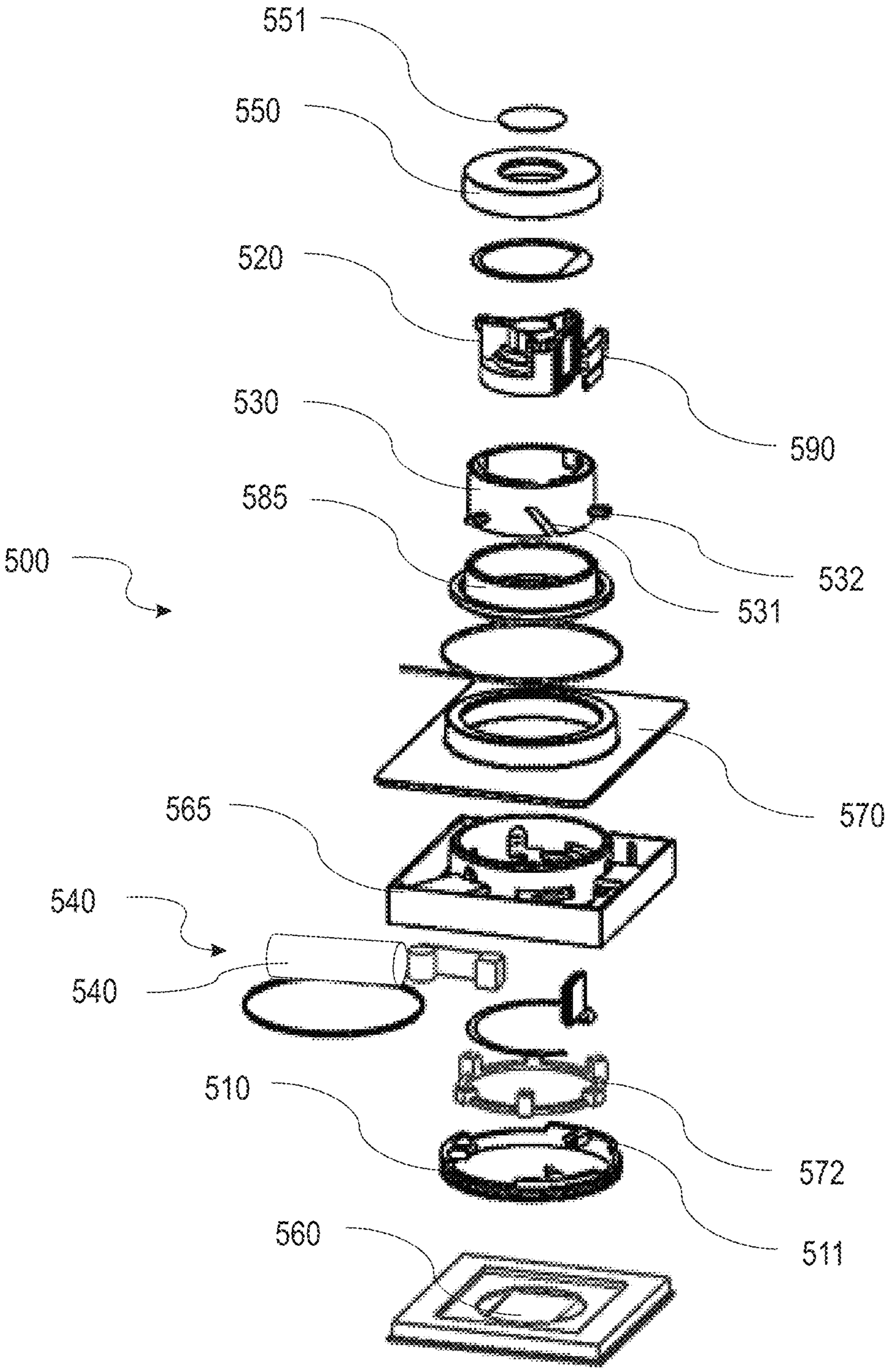
FIG. 13 illustrates an exploded view a camera module according to other embodiments of the first aspect of the present disclosure.
Figure 14A:
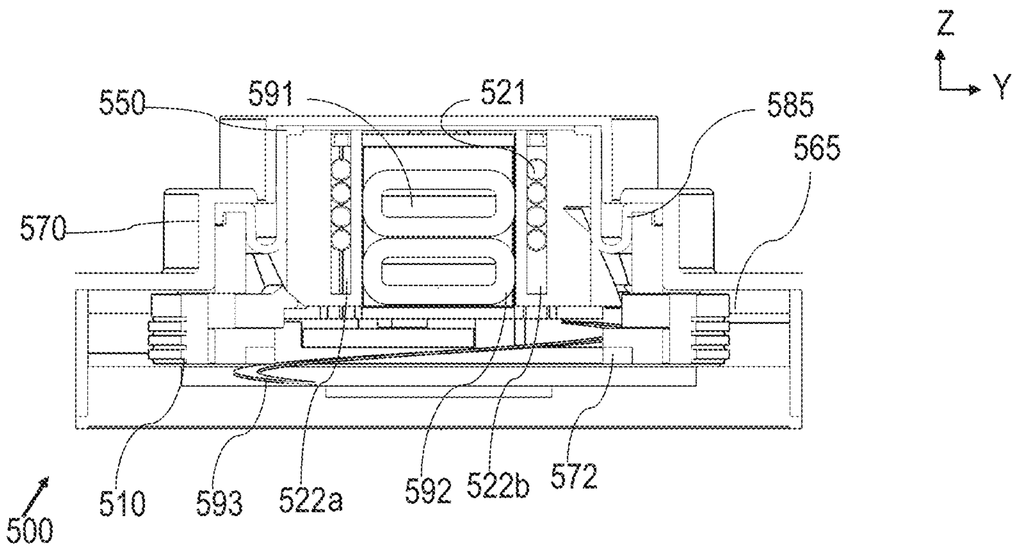
FIGS. 14A-14B show cross sectional views of the camera module of FIG. 13 in two vertical perpendicular planes.
Figure 14B:
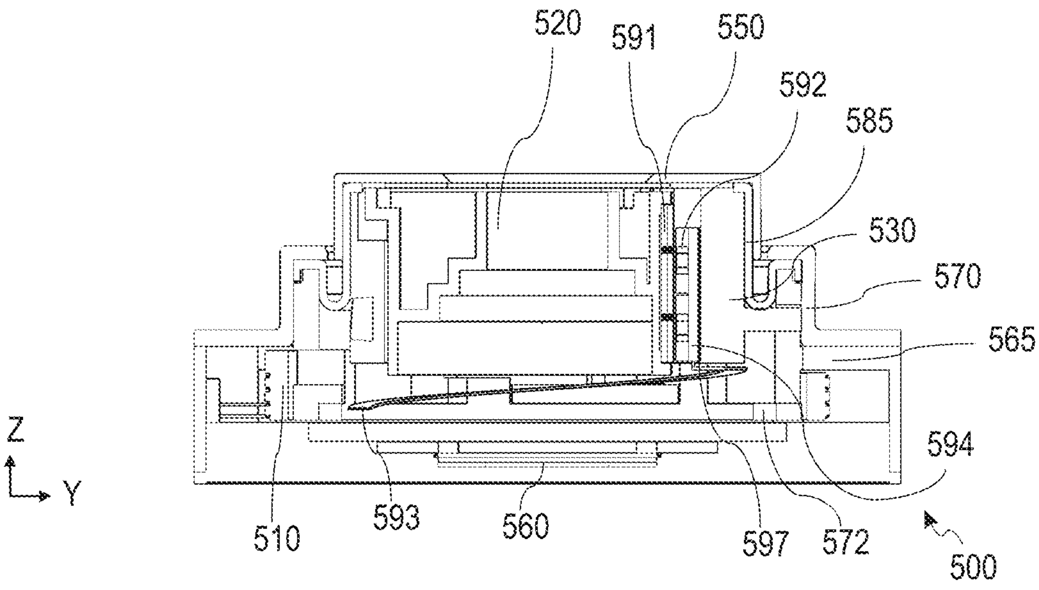

FIG. 13 to FIG. 14 show a camera module 500 according to another embodiment of the first aspect of the present disclosure. FIG. 9 shows camera module 500 in an exploded view. FIGS. 14A-14B show cross sectional views of the camera module of FIG. 13 in an operative state from two perpendicular vertical planes.

Camera module 500 comprises a lens barrel 520, a carrier 530 configured to receive the lens barrel 520 and an image sensor 560. Camera module 500 further includes a cover window 550. Lens barrel 520 may comprise an objective assembly. The objective assembly may hold coaxially a plurality (e.g. four) lens elements (not shown) defining an optical axis Z of camera module 500. Carrier 530 may include a carrier barrel including one or more peripheral shoulder recesses in an inner wall thereof. The shoulder recesses may be configured for supporting one or more peripheral flange protrusions (hooks) radially protruding outwardly of lens barrel 520. The one or more peripheral shoulder recesses and corresponding one or more peripheral flange protrusions may form a stopper configured to limit an axial motion of lens barrel 520 relative to the carrier barrel in the sensor direction (i.e. downward).

The cover window 550 may be configured to be axially movable between a retracted position and an extended position corresponding respectively to a proximal axial position and a distal axial position of the cover window relative to image sensor 560. Lens barrel 520 may also have an operative state and a collapsed state corresponding respectively to a proximal axial position and a distal axial position of the lens barrel relative to image sensor 560. In the operative state of the lens barrel, image sensor 560 may be positioned in a focal plane or in an imaging plane of the objective assembly. In an active mode of the camera module, cover window 550 may be in the extended position and lens barrel 520 may be in the operative state while in an inactive mode of the camera module, cover window 550 may be in a retracted position and lens barrel 520 may be in a collapsed state. Lens barrel 520 may be positioned coaxially inwardly to carrier 530. In the operative state, image sensor 560 is positioned in a focal plane or in an image plane of the objective assembly. In the collapsed state, the camera module may be disabled i.e. the camera module may be unable to image a field of view of the objective assembly. The operative state of the lens barrel corresponds to a pop-out (active) mode of camera module 500 in which a TTL of the camera module is higher than a TTL of the camera module in the inactive mode.

Camera module 500 may include a barrel pop-out assembly configured to cause the lens barrel to axially move from the collapsed state to the operative state. The barrel pop-out assembly may be further configured to cause the lens barrel to axially move from the operative state to the collapsed state.

Camera module 500 may further include a cover window pop-out assembly configured to controllably move axially cover window 550 between the retracted position and the extended position. The cover window pop-out assembly may be configured for reversibly move the cover window between the retracted position and the extended position i.e. to move the cover window from the retracted position to the extended position and vice versa from the extended position to the retracted position. The cover window pop-out assembly comprises a driving cam 510 cooperating with carrier 530 via a coupling mechanism described in more details below. Carrier 530 is coupled to the driving cam so that a rotation in a first rotational direction of the driving cam causes cover window 550 to axially move from the retracted position to the extended position. A rotation in a second opposite rotational direction of the driving cam causes cover window 550 to axially move from the extended position to the retracted position. Cover window 550 may be configured to push lens barrel 520 into the collapsing state when lens barrel 520 is in the operative state and cover window 550 is operated by the cover window pop-out assembly to move from the extended position to the retracted position.

In the retracted position, cover window 550 may be positioned in close proximity to a most distal surface of lens barrel 520 in the collapsed state. Cover window 550 in the retracted position may abut on a most distal surface of lens barrel 520 in the collapsed state. In the extended position, cover window 550 may be configured to provide an axial gap with respect to the most distal surface of lens barrel 520. As explained in more details below, the barrel pop-out assembly may be configured to controllably move lens barrel 520 while carrier 530 is axially moved. Camera module 500 may also comprise a back housing 565 configured to receive the pop-out assembly and carrier 530. Retractable cover window 550 may be arranged axially movable relative to back housing 565.

The actuator 540 may comprise a motor 545 and a worm drive comprising a worm screw and a worm wheel as described above with reference to FIG. 4A. The worm wheel may form a ring geared to the worm screw. In the present embodiments, the worm wheel may be integral to driving cam 510. The driving cam may therefore have a wheel shape. Motor 545 may be configured to rotate the worm screw along its longitudinal axis. The worm screw may be configured to cause the worm wheel/driving cam 510 to rotate around the Z axis when it is rotated. Motor 545 may be a stepper motor. For switching the camera module from an active (pop-out) mode into an inactive (retracted) mode, motor 545 may actuate driving cam 510 in the second rotational direction via the worm screw. For switching the camera module from the inactive mode to the active mode, motor 545 may actuate driving cam 510 in the first rotational direction opposite to the second rotational direction via the worm screw. The driving cam may be maintained axially fixed with respect to the housing by a locking ring 572.

Carrier barrel 530 may be coaxially positioned inwardly of driving cam 510. Carrier 530 may be fixedly coupled to cover window 550 so that an axial movement of the carrier is transmitted to the cover window. Carrier barrel 530 and driving cam 510 may be coupled to form a helical cam so that a rotational motion of the driving cam 510 is transformed into an axial motion of carrier 530. Driving cam 510 may comprise one or more (e.g. three) radial pins 511 engaging carrier 530. Radial pins 511 may protrude inwardly of driving cam 510 into one or more (e.g. three) corresponding helical grooves 531 formed on an outer wall of the carrier barrel. The carrier may comprise one or more (e.g. three) carrier radial pins 532 protruding from an outer wall thereof through at least one corresponding axial groove in a central barrel of back housing 565 to maintain concentricity of carrier 530 relative to back housing 565.

Figure 17A:
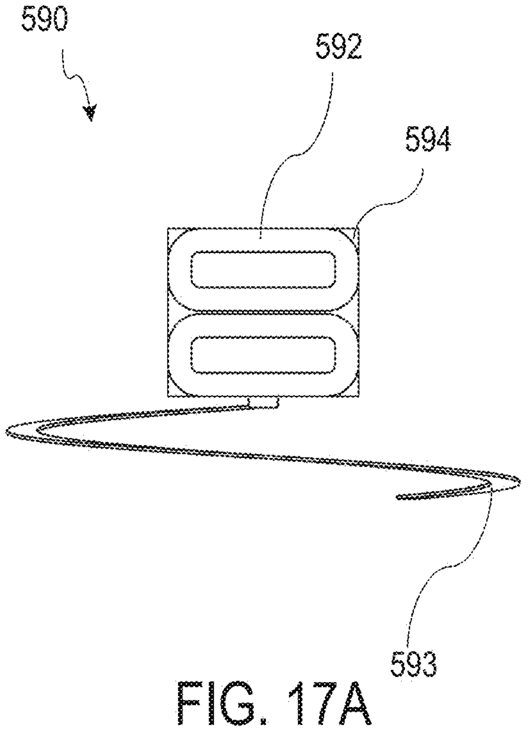
FIGS. 17A-17B show various views components of an auto focus module according to embodiments of the present disclosure.
Figure 17B:
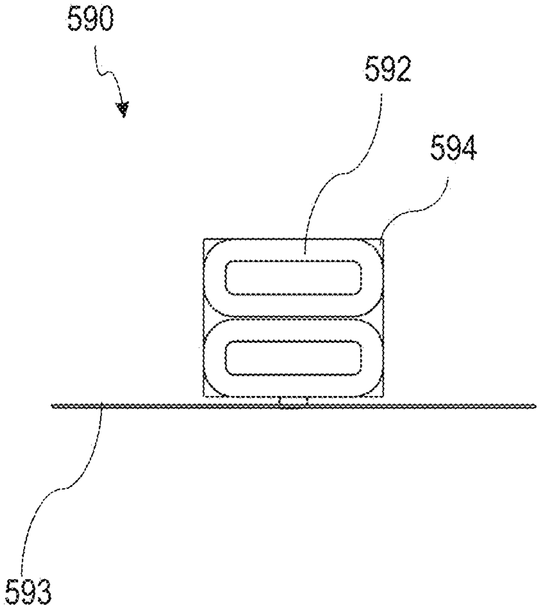

Lens barrel 520 may be coupled to carrier 530 via an axial coupling enabling axial movement of lens barrel 520 relative to carrier 530. The axial coupling between carrier 530 and lens barrel 520 may include two axial rails 522*a*, 522*b* formed in an interspace between lens barrel 520 and carrier 530 and bearing balls 521 enclosed in the axial rails 522*a*, 522*b* (see e.g. FIGS. 14A and 15A). The axial rails may extend along two axes parallel to the Z axis. The axial coupling between carrier 530 and lens barrel 520 may enable auto-focus capability in the operative state by allowing finely modifying the axial position of lens barrel 520 relative to sensor 560. In other words, balls 521 allow the movement of lens barrel 520 along the Z axis which is required for auto-focus capability. For performing AF, the lens barrel may move parallel to the Z axis with respect to carrier 530 and to image sensor 560. As can be seen for example in FIG. 13, the camera module may include an auto-focus (AF) module 590. AF module 590 may include a VCM configured for displacing axially lens barrel 520 relative to carrier 530. The VCM may be positioned in an interstice between carrier 530 and lens barrel 520. The VCM may include at least one (e.g. two) permanent magnet 591 fixed to an outer wall of lens barrel 520 and at least one (e.g. two) electrical coil 592 fixed to an inner wall of carrier 530. Electrical coil 592 may be configured so that, when lens barrel 520 is in the operative state, a current in electrical coil 592 is capable of inducing axial forces on permanent magnet 591, thereby causing axial movement of lens barrel 592 relative to carrier 530. This may allow enabling auto-focus capability of camera module 500. The auto-focus capability may provide for an axial motion between 0.1 mm to 5 mm. AF module 590 may further include a driving circuitry configured to operate the AF module and a position sensor (not shown) to determine a position of the lens barrel 520. AF module 590 may further comprise a printed circuit board (PCB) 594 which may be fixed to the inner wall of the carrier. The driving circuitry and the electrical coil 592 may be mounted on the PCB 594. Camera module 500 may further comprise a current supply wiring for supplying current to AF module 590. The current supply wiring may extend from a main PCB onto which sensor 560 may be mounted to PCB 594 onto which the at least one electrical coil 592 is mounted. The current supply wiring may be implemented in a flexure 593 configured to elastically deform between the collapsed state and operative state of the lens barrel as shown in FIGS. 17A-17B. A stiffness of the flexure 593 may be selected to be as small as possible. AF module 590 may further comprise a yoke 597 made of a ferromagnetic material and configured so that a magnetic interaction between yoke 597 and the at least one permanent magnet 591 fixed to lens barrel 520 provides a horizontal preload force component which contributes in maintaining the bearing balls 521 enclosed in the axial rails 522*a*, 522*b*. Additionally, the magnetic interaction between the yoke and magnet may axially lift the lens barrel 520 from the carrier 530. Yoke 597 may for example be positioned in the interstice accommodating the AF module 590 outwardly of PCB 594.

The barrel pop-out assembly may be implemented using the VCM of the AF module. The magnet and electrical coil may further be configured so that a current in the electrical coil induces axial forces on the permanent magnet so as to bring the lens barrel from the collapsed state to the operative state at least when the cover window pop moves from the retracted position into the extended position. The axial movement of the carrier may be transmitted to the electrical coil mounted on the carrier and a current applied in the electrical coil may induce axial forces in the magnet on the barrel so as to axially move the barrel. In other words, the barrel is electromagnetically moved while the carrier is mechanically moved via the driving cam. In other embodiments, the barrel may be moved axially from the collapsed state towards the operative state via a mechanical interaction between the shoulder recesses and flange protrusions when the carrier is axially moved. Alternatively, the shoulder recesses and flange protrusions may be used as a stopper in exceptional circumstances such as power failure or the VCM being out of an auto-focus range. Further, the magnet and electrical coil may be configured so that a current in the electrical coil induces axial forces on the permanent magnet to bring the lens barrel from the operative state into the collapsed state at least when the cover window moves from the extended position into the retracted position.

Figure 15A:
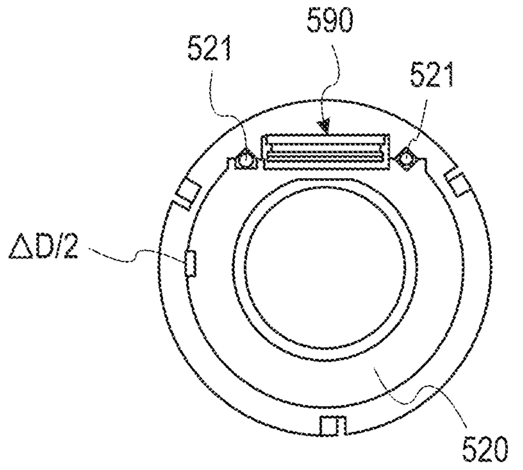
FIG. 15A shows a cross sectional view of some components of the camera module of FIG. 13 in an horizontal plane and FIG. 15B shows a corresponding cross sectional view of some components of a camera module without D-cut lens according to other embodiments of the present disclosure.
Figure 15B:
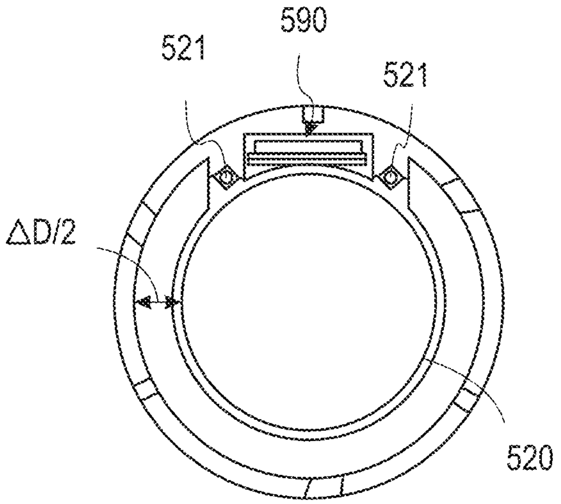
Figure 16A:
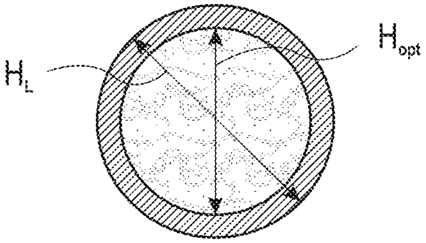
FIGS. 16A-16C generally show examples of a regular lens and D-cut lenses.
Figure 16B:
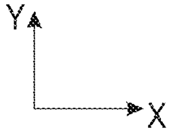
Figure 16B:
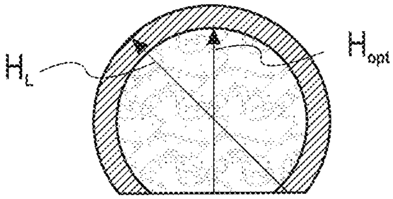
Figure 16C:
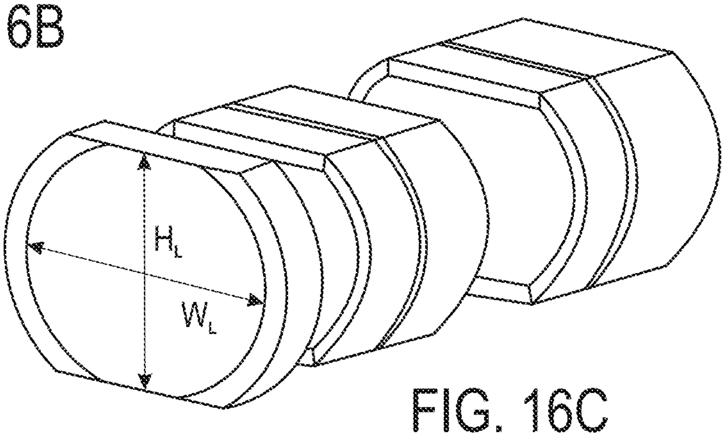

In some embodiments, at least one of the lens elements in the objective assembly is cut to form a D-cut lens, thereby freeing a D-cut volume as illustrated in FIGS. 16A-16B. The lens may be cut along one side (in other examples cut along two sides) by 10% to 40%, preferably by 10% to 30%. This means that a minimum optical height $H_{OPT\text{-}CUT}$ may be smaller by 10 to 50% than a maximum optical lens height $H_{OPT}$. FIGS. 16A-16C illustrate definitions related to cut lenses. FIG. 16A shows an axial symmetric lens element having a lens height $H_L$ and an optical lens height $H_{OPT}$. The lens height $H_L$ is equal to the optical lens height $H_{OPT}$ plus a mechanical part size contribution illustrated with dashed lines. The mechanical contribution is typically between 200 and 1000 microns. FIG. 16B shows a cut lens element having the same lens height along X as the axial symmetric lens shown in FIG. 16A. The cut lens elements has different $H_L$ and $H_{OPT}$ measured along different axes. For example, the maximum optical lens height $H_{OPT}$ (measured along Y) is larger than the minimum optical lens $H_{OPT\text{-}CUT}$ (measured along X). The cut lens element is cut with respect to Y along one side by about 25%. This means that $H_{OPT\text{-}CUT} \approx 0.75 \times H_{OPT}$. FIG. 16C shows a cut lens barrel including several cut lens elements which together form a cut lens. The cut lens is cut with respect to Y along two sides. As of the cutting, a width of the lens barrel $W_L$ is larger than a height of the lens barrel $H_L$. In the pop-out camera disclosed herein, the volume that is saved by the lens barrel which is cut with respect to Y along one side in comparison to an axial symmetric lens barrel is used to compactly integrate an AF module 590 into the pop-out camera. In other words, an outer shape of the lens barrel may preferably conform to the D-cut lens so that the D-cut volume is freed between barrel 520 and carrier 530. As shown in FIG. 15A, AF module 590 may preferably be integrated in the D-cut volume freed between barrel 520 and carrier 530. This may allow limiting a space requirement for installing a lens based AF module on camera module 500. In other words, by cutting the lens, a lens barrel carrying the lens can be smaller than a lens barrel for an axially symmetric lens thereby saving a cut volume. The AF module may be located in the cut volume thereby allowing a compact circular pop-out camera industrial design. The Applicant has found that the additional space required for integrating the AF actuator may be decreased by about 90% in comparison to a pop-out camera with an axial symmetric lens with a D-cut lens cut along Y on one side by about 20%. As shown for example on FIGS. 15A-15B, integrating an auto-focus in a D-cut volume freed between the barrel and the carrier may enable to limit an increase of diameter of the camera module due to the AF module and to limit a difference ΔD between a diameter of the lens barrel 520 and a diameter of the carrier 530 to be less than 0.05 mm, less than 0.5 mm, less than 1 mm, less than 2 mm, less than 3 mm or less than 6 mm.

Camera module 500 may further include a protective seal 585 configured to maintain impermeability of camera module 500 in the collapsed state and in the operative state as well as in intermediate states of camera module 500. Protective seal 585 may be configured to allow dust resistance. Protective seal 585 may be configured to meet the Ingress Protection code IP68 standards. Protective seal 585 may be a diaphragm. Protective seal 585 may form a foldable sleeve. One end of the sleeve may be fixed to an outer peripheral edge of carrier 530, and another end of the sleeve may be fixed to an inner peripheral edge of front housing 570.

Camera module 500 may also include an optical image stabilization system to provide stabilization capability. The OIS system may be configured to move sensor 560 in the sensor plane along the X and Y axes. The OIS system may additionally or alternatively be configured to move the sensor by rotating the sensor along a yaw, a pitch and/or a roll rotation axes, preferably along a yaw (Z) and pitch (X) rotation axes.

Generally, dimensions of camera module 500 may be in the following ranges: the camera module including the actuator may fit in a circle having a diameter between 6 and 50 mm. A diameter of the cover window may be between 5 and 40 mm. A height of the camera module in the inactive (collapsed) mode may be between 6 and 18 mm while in the active (pop-out) mode it may be between 7 and 30 mm. A variation of height between the inactive and active mode of the camera module may be between 1 and 15 mm.

Figure 18A:
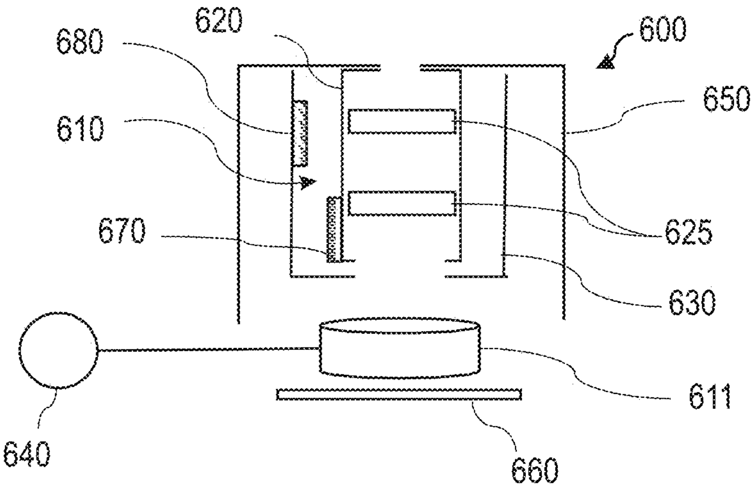
FIGS. 18A-18B show a schematic drawing of a general camera module according to a second aspect of the present disclosure respectively in an inactive mode and in an active mode.
Figure 18B:
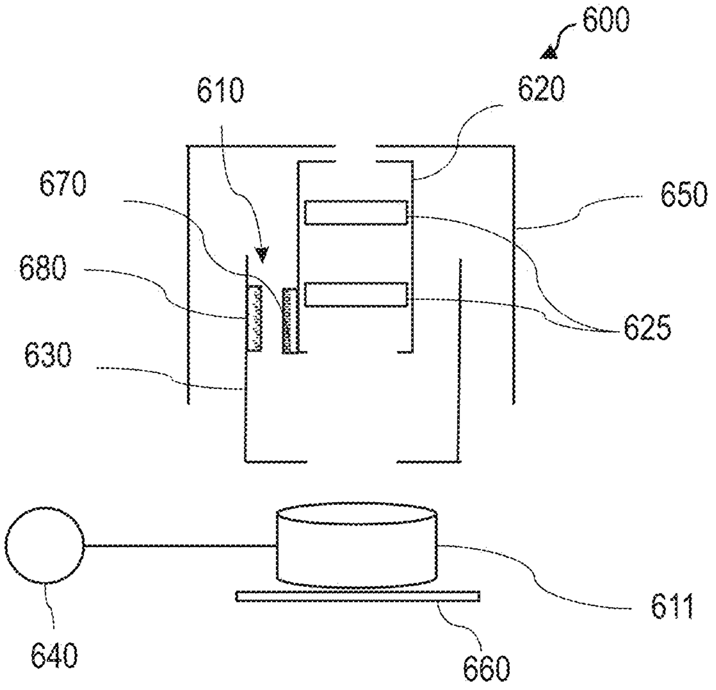

FIGS. 18A-18B show a schematic drawing of a general camera module 600 according to embodiments of a second aspect of the present disclosure respectively in a collapsed state and in an extended state.

Camera module 600 comprises a lens barrel 620, a carrier 630 configured to receive the lens barrel 620 and an image sensor 660. Camera module 600 may further comprise a retractable cover window 650. Lens barrel 620 comprises an objective assembly. The objective assembly may hold coaxially a plurality (e.g. four) lens elements 625 defining an optical axis Z of camera module 600. Carrier 630 may include a carrier barrel for receiving lens barrel 620. Lens barrel 620 may be positioned coaxially inwardly to carrier 630. Lens barrel 620 may be coupled to carrier 630 to allow axial displacement of lens barrel 620 relative to carrier 630. Lens barrel 620 and carrier 630 may be axially coupled using at least one or more (e.g. two) axial rails and corresponding one or more (e.g. two) bearing balls enclosed therebetween. Carrier 630 may be coupled to be axially fixed relative to image sensor 660 relative to the Z axis. Lens barrel 620 has an operative state and a collapsed state. In the operative state, image sensor 660 is positioned in a focal plane or in an imaging plane of the objective assembly. In the collapsed state, the camera module may be disabled i.e. the camera module may be unable to image a field of view of the objective assembly. The operative state of the lens barrel corresponds to a pop-out (active) mode of camera module 600 in which a TTL of the camera module is higher than a TTL of the camera module in the inactive mode.

Figure 19:
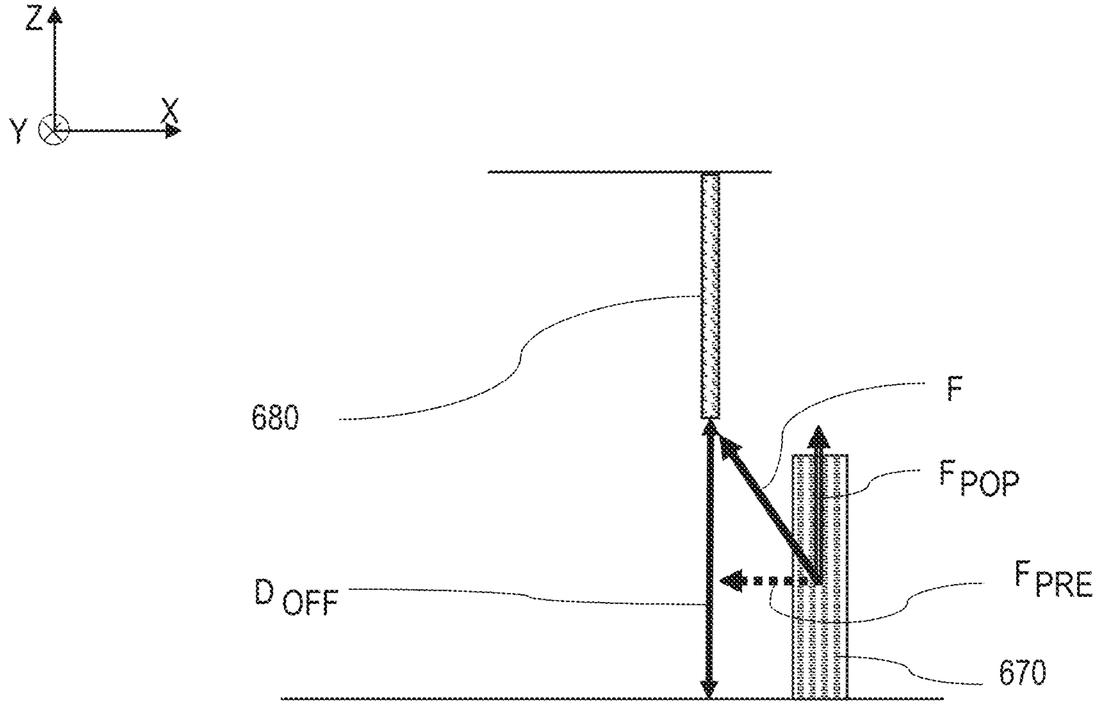
FIG. 19 show a schematic drawing illustrating magnetic forces in a collapsed state in the camera module of FIGS. 18A-18B.
Figure 21A:
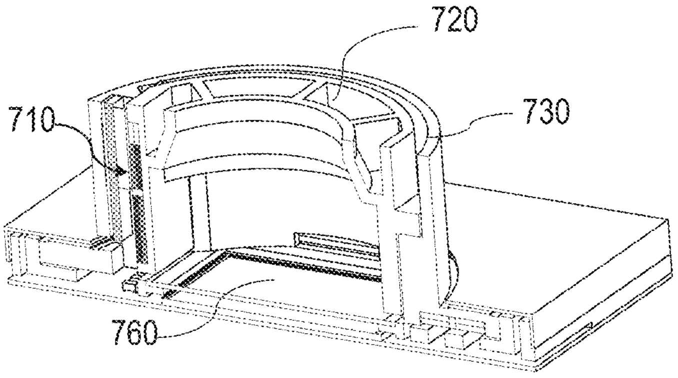
FIGS. 21A-21B illustrate cross-sectional isometric views of the camera module of FIGS. 20A-20B with some components hidden, respectively in an inactive mode and in an active mode.
Figure 21B:
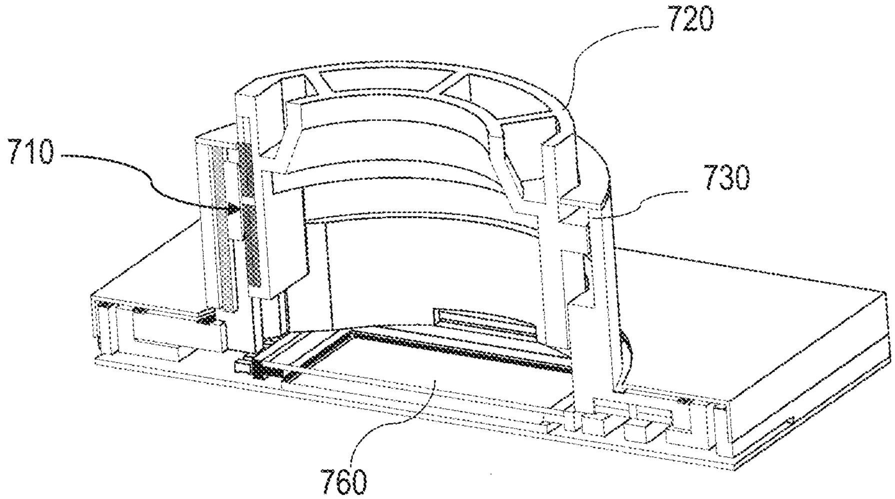
Figure 22A:
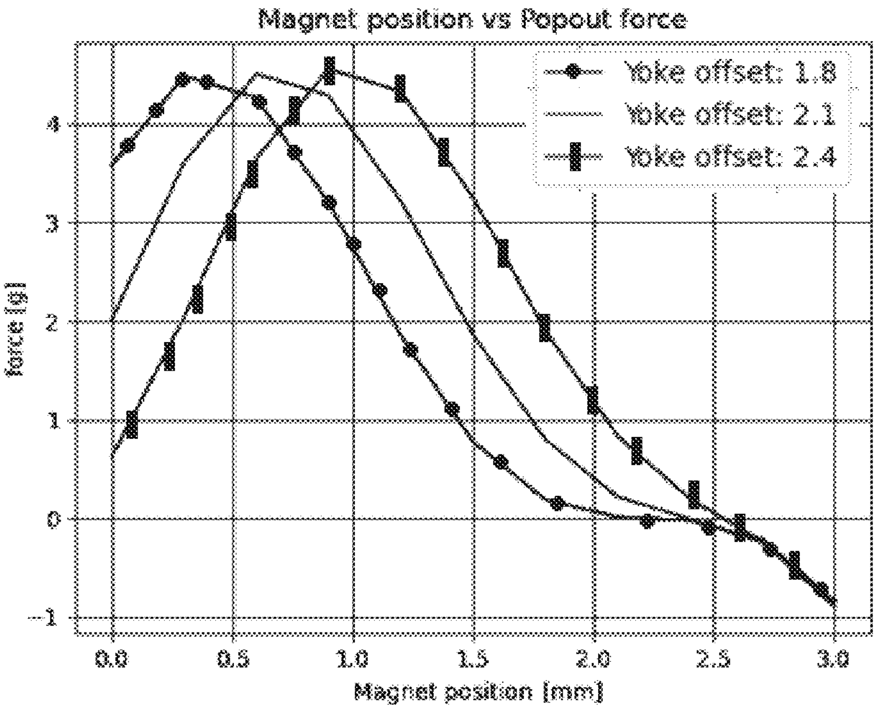
FIGS. 22A-22B show experimental data for different configurations of a magnetic spring according to embodiments of the second aspect of the present disclosure.
Figure 22B:
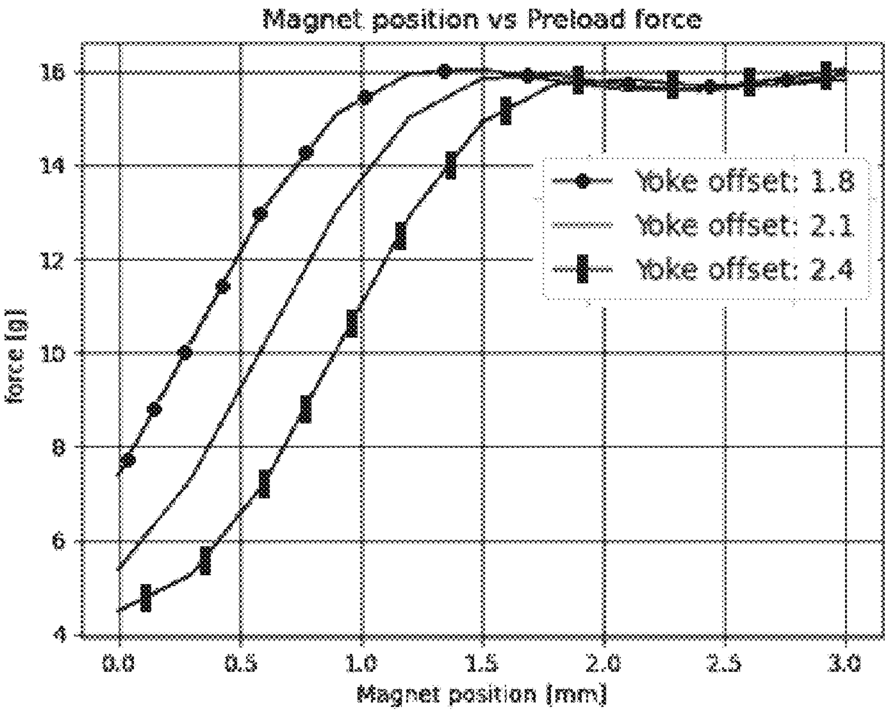

Camera module 600 further includes a barrel pop-out assembly configured to controllably move lens barrel 620 from the collapsed state to the operative state. The barrel pop-out assembly comprises a magnetic spring assembly 610 configured to bias lens barrel 620 in the operative state. Magnetic spring assembly 610 comprises at least one permanent magnet 670 fixed to lens barrel 620 and a ferromagnetic yoke 680 fixed to carrier 630. Magnetic spring 610 may be configured to cause lens barrel 620 to axially move relative to carrier 630 from the collapsed state towards the operative state. The magnetic spring assembly may be positioned in an interstice between carrier 630 and lens barrel 620. The at least one permanent magnet 670 may be fixed to an outer wall of lens barrel 620. Yoke 680 may be fixed to an inner wall of the carrier barrel. In other words, the present aspect provides using magnetic forces applied on the yoke by the permanent magnet to produce a vertical biasing force on lens barrel 620 in the manner of a spring. FIG. 19 is a schematic diagram illustrating the magnetic force F applied on magnet 670, its vertical pop-out component $F_{POP}$ and horizontal preload component $F_{PRE}$. The horizontal preload force component $F_{PRE}$ may contribute in maintaining the bearing balls enclosed in the axial rails coupling lens barrel 620 and carrier 630. As shown in FIGS. 22A-22B for the embodiment presented in FIGS. 18-21, the magnetic force F depends on a position and orientation of magnet 670 relative to ferromagnetic yoke 680 and in particular on an initial offset distance $D_{OFF}$ between the yoke and magnet in the collapsed state. The magnetic spring assembly may be configured such as to create a pop-out force capable of overcoming a weight of the lens barrel, when the weight of the lens barrel resists the axial movement of the lens barrel from the collapsed state to the operative state. In some embodiments, the magnetic spring assembly may be configured such that the pop-out force in the collapsed state may be of about 0.5 g to 4 g.

Retractable cover window 650 may also be configured to controllably move axially between a retracted position and an extended position. In the retracted position, cover window 650 may be positioned to abut on the most distal surface (e.g. a rim) of lens barrel 620 in the collapsed state. In the extended position, cover window 650 may be positioned to provide for an axial gap with the most distal surface of lens barrel 620 in the operative state. The motion of cover window 650 between the retracted and extended positions and motion lens barrel 620 between the collapsed and extended positions may be coordinated. The axial movement of the cover window 650 may be driven by a cover window pop-out assembly 611 operated by an actuator 640. In the retracted position, cover window 650 may be configured to hold lens barrel 620 in the collapsed position. In other words, the cover window in the retracted position may overcome the magnetic force of magnetic spring assembly 610. In the extended position, the cover window may be configured to provide for an axial gap with lens barrel 620 in the operative state. The axial gap may allow some axial movement lens barrel 620 from the operative state thereby allowing auto-focus capability. Window cover 650 may further be configured to cause the lens barrel to move from the operative state to the collapsed state when the cover window is operated to move from the extended position to the retracted position by window cover pop-out assembly 611. In other words, the window cover may push on the lens barrel and collapse lens barrel 620 in the collapsed state when moving from extended position to the retracted position upon operation of window cover pop-out assembly 611. When cover window 650 is moved from the retracted position to the extended position, lens barrel 620 is released and the magnetic force may drive lens barrel 620 towards the operative state. In some embodiments, the cover window pop-out assembly may be any of the cover window pop-out assembly described with reference to FIGS. 9-12. In some embodiments, the cover window pop-out assembly may driven by a compression spring. The compression spring may bias the cover window towards the extended position. The cover window may be held in the retracted position by a latch mechanism. The latch mechanism may be actuated for example by a user requesting use of the camera on the portable electronic device on which the camera module is mounted or by a user manipulating mechanically the camera module e.g. by pushing on the cover window. The spring may be reloaded by a user moving the cover window in the retracted position for example by pushing down the cover window until the latch mechanism latches the cover window in the retracted position.

Camera module 600 may further include an AF module comprising at least one electrical coil fixed to an inner wall of the carrier barrel. The electrical coil may be configured so that, when the lens barrel moves towards the operative state into an auto-focus range, a current in the at least one electrical coil is capable of inducing axial forces on the at least one permanent magnet to cause axial movement of the lens barrel and enable auto-focus capability of the camera module. The auto-focus range may refer to positions along the Z axis for which the electrical coil may induce forces capable of axially moving the lens barrel. Magnetic spring assembly 610 may be configured to move the lens barrel within the auto-focus range. In some embodiments, the AF module may allow maintaining lens barrel 620 in the operative state. In some embodiments, the pop-out force may allow maintaining the barrel 620 in the operative state. As can be understood, the pop-out force may be significantly smaller in the operative state than in the collapsed state. The magnetic spring may be relaxed in the operative state and the small pop-out force may then be overcome by the interaction of the auto-focus electrical coil and the permanent magnet in order to focus the camera. The AF module may further include a driving circuitry configured to operate the AF module and a optionally position sensor (not shown) to determine a vertical position of lens barrel 620. The AF module may further comprise a PCB which may be fixed to the inner wall of the carrier. The driving circuitry and the electrical coil may be mounted on the PCB. Camera module 600 may further comprise a current supply wiring for supplying current to the AF module. The current supply wiring may extend from a main PCB onto which sensor 660 may be mounted to the PCB onto which the at least one electrical coil is mounted.

Lens barrel 620 may include one or more lens elements having at least one D-cut shape. For example, 10% to 50% of the optical height of any D-cut lens may be removed. Lens barrel 620 may conform to the D-cut shape, thereby freeing a D-cut volume between carrier 630 and lens barrel 620. The AF module may preferably be integrated in the D-cut volume between carrier 630 and lens barrel 620. This may enable to limit an increase of diameter of the camera module due to the AF module and to limit a difference ΔD between a diameter of lens barrel 620 and a diameter of carrier 630 to be less than 0.05 mm, less than 0.5 mm, less than 1 mm, less than 2 mm, less than 3 mm or less than 6 mm.

Camera module 600 may also include an optical image stabilization system to provide stabilization capability. The OIS system may be configured to move sensor 660 in the sensor plane along the X and Y axes. The OIS system may additionally or alternatively be configured to move the sensor by rotating the sensor along a yaw, a pitch and/or a roll rotation axes, preferably along a yaw (Z) and pitch (X) rotation axes. In some embodiments, the OIS system may additionally or alternatively be provided by moving carrier 630 and lens barrel in the sensor plane along the X and Y axes using for example an OIS assembly according to the third aspect of the present disclosure.

Generally, camera module 600 may be configured to be waterproof. The camera module may include a protective seal configured to maintain impermeability of the camera module in the collapsed state and in the operative state as well as in intermediate states of camera module 600. Camera module 600 may also include an optical filter configured for filtering out a predetermined portion of the electromagnetic spectrum detectable by the image sensor. This may enable to filter non-visible radiations such as infrared radiations.

Generally, dimensions of camera module 600 may be in the following ranges: the camera module including the actuator may fit in a circle having a diameter between 6 and 50 mm. A diameter of the cover window may be between 5 and 40 mm. A height of the camera module in the inactive (collapsed) mode may be between 6 and 18 mm while in the active (pop-out) mode it may be between 7 and 30 mm. A variation of height between the inactive and active mode of the camera module may be between 1 and 15 mm.

Figure 20A:
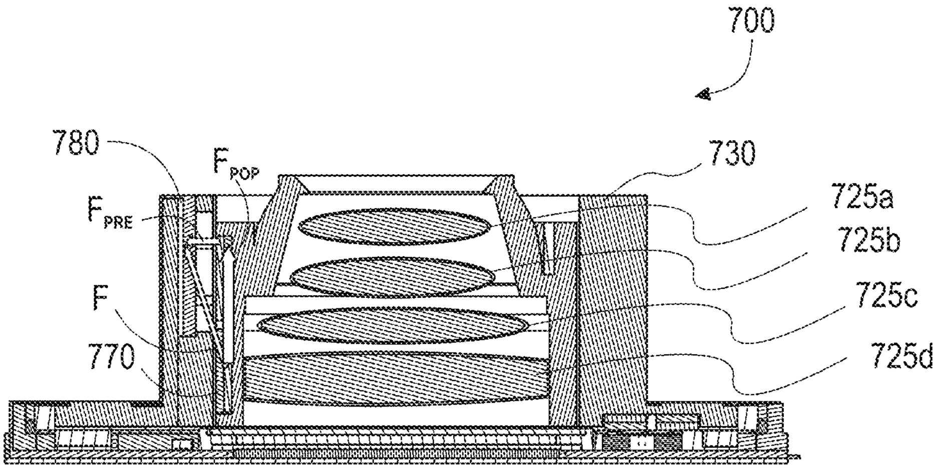
FIGS. 20A-20B illustrate cross-sectional views of a camera module according to embodiments of the second aspect, respectively in an inactive mode and in an active mode.
Figure 20B:
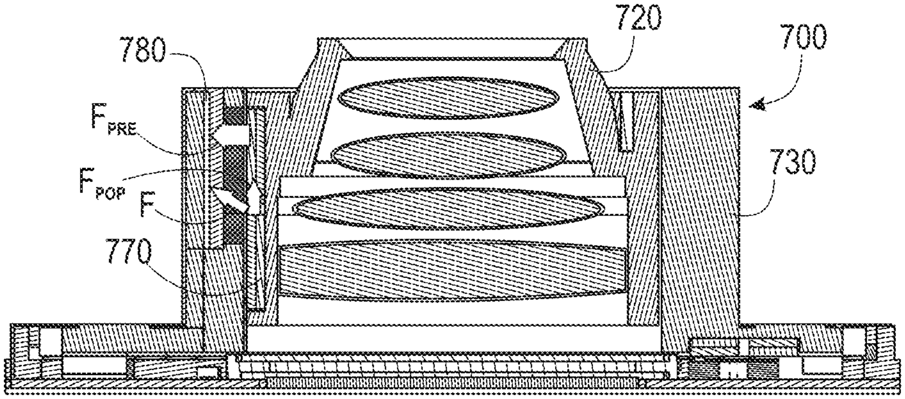

FIGS. 20A-20B illustrate respectively cross-sectional views of a camera module 700 in an inactive mode and in an active mode according to embodiments of the second aspect of the present disclosure. FIGS. 21A-21B illustrate cross-sectional isometric views of components of the camera modules of FIGS. 20A-20B respectively in a collapsed state and in an extended state.

Camera module 700 comprises a lens barrel 720, a carrier 730 configured to receive the lens barrel 720 and an image sensor 760. Camera module 700 may further comprise a retractable cover window (not shown) operated by a cover window pop-out assembly and actuator (not shown). Lens barrel 720 comprises an objective assembly. The objective assembly holds coaxially four lens elements 725*a*-725*d* defining an optical axis Z of camera module 700. Lens barrel 720 includes a lens element having two D-cuts. Lens barrel 720 conforms to the D-cut shape(s) hereby freeing a D-cut volume between carrier 730 and lens barrel 720.

Carrier 730 includes a carrier barrel for receiving lens barrel 720. Lens barrel 720 is positioned coaxially inwardly to carrier 730. Lens barrel 720 is coupled to carrier 730 to allow axial displacement of lens barrel 720 relative to the carrier 730. Lens barrel 720 and carrier 730 are axially coupled using two axial rails and corresponding two bearing balls enclosed therebetween in a way similar to that shown on FIG. 11A. Carrier 730 is mounted on an OIS assembly axially fixed relative to image sensor 760 relative to the Z axis. The OIS assembly is detailed hereinbelow with respect to the third aspect of the present disclosure. Lens barrel 720 has an operative state and a collapsed state. In the operative state, image sensor 760 is positioned in a focal plane or in an imaging plane of the objective assembly. In the collapsed state, the camera module may be disabled i.e. the camera module may be unable to image a field of view of the objective assembly. The operative state corresponds to a pop-out mode of camera module 700 in which a TTL of the camera module is higher than a TTL of the camera module in the inactive mode.

Camera module 700 further includes a pop-out assembly configured to controllably move lens barrel 720 from the collapsed state to the operative state. The pop-out assembly comprises a magnetic spring assembly 710 configured to bias lens barrel 720 in the operative state. Magnetic spring assembly 710 comprises at least one permanent magnet 770 fixed to the lens barrel 720 and a ferromagnetic yoke 780 fixed to carrier 730. Magnetic spring assembly 710 is configured to cause lens barrel 720 to axially move relative to carrier 730 from the collapsed state towards the operative state. Magnetic spring assembly 710 is positioned in an interstice between the carrier 730 and lens barrel 720. The at least one permanent magnet 770 is fixed to an outer wall of lens barrel 720. Yoke 780 is fixed to an inner wall of the carrier barrel.

Camera module 700 includes an AF module comprising at least one electrical coil fixed to an inner wall of the carrier barrel. The AF module is integrated in the D-cut volume freed between carrier 730 and lens barrel 720. The electrical coil is configured so that, when the lens barrel moves towards the operative state into an auto-focus range, a current in the at least one electrical coil is capable of inducing axial forces on at least one permanent magnet 770 to cause axial movement of the lens barrel and enable auto-focus capability of the camera module. The auto-focus range may refer to positions along the Z axis for which the electrical coil may induce forces capable of axially moving the lens barrel. Magnetic spring assembly 710 is configured to move lens barrel 720 within the auto-focus range. In some embodiments, the AF module may allow maintaining lens barrel 720 in the operative state. In some embodiments, the pop-out force of magnetic spring assembly 710 may allow maintaining lens barrel 720 in the operative state.

Generally, dimensions of camera module 700 may be in the following ranges: the camera module including the actuator may fit in a circle having a diameter between 6 and 50 mm. A diameter of the cover window may be between 5 and 40 mm. A height of the camera module in the inactive (collapsed) mode may be between 6 and 18 mm while in the active (pop-out) mode it may be between 7 and 30 mm. A variation of height between the inactive and active mode of the camera module may be between 1 and 15 mm.

FIGS. 22A-22B respectively show the pop-out force and preload force of the magnetic spring on a stroke of the magnet along the Z axis for different offset distances between the yoke and the magnet in the collapsed state. As can be seen in FIG. 22A, in which data is presented for a yoke offset distance of 1.8 mm, 2.1 mm and 2.4 mm, the pop-out force varies with the yoke offset distance. It is possible to determine a yoke offset distance which provides a pop-out force able to lift the lens barrel within the auto-focus range or directly into the operative state. As can be seen in FIG. 22B, the preload force also varies with the yoke offset distance and along the magnet stroke.

Figure 23A:
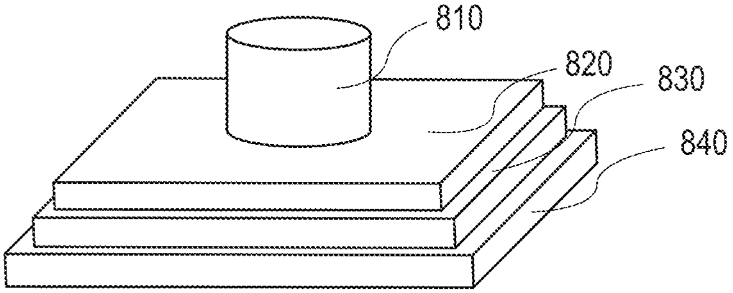
FIGS. 23A-23C shows schematic drawings illustrating generally an OIS module according to embodiments of a third aspect of the present disclosure.
Figure 23B:
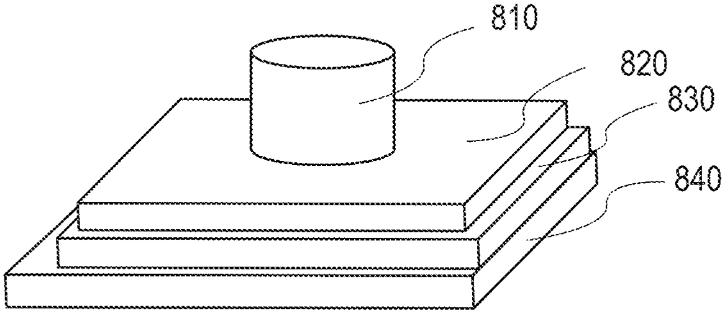
Figure 23C:
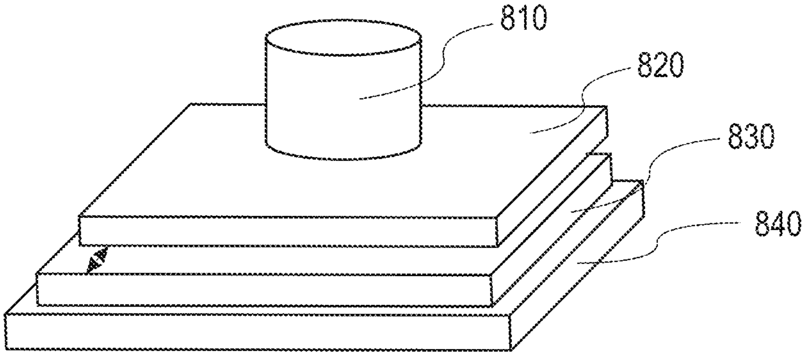

FIG. 23A-23C show schematic drawings illustrating generally an OIS system 800 according to embodiments of a third aspect of the present disclosure. The presently disclosed OIS system may have a low-shoulder (i.e. dimension along the Z axis) in comparison with standard systems. OIS system 800 may be configured to move a lens barrel of a camera module relative to the sensor. OIS system 800 may be configured to provide for a displacement of the objective assembly in two transverse directions in a plane perpendicular to an optical axis of the lens barrel. OIS system 800 may be configured to support a carrier of a camera module according to embodiments of the present disclosure.

OIS system 800 comprises a bottom OIS frame 840, an intermediate OIS frame 830 and a top OIS frame 820. These may be referred to henceforth simply as "frames". The bottom, intermediate and top frames may generally be substantially flat structures extending substantially into an OIS plane. The OIS frames may have a plate shape. Each OIS frame may include a hollow central portion to allow light to impinge on the image sensor. OIS system 800 may be configured to be mounted over an image sensor (not shown) defining a horizontal plane. Bottom frame 840 may be configured to be fixedly coupled relative to the image sensor. Bottom frame 840 may be configured to be mounted on a PCB onto which the sensor may be mounted centered on the sensor and such that the OIS plane is parallel to the sensor plane. Intermediate frame 830 may be configured to be mounted on bottom frame 840. Intermediate frame 830 may be coupled to be axially displaceable relative to bottom frame 840 in a direction Y parallel to the horizontal sensor plane. Intermediate frame 830 may be coupled to bottom frame 840 to resist axial displacement in a direction X transverse to the Y direction and parallel to the sensor plane. For example, intermediate frame 830 may have (only) one degree of freedom according to the Y direction with respect to bottom frame 840. In some embodiments, bottom frame 840 and intermediate frame 830 may include one or more parallel rails in the Y direction to allow axial displacement/shifting of intermediate frame 830 relative to bottom frame 840. In some embodiments, the one or more parallel rails may enclose bearing balls to ensure low friction coupling between intermediate frame 830 and bottom frame 840. Top frame 820 may be configured to be mounted onto intermediate frame 830. Top frame 820 may be coupled to be axially displaceable relative to intermediate frame 830 in the X direction transverse to the direction Y and parallel to the sensor plane. Top frame 820 may be coupled to intermediate frame 830 to resist axial displacement in the Y direction transverse to the X direction. For example, top frame 820 may have (only) one degree of freedom according to the X direction with respect to intermediate frame 830. In some embodiments, top frame 820 and intermediate frame 830 may include one or more parallel rails in the X direction to allow axial displacement of top frame 820 relative to intermediate frame 820. In some embodiments, the one or more parallel rails may enclose bearing balls to ensure low friction coupling between intermediate frame 830 and top frame 820. Top frame 820 may be configured to fixedly support a carrier barrel 810 of a camera module. Carrier barrel 810 may be configured to receive a lens barrel. In some embodiments, carrier barrel 810 may be integral to top frame 820.

OIS system 800 may further comprise a VCM mechanism (or more generally a linear motion induction motor mechanism) configured for selectively displacing top frame 820 relative to the intermediate frame according to the X direction. The VCM mechanism may further be configured for selectively displacing intermediate frame 830 (and together with intermediate frame 830, top frame 820 carried thereon) relative to bottom frame 840 in the Y direction. In other words, the VCM mechanism may be configured for selectively displacing top frame 820 according to the X and/or Y axes. The VCM mechanism may include one VCM for OIS actuation along the X direction and another VCM for OIS actuation along the Y direction. OIS system 800 may include a first and second permanent magnets defining respectively a first and second magnetic axes. In some embodiments, the first and second permanent magnets may be fixed to top frame 820 so that the first and second magnetic axes are respectively colinear to the X and Y axes. In some embodiments, one permanent magnet may be fixed to top frame 820 so that its magnetic axis is parallel to the X axis and the other permanent magnet to intermediate frame 830 so that its magnetic axis is parallel to the Y axis. The first permanent magnet having its magnetic axis parallel to the X axis and the second permanent magnet having its magnetic axis parallel to the Y axis may respectively be referred to as X magnet and Y magnet. Further, OIS system 800 may include a first and second electrical coils configured to cooperate respectively with the first and second permanent magnets configured so that a current in the first electrical coil and/or second electrical coil is capable of inducing axial forces on the first permanent magnet and/or on the second permanent magnet thereby causing axial movement of the top frame in the X and/or Y directions. In some embodiments, OIS system 800 may further include additional sets of magnets and corresponding coils. OIS system 800 may further include a controller. OIS system 800 may further include a hall position sensor to allow feedback on the frames' positions. OIS system 800 may also include a yoke positioned in the sensor plane so that a magnetic force exerted by the X and Y magnets on the yoke keeps the layered structure together thereby keeping the bearing balls enclosed in the rails.

OIS system 800 may be integrated to a camera module according to the second aspect of the present disclosure. The carrier of the camera module may be fixedly coupled to top frame 820 of OIS system 800 so that a motion of the top frame is transmitted to the carrier. In some embodiments, the carrier may be integral to top frame 820.

External dimensions of OIS system 800 may be such that OIS system 800 may fit in a circle having a diameter between 6 and 50 mm.

Figure 24:
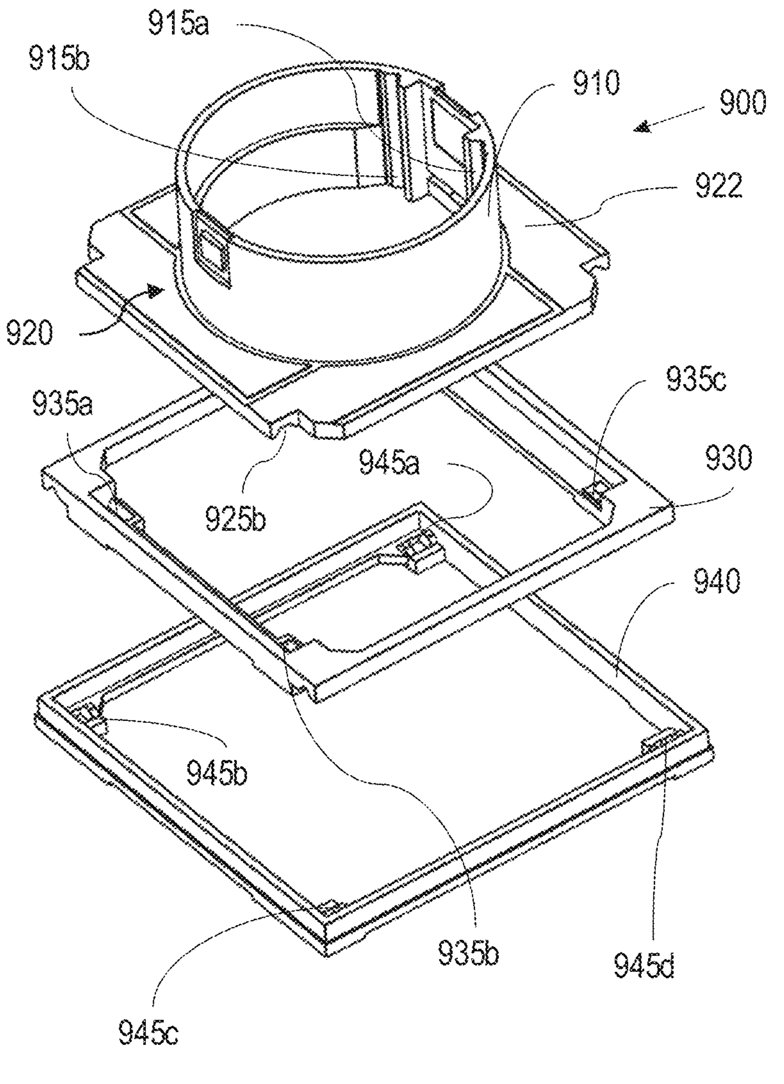
FIG. 24 shows an OIS system according to embodiments of the third aspect of the present disclosure.
Figure 25A:
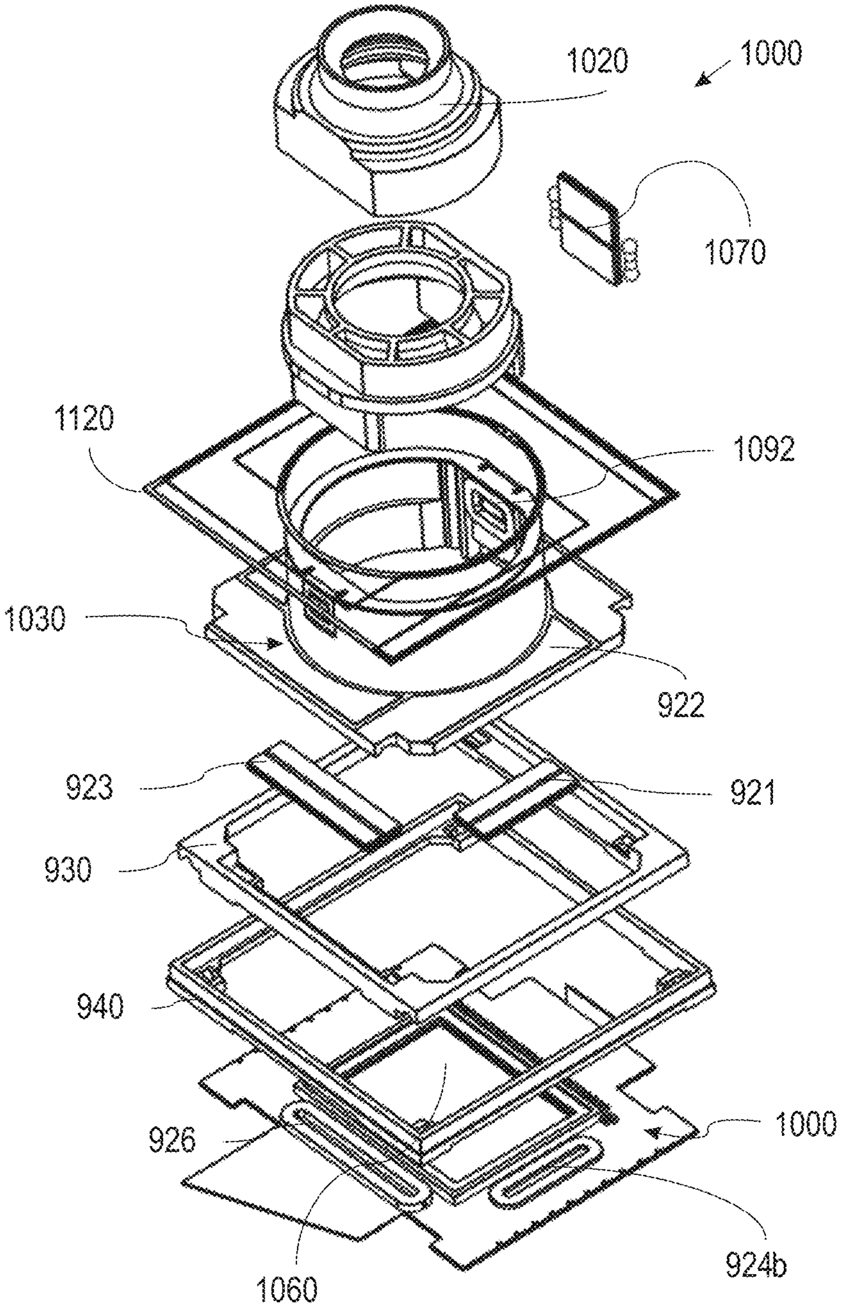
FIGS. 25A-25B illustrates respectively an exploded view and an isometric view of a camera module including the OIS system of FIG. 24 according to embodiments of the present disclosure.
Figure 25B:
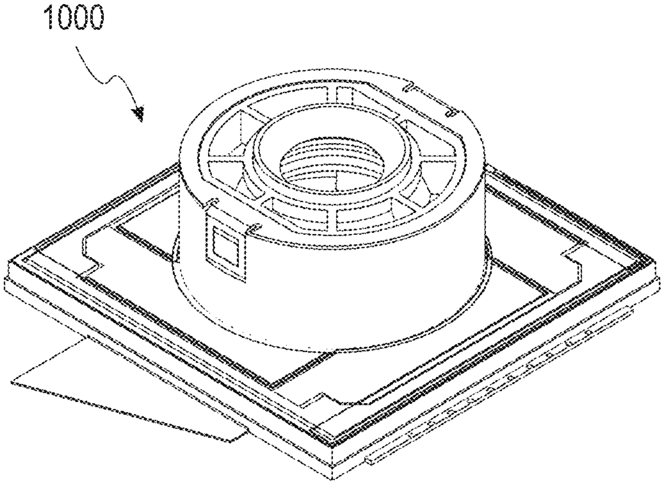

FIG. 24 illustrates an OIS system 900 according to the third aspect of the present disclosure. OIS system 900 includes a bottom frame 940, an intermediate frame 930 and a top frame 920. Top frame 920 may be fixedly coupled to a barrel 910 via a flange 922 extending radially at a base thereof. Barrel 910 may be generally similar to carrier 730 described with reference to FIG. 20. In particular, barrel 910 may be configured to coaxially receive a lens barrel while enabling axial movement of the lens barrel along the Z direction via a vertical axial coupling 915*a*-915*b*. Further, barrel 910 may be configured to receive an AF module (particularly a ferromagnetic yoke and an electrical coil) for moving the lens barrel received therein as explained above. A bottom side of flange 922 may be configured to hold the first and second permanent magnets. The bottom frame 940 may be configured to be fixed onto a PCB. Bottom frame 940 and intermediate frame 930 may be axially coupled using an axial coupling mechanism allowing movement along the Y direction. For example, the axial coupling mechanism (also referred to as rail coupling) may comprise bottom projections 945*a*-945*d* protruding from an upper surface of bottom frame 940 and cooperating with intermediate rails (i.e. axial grooves, not visible) formed on a lower surface of intermediate frame 930. Bottom projections 945*a*-945*d* may extend axially in a Y direction parallel to the image sensor plane. At least some and preferably each of bottom projections 945*a*-945*d* may be formed of an axial protrusion having a predefined (e.g. triangular) cross sectional shape. At least some and preferably each of projections 945*a*-945*d* may include a recess configured to accommodate a bearing ball. The intermediate rails may be configured to face bottom projections 945*a*-945*d* and have the same predefined (e.g. triangular) cross sectional shape so as to be capable of receiving bottom projections 945*a*-945*d* and enable sliding of intermediate frame 930 over bottom frame 940 in the Y direction while preventing movement in a X direction perpendicular to the Y direction and parallel to the image sensor plane. Top frame 920 and intermediate frame 930 may be axially coupled using an axial coupling mechanism allowing relative movement along the X direction. For example, the axial coupling mechanism may comprise a similar rail coupling as described above between bottom frame 940 and intermediate frame 930 involving intermediate projections 935*a*-935*d* and top rails 925*a*-925*d* to allow movement of top frame 920 relative to intermediate frame 930 along the X direction.

Figure 26:
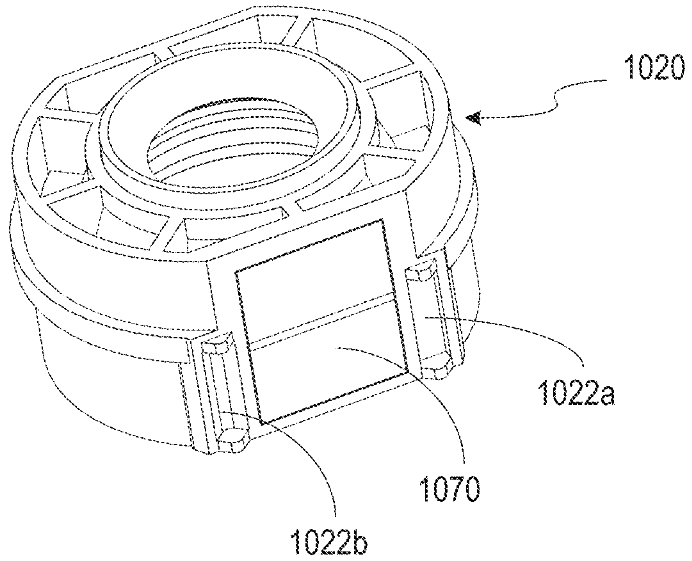
FIG. 26 illustrates an isometric view of a lens barrel of the camera module of FIG. 25 according to some embodiments of the present disclosure.
Figure 27A:
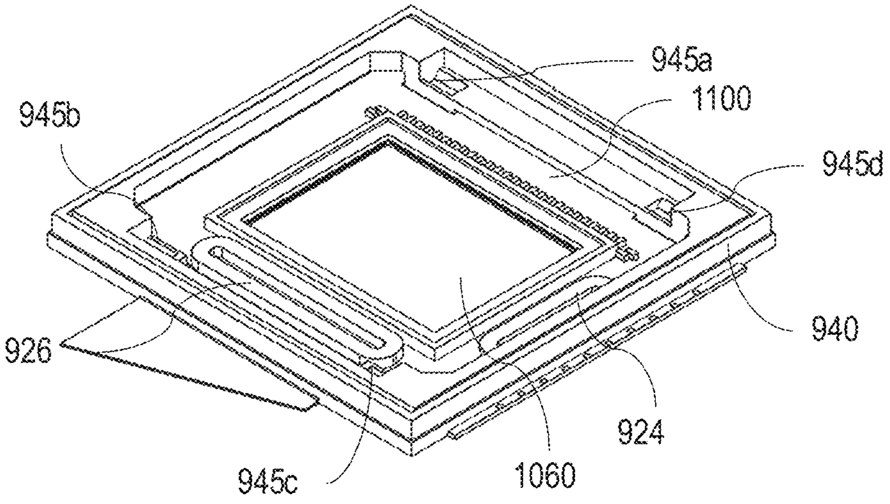
FIGS. 27A-27B show isolated elements of the camera module of FIG. 25 according to some embodiments of the present disclosure.
Figure 27B:
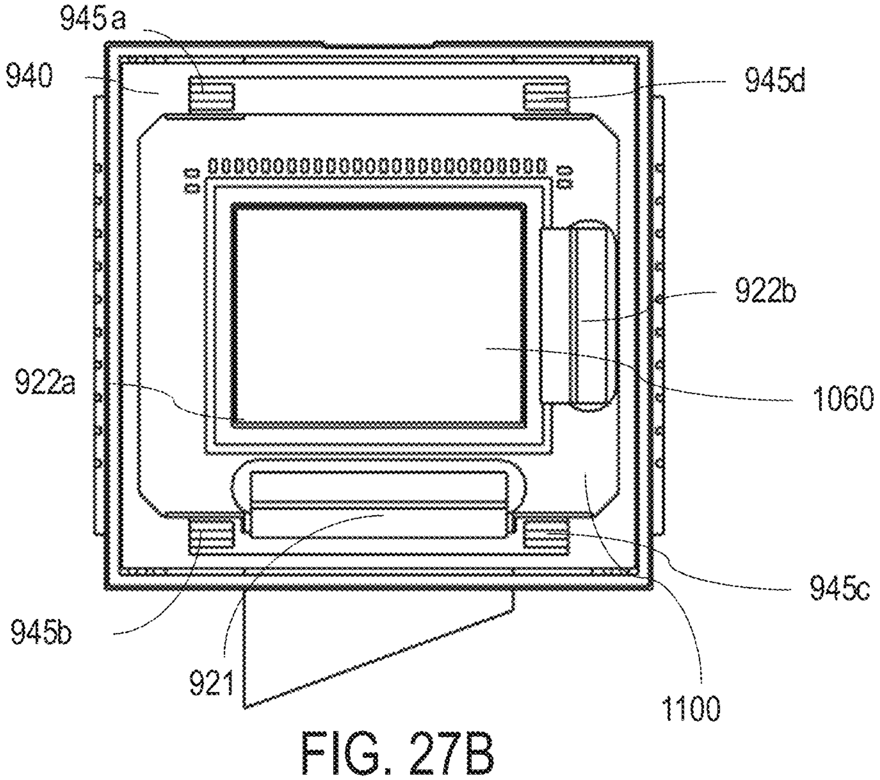
Figure 28:
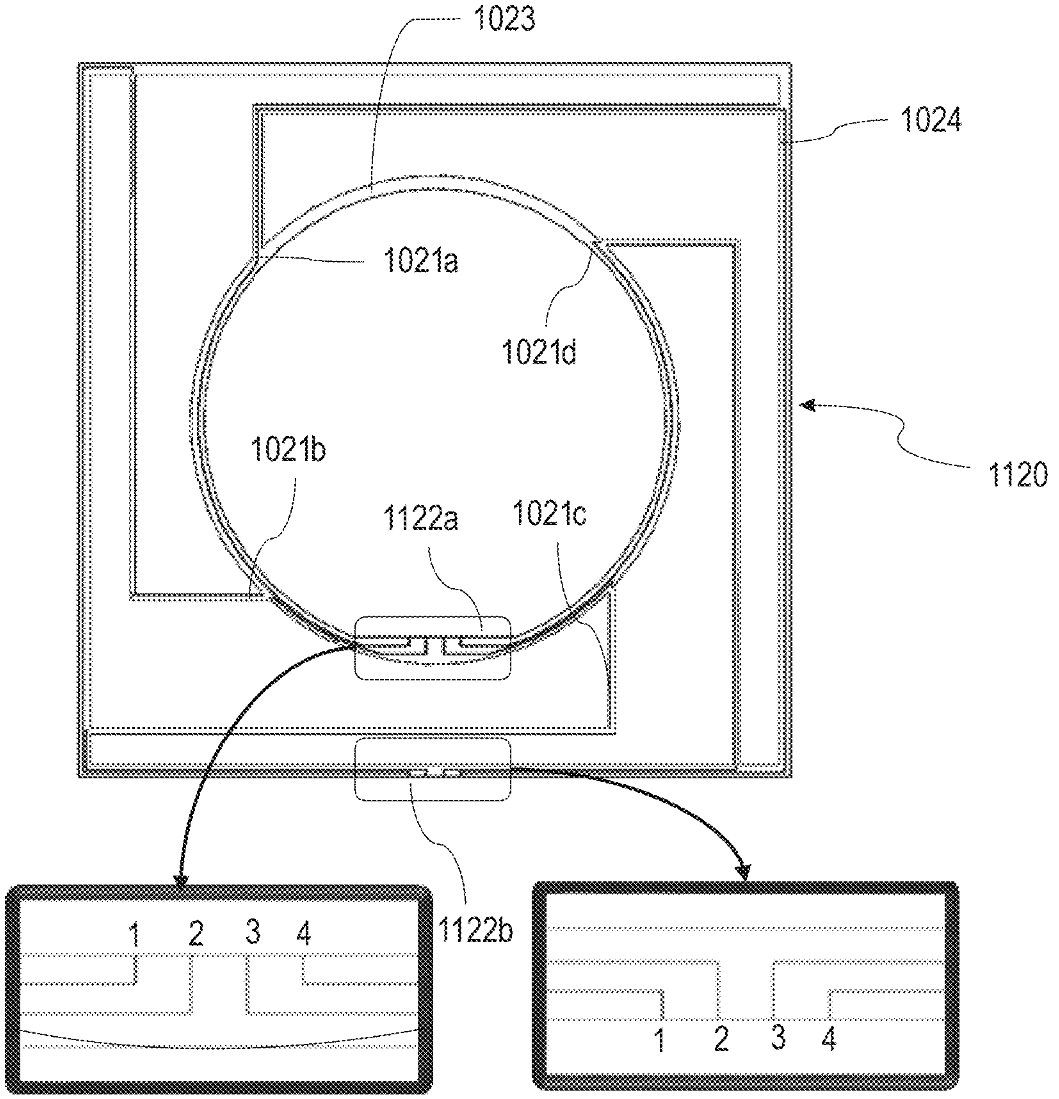
FIG. 28 shows an isolated element of the camera module of FIG. 25 according to some embodiments of the present disclosure.

FIGS. 25-28 illustrate a camera module 1000 according to embodiments of the present disclosure. FIGS. 25A-25B show camera module 1000 respectively in an exploded view and in an assembled isometric view. FIGS. 26-28 show isolated components of camera module 1000. Camera module 1000 combines the second aspect (i.e. generally, a pop-out mechanism of the lens barrel performed using a magnetic spring) and the third aspect of the present disclosure (i.e. generally a three-layer OIS system for displacing the lens barrel in a plane parallel to the image sensor).

Camera module 1000 may include a lens barrel 1020, a carrier 1030 configured to receive the lens barrel 1020 and an image sensor 1060. Camera module 1000 may further comprise a retractable cover window (not shown) operated by a cover window pop-out assembly and actuator (not shown). Lens barrel 1020 comprises an objective assembly. The objective assembly holds coaxially a plurality of lens elements defining an optical axis Z of camera module 1000. Lens barrel 1020 includes one lens element having at least one D-cut shape. Lens barrel 1020 conforms to the D-cut shape(s) hereby freeing a D-cut volume between the carrier 1030 and the lens barrel 1020.

Carrier 1030 includes a carrier barrel for receiving lens barrel 1020. Lens barrel 1020 is positioned coaxially inwardly to carrier 1030. Lens barrel 1020 is coupled to carrier 1030 to allow axial displacement of lens barrel 1020 relative to carrier 1030. Lens barrel 1020 and carrier 1030 are axially coupled using one or more (e.g. two) axial rails 1022*a*, 1022*b* and corresponding one or more (e.g. two) bearing balls enclosed therebetween. Carrier 1030 is mounted on OIS system 900 described with reference to FIG. 24. Image sensor 1060 is mounted on a main PCB 1100. Bottom frame 940 is mounted on the main PCB 1100 centered above the image sensor 1060. Bottom frame 940 and intermediate frame 930 may be axially coupled using an axial coupling mechanism allowing movement of intermediate frame 930 relative to bottom frame 940 along the Y direction. Top frame 920 and intermediate frame 930 may be axially coupled using an axial coupling mechanism allowing relative movement of top frame 920 relative to intermediate frame 930 along the X direction. Carrier 1030 is fixedly coupled to top frame 920 via flange 922. Carrier 1030 may be integral to top frame 920. A bottom side of flange 922 may be configured to hold first and second permanent magnets 921*a* and 923 so that their magnetic axes are respectively parallel to the X and Y axes. An additional magnet 921*b* may be positioned so that its magnetic axis is parallel to X direction, symmetrically to first permanent magnet 921*a* with respect to the optical axis. Further, first electrical coils 924*a*-924*b* and second electrical coil 926 are respectively configured to cooperate respectively with first permanent magnets 921*a*-921*b* and second permanent magnet 923 and configured so that a current in first electrical coils 924*a*-924*b* and/or in the second electrical coil 926 is capable of inducing axial forces on first permanent magnets 921*a*-921*b* and/or on second permanent magnet 923, thereby causing axial movement of the top frame in the X and/or Y directions. First and second electrical coils 924*a*-924*b* and 926 may be mounted on main PCB 1100. Main PCB 1100 may include electrical connections for image sensor 1060, first and second electrical coils 924*a*-924*b* and 926, and for an AF module described hereinbelow. In some embodiments, camera module 1000 may additionally include an additional OIS system configured to move the image sensor 1060.

Lens barrel 1020 has an operative state and a collapsed state. In the operative state, image sensor 1060 is positioned in a focal plane or in an imaging plane of the objective assembly. In the collapsed state, the camera module may be disabled i.e. the camera module may be unable to image a field of view of the objective assembly. The operative state corresponds to a pop-out state of camera module 1000 in which a TTL of the camera module is higher than a TTL of the camera module in the collapsed state.

Camera module 1000 further includes a pop-out assembly configured to controllably move lens barrel 1020 from the collapsed state to the operative state. The pop-out assembly comprises a magnetic spring assembly configured to bias lens barrel 1020 in the operative state. The magnetic spring assembly comprises at least one permanent magnet 1070 fixed to lens barrel 1020, and a ferromagnetic yoke 1080 fixed to carrier 1030. The magnetic spring assembly is configured to cause lens barrel 1020 to axially move relative to carrier 1030 from the collapsed state towards the operative state. The magnetic spring assembly is positioned in an interstice between carrier 1030 and lens barrel 1020. The at least one (e.g. two) permanent magnet 1070 is fixed to an outer wall of lens barrel 1020. Yoke 1080 is fixed to an inner wall of carrier barrel 1030.

The retractable cover window (not shown) may also be configured to controllably move axially between a retracted position and an extended position. In the retracted position, the cover window may be positioned to abut on the most distal surface of the lens barrel in the collapsed state and to maintain the lens barrel in the collapsed state. In the extended position, the cover window may be positioned to provide for an axial gap with the lens barrel in the operative state. The motion of the cover window between the retracted and extended positions and the motion of the lens barrel between the collapsed and extended positions may be coordinated. The axial movement of the cover window may be driven by a cover window pop-out assembly operated by an actuator. The cover window pop-out assembly may be one of the mechanisms shown with reference to FIGS. 9-12 or a spring-based mechanism as mentioned earlier with reference to camera module 600. In the retracted position, the cover window may be configured to hold the lens barrel in the collapsed position. In other words, the cover window in the retracted position may overcome the magnetic force of the magnetic spring assembly. The window cover may further be configured to cause the lens barrel to move from the operative state to the collapsed state when the cover window is operated to move from the extended position to the retracted position by the window cover pop-out assembly. In other words, the window cover may push on the lens barrel and collapse the lens barrel in the collapsed state when moving from the extended position to the retracted position. When the cover window is moved from the retracted position to the extended position, the lens barrel is released and the magnetic spring may drive the lens barrel towards the operative state.

Camera module 1000 further include an AF module comprising at least one auto-focus electrical coil 1092 fixed to an inner wall of carrier barrel 1030. The AF module is integrated in the D-cut volume freed between the carrier 1030 and the lens barrel 1020. This may enable to limit an increase of diameter due to the AF module. Auto-focus electrical coil 1092 is configured so that, when lens barrel 1020 moves towards the operative state into an auto-focus range, a current in the at least one electrical coil is capable of inducing axial forces on the at least one permanent magnet 1070 to cause axial movement of the lens barrel and enable auto-focus capability of camera module 1000. The auto-focus range may refer to positions along the Z axis for which auto-focus the electrical coil 1092 may induce forces capable of axially moving the lens barrel. The magnetic spring assembly is configured to move lens barrel 1020 within the auto-focus range. In some embodiments, the AF module may allow maintaining lens barrel 1020 in the operative state. In some embodiments, the pop-out force of the magnetic spring assembly may allow maintaining lens barrel 1020 in the operative state. The AF module may further include a driving circuitry configured to operate the AF module and a position sensor (not shown) to determine a position of lens barrel 1020. The AF module may further comprise an auto-focus PCB which may be fixed to the inner wall of carrier 1030. The driving circuitry and electrical coil 1092 may be mounted on the PCB. Camera module 1000 may further comprise a current supply wiring for supplying current to the AF module. The current supply wiring may extend from main PCB 1100 onto which sensor 1060 may be mounted to the PCB onto which the at least one electrical coil 1092 is mounted so as to supply current to the AF module. Main PCB 1100 may include a foldable PCB part 1110 which may be folded so as to reach an upper surface of top frame 920. The current supply wiring may further include a planar flexure 1120 configured to fit onto top frame 920 upper surface. Flexure 1120 may include wires for electrical routing. Flexure 1120 may electrically connect to foldable PCB part 1110 of main PCB 1100. Flexure 1120 may electrically connect to the auto-focus PCB. Flexure 1120 may include four electric channels 1121*a*-1121*d* for supplying control signals to the AF module. Two channels may be for controlling auto-focus electrical coil 1092 and two channels may be for controlling the driving circuitry and position sensor. Flexure 1120 may include an auto-focus connection port 1122*a* including four connections points for connecting to the AF module. The barrel 1030 may be configured for allowing these electrical connections therethrough and may for example include through holes (apertures) for receiving the electrical connections. Flexure 1120 may further include a PCB connection port 1122*b* including four connection points for connecting to the main PCB 1100. Flexure 1120 may include a flexure ring 1123 arranged around a base of the carrier barrel and a flexure outline 1124 arranged on a peripheral edge of top frame 920. Electrical channels 1121*a*-1121*d* may each separately join flexure outline 1124 and flexure ring 1123. In some other embodiments, auto-focus connection port 1122*a* and PCB connection port 1222*b* may be connected directly for example using floating cables so that planar flexure 1120 is not included.

In other words, the magnetic spring may linearly move the lens barrel in a direction parallel to the lens optical axis. This may switch the pop-out camera between the (operative) pop-out state and the (non-operative) collapsed state. In order to switch the pop-out camera between the collapsed state and the pop-out state, the cover window is linearly moved in the direction parallel to the lens optical axis simultaneously or before moving the lens barrel. The stroke of the lens barrel switching movement between the collapsed state and the pop-out state may be between 0.5 mm and 10 mm. This lens barrel switching movement may be performed in an open loop configuration as accuracy requirements are relatively low. In the pop-out state, the AF module may linearly move the lens barrel for performing auto-focus. The stroke of this auto-focus movement may be between 0.5 mm and 5 mm. The auto-focus movement may be performed in a closed loop configuration, as accuracy requirements are high for performing auto-focus.

It is noted that a lens OIS actuator generally requires additional space in the camera module in comparison to a sensor based OIS. An OIS system disclosed herein has a design which limits this issue. In particular, OIS system 900 may have a flat layered structure in which the mechanical parts enabling movement are positioned at a base of the camera module. A height of the flat layered structure may be below 3 mm and typically of about 2 mm or less. For comparison, a height of the camera module may be between 5 to 15 mm, typically 8 to 10 mm, for example about 9 mm. A presently disclosed OIS system may avoid increasing a diameter of a cover window of the camera module and enable a low shoulder design.

Generally, dimensions of camera module 1000 may be in the following ranges: the camera module including the actuator may fit in a circle having a diameter between 6 and 50 mm. A diameter of the cover window may be between 5 and 40 mm. The height of the camera module in the inactive (collapsed) mode may be between 6 and 18 mm while in the active (pop-out) mode it may be between 7 and 30 mm. A variation of height between the inactive and active mode of the camera module may be between 1 and 15 mm.

It is to be noted that the various features described in the various embodiments can be combined according to all possible technical combinations.

It is to be understood that the disclosure is not limited in its application to the details set forth in the description contained herein or illustrated in the drawings. The disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

Those skilled in the art will readily appreciate that various modifications and changes can be applied to the embodiments of the disclosure as hereinbefore described without departing from its scope, defined in and by the appended claims.

What is claimed is:

1. A camera module for use in a portable electronic device, the camera module comprising:

a lens barrel comprising an objective assembly holding coaxially one or more lens elements defining an optical axis, the lens barrel being configured to be axially movable between an operative state and a collapsed state;

a cover window arranged over the lens barrel and configured to be axially movable between a retracted position and an extended position;

an actuator including a driving motor;

a cover window pop-out assembly actuatable by the actuator, the cover window pop-out assembly including a driving cam configured to be driven rotationally by the driving motor, the driving cam being coupled to the cover window so that a rotation of the driving cam causes the cover window to axially move between the retracted position and the extended position;

a barrel pop-out assembly including a magnet and a coil, the barrel pop-out assembly configured to use the magnet and the coil to cause the lens barrel to axially move from the collapsed state to the operative state when the cover window moves from the retracted position into the extended position;

an image sensor configured to image a field of view of the objective assembly when the lens barrel is in the operative state;

wherein the cover window is configured so as to provide an axial gap between the lens barrel in the operative state and the cover window in the extended position.

2. The camera module of claim 1, wherein the cover window is configured so as to push the lens barrel into the collapsed state when the lens barrel is in the operative state and wherein the cover window is operated by the cover window pop-out assembly to move from the extended position to the retracted position.

3. The camera module of claim 1, wherein the barrel pop-out assembly and the cover window pop-out assembly are coordinated.

4. The camera module of claim 1, further comprising a protective seal configured to maintain impermeability of camera module.

5. The camera module of claim 1, further comprising a back housing configured for accommodating camera module, and a front housing configured to maintain axially the driving cam on the back housing while allowing rotation of the driving cam.

6. The camera module of claim 5, further comprising a front ball bearing coupling between the front housing and to the driving cam, and/or a back ball bearing between the driving cam and the back housing.

7. The camera module of claim 5, further comprising one or more static lens elements arranged to be static relative to the back housing.

8. The camera module of claim 1, wherein the actuator further comprises:

a worm screw configured to be powered by the driving motor;

a worm wheel coupled the worm screw and to the driving cam so that a rotation of the worm screw rotates the driving cam.

9. The camera module of claim 8, wherein the driving cam and the worm wheel are friction coupled, the coupling being configured to be overcome when a collapsing force larger than a predefined threshold is applied.

10. The camera module of claim 1, the cover window pop-out assembly including one or more springs, and wherein the one or more springs act as shock absorber for the camera when the portable electronic device is dropped.

11. The camera module of claim 1, wherein the barrel pop-out assembly is configured to cause the lens barrel to axially move for focusing.

12. The camera module of claim 1, wherein the image sensor is moved to perform optical image stabilization.

13. The camera module of claim 1, wherein a difference in a height of the camera module between the extended state and the collapsed state is larger than 1 mm.

14. The camera module of claim 1, wherein a difference in a height of the camera module between the extended state and the collapsed state is larger than 10%.

15. The camera module of claim 1, wherein a diameter of the cover window may be between 5 and 40 mm.

16. The camera module of claim 1, wherein a height of the camera module in the collapsed state is between 6 and 18 mm.

17. The camera module of claim 1, wherein a height of the camera module in the operative state is between 7 and 30 mm.

18. The camera module of claim 1, wherein the axial gap is in a range of 0.1 mm-3 mm.

19. The camera module of claim 1, wherein the portable electronic device is a smartphone.

* * * * *